United States Patent
Tabaru

(10) Patent No.: US 9,317,475 B2
(45) Date of Patent: Apr. 19, 2016

(54) MULTIPLEXING AUXILIARY PROCESSING ELEMENT AND SEMICONDUCTOR INTEGRATED CIRCUIT

(75) Inventor: Tsuguchika Tabaru, Yokohama (JP)

(73) Assignee: Cypress Semiconductor Corporation, San Jose, CA (US)

( * ) Notice: Subject to any disclaimer, the term of this patent is extended or adjusted under 35 U.S.C. 154(b) by 396 days.

(21) Appl. No.: 12/791,280

(22) Filed: Jun. 1, 2010

(65) Prior Publication Data

US 2010/0318767 A1  Dec. 16, 2010

(30) Foreign Application Priority Data

Jun. 12, 2009  (JP) .................................. 2009-141495

(51) Int. Cl.
*G06F 15/80* (2006.01)
*G06F 15/78* (2006.01)

(52) U.S. Cl.
CPC ........ *G06F 15/8007* (2013.01); *G06F 15/7867* (2013.01)

(58) Field of Classification Search
CPC . G06F 15/7867; G06F 15/8007; G06F 15/80; G06F 15/825
USPC .......................................................... 712/29
See application file for complete search history.

(56) References Cited

U.S. PATENT DOCUMENTS 6,122,719 A * 9/2000 Mirsky et al. .................... 712/15
6,266,760 B1 * 7/2001 DeHon et al. ................... 712/15
6,883,084 B1 * 4/2005 Donohoe ......................... 712/1
2006/0004992 A1  1/2006 Fujisawa et al.
2007/0230336 A1  10/2007 Hanai et al.

FOREIGN PATENT DOCUMENTS

| JP | 7-13958 A | 1/1995 |
|---|---|---|
| JP | 7-121504 A | 5/1995 |
| JP | 8-101761 A | 4/1996 |
| JP | 2006-4345 A | 1/2006 |
| JP | 2006-18539 | 1/2006 |
| JP | 2006-333496 A | 12/2006 |
| JP | 2007-241830 | 9/2007 |
| JP | 2008-92190 A | 4/2008 |

OTHER PUBLICATIONS

English language abstract of Japanese patent publication No. JP 7-13958 A, Jan. 17, 1995.
English language abstract of Japanese patent publication No. JP 7-121504 A, May 12, 1995.

* cited by examiner

*Primary Examiner* — Benjamin Geib

(57) ABSTRACT

A multiplexing auxiliary processing element (PE) performs a process that includes the operations of receiving signals of a plurality of upstream processing elements (PEs) including a plurality of pairs of PEs arranged on the input side; supplying the signals from the upstream PEs to a multiplex PE that is multiplexed and used so that the signals are subjected to a predetermined process by the multiplex PE; receiving the processed signals subjected to the predetermined process by the multiplex PE and sequentially supplying the signals to a plurality of downstream PEs arranged on the output side; and performing operations of the upstream PEs synchronously with the supply of the processed signals to the corresponding downstream PEs on the basis of setting of the multiplexing auxiliary PE.

13 Claims, 42 Drawing Sheets

MULTIPLEXING AUXILIARY PROCESSING ELEMENT AND SEMICONDUCTOR INTEGRATED CIRCUIT

CROSS-REFERENCE TO RELATED APPLICATIONS

This application is based upon and claims the benefit of priority from the prior Japanese Patent Application No. 2009-141495 filed on Jun. 12, 2009, the entire contents of which are incorporated herein by reference.

BACKGROUND

1. Field

The present invention relates to an auxiliary processing element (PE) for multiplexing (hereinafter, "multiplexing auxiliary PE") and a semiconductor integrated circuit.

2. Description of the Related Art

Recently, attention has been given to a dynamic reconfigurable circuit and a dynamic reconfigurable semiconductor integrated circuit which are capable of easily achieving ASIC-level performance using parallel operation with a program design similar to that for a digital signal processor (DSP).

The dynamic reconfigurable circuit includes an element (processing element) that performs operation, data storage and flow control, and program flow control, a configuration memory, and a sequencer.

The configuration memory stores a configuration indicating an operation of the PE. The sequencer controls the dynamic reconfigurable circuit.

One of features of the dynamic reconfigurable circuit is that the PE may be effectively reused by switching between configurations at high speed.

Japanese Laid-open Patent Publications Nos. 2006-018539 and 2007-241830 disclose related-art dynamic reconfigurable circuits in which PEs are effectively reused by switching between configurations at high speed.

As for methods of switching between configurations at high speed to effectively reuse PEs, a dynamically reconfigurable processor (DRP) method and a segmentation context switching method have been studied and developed.

In the DRP method, the number of PEs which may be used in one configuration is up to the physical number of PEs. In the segmentation context switching method, one virtual configuration is used, thus increasing the number of virtually available PEs.

SUMMARY

According to an aspect of the embodiment, a multiplexing auxiliary processing element (PE) performs a process that includes the operations of receiving signals of a plurality of upstream processing elements (PEs) including a plurality of pairs of PEs arranged on the input side, supplying the signals from the upstream PEs to a multiplex PE that is multiplexed and used so that the signals are subjected to a predetermined process by the multiplex PE, receiving the processed signals subjected to the predetermined process by the multiplex PE and sequentially supplying the signals to a plurality of downstream PEs arranged on the output side, and performing operations of the upstream PEs synchronously with the supply of the processed signals to the corresponding downstream PEs on the basis of setting of the multiplexing auxiliary PE.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

DETAILED DESCRIPTION OF THE PREFERRED EMBODIMENTS

Figure 1:
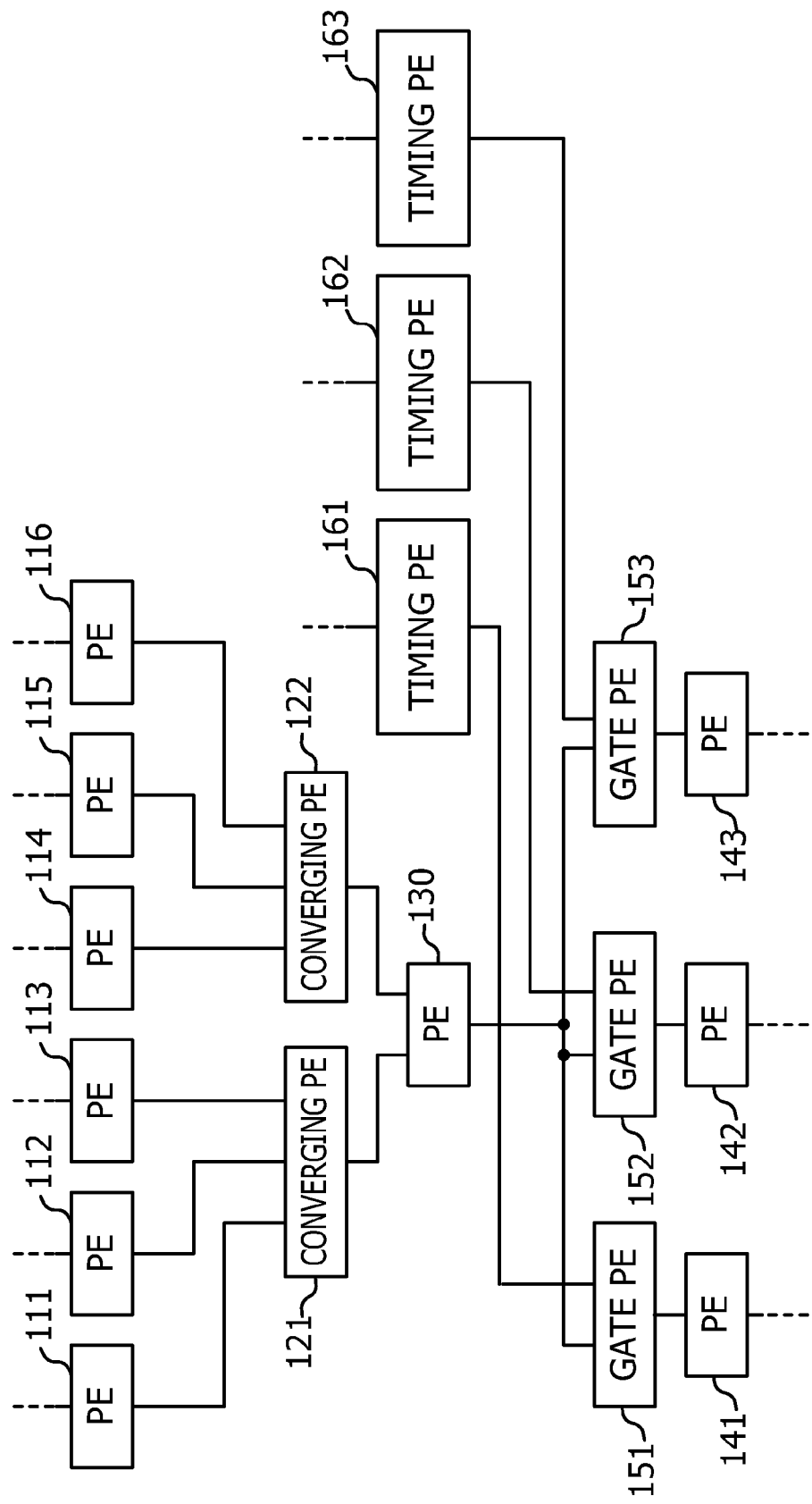
FIG. 1 is a block diagram schematically illustrating a semiconductor integrated circuit.

Reference may now be made in detail to embodiments of the present invention, examples of which are illustrated in the accompanying drawings, wherein like reference numerals refer to like elements throughout.

An exemplary semiconductor integrated circuit and its problems will be described first, before a detailed description of embodiments.

FIG. 1 is a block diagram schematically illustrating a semiconductor integrated circuit (dynamic reconfigurable circuit). In the semiconductor integrated circuit, a predetermined processing element (PE) 130 is multiplexed and used for three pairs of input signals, the resultant data is selected through three gate PEs and is then supplied to a circuit component downstream of the gate PEs.

Referring to FIG. 1, a pair of PEs 111 and 114, another pair of PEs 112 and 115, and another pair of PEs 113 and 116 are used as three pairs of input PEs (upstream PEs). PEs 121 and 122 are used as converging PEs. The PE 130 is a multiplex PE that is multiplexed and used.

In addition, PEs 141 to 143 serving as output PEs (downstream PEs), output gate PEs 151 to 153, and timing (delay) PEs 161 to 163 are arranged.

In this case, a first pair of input signals correspond to output signals of the PEs 111 and 114, a second pair of input signals correspond to output signals of the PEs 112 and 115, and a third pair of input signals correspond to output signals of the PEs 113 and 116.

The converging PEs 121 and 122 supply data assigned a valid signal of the first to third pairs of input signals to the multiplex PE 130. Note that a valid signal is assigned to any one or none of three pairs of input signals.

In FIG. 1, although the multiplex PE 130 is illustrated as a single PE, the PE 130 actually includes, for example, a circuit including a plurality of PEs.

The timings of three pairs of input signals are controlled so that the signals are not supplied to converging units (the converging PEs 121 and 122) at the same time.

Whether a signal has been input may be determined by, for example, checking a line (valid line) indicating whether a signal is loaded with data.

FIGS. 2 to 6 are diagrams explaining an exemplary operation of the semiconductor integrated circuit of FIG. 1.

Figure 2:
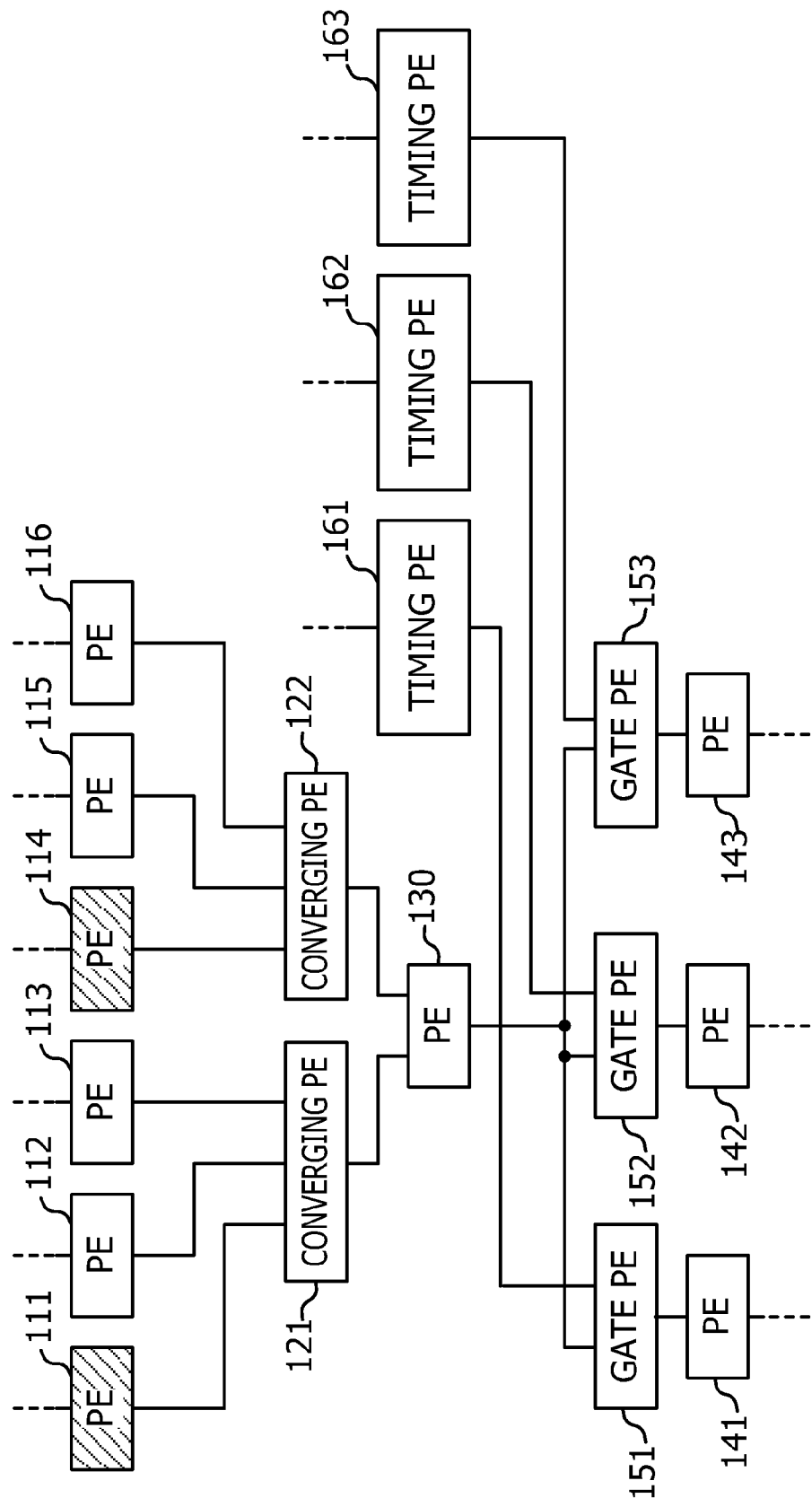
FIG. 2 is a first diagram explaining an exemplary operation of the semiconductor integrated circuit of FIG. 1.

First, as illustrated in FIG. 2, at a first cycle of a clock, signals are output from the first pair of the PEs 111 and 114.

Figure 3:
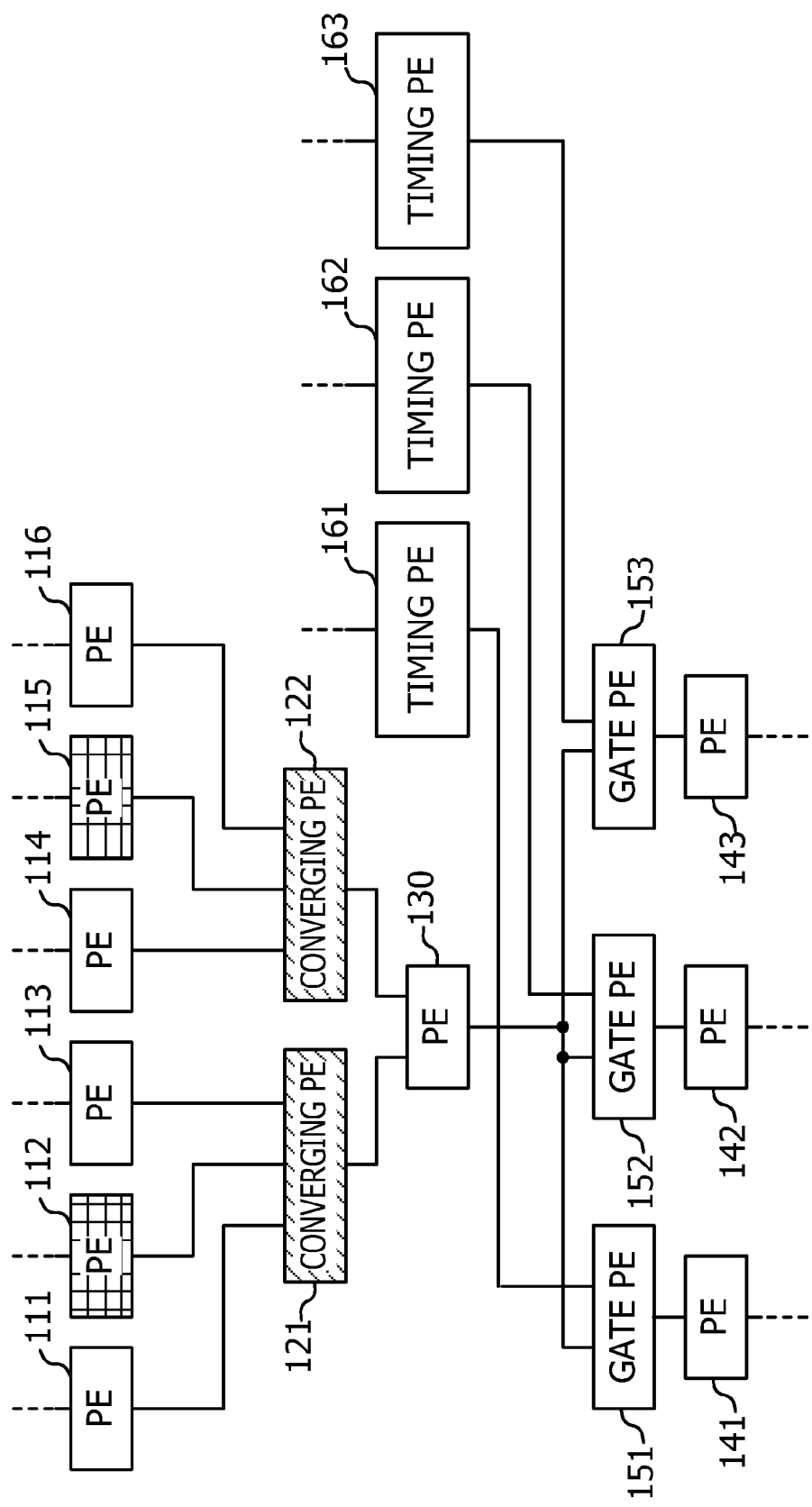
FIG. 3 is a second diagram explaining the exemplary operation of the semiconductor integrated circuit of FIG. 1.

Next, as illustrated in FIG. 3, at a second cycle of the clock, the output signals of the first pair of the PEs 111 and 114 are supplied to the converging PEs 121 and 122, respectively. At this time, signals are output from the second pair of the PEs 112 and 115.

Figure 4:
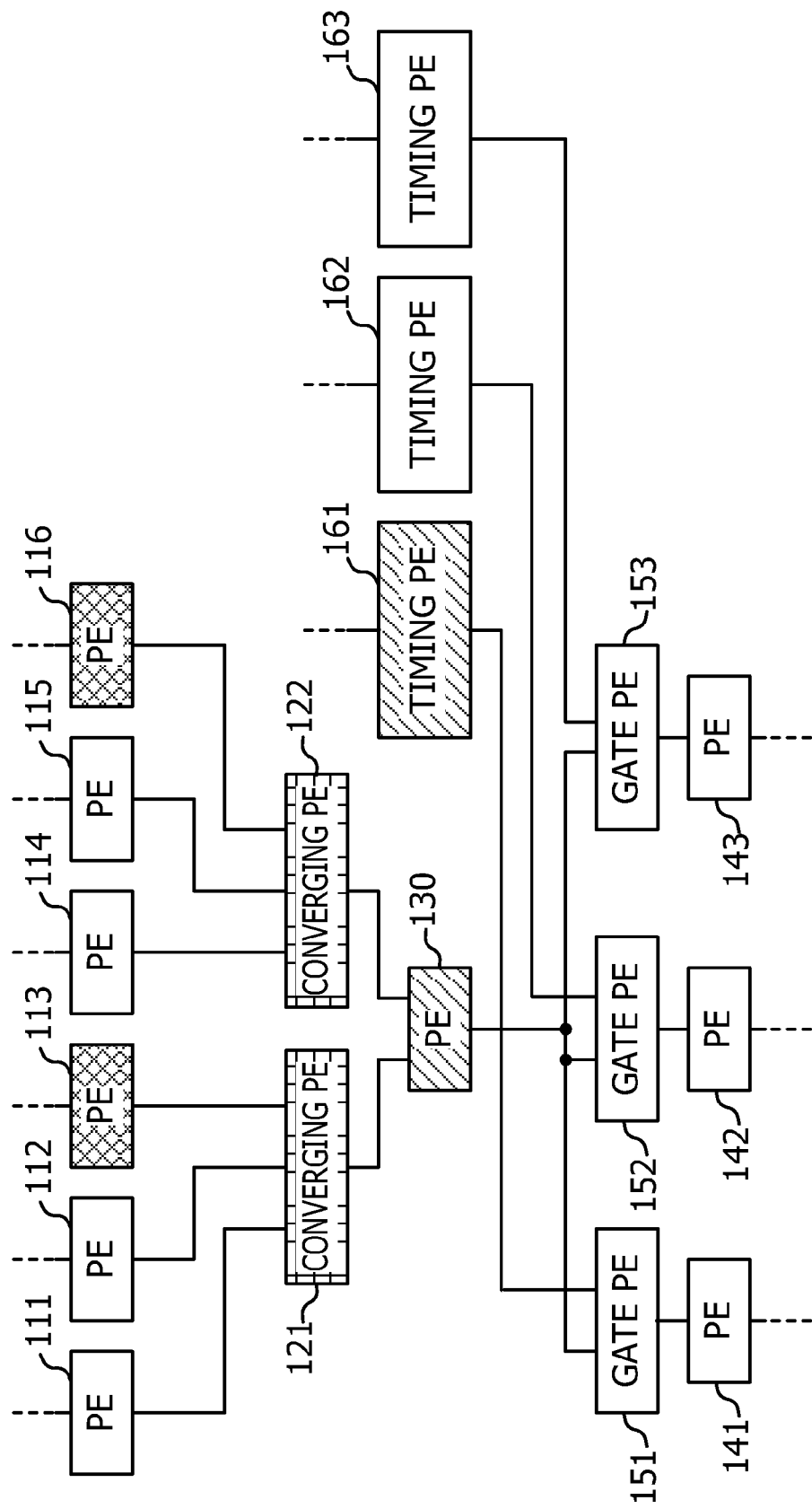
FIG. 4 is a third diagram explaining the exemplary operation of the semiconductor integrated circuit of FIG. 1.

Furthermore, as illustrated in FIG. 4, at a third cycle of the clock, the output signals of the first pair of the PEs 111 and 114 in the converging PEs 121 and 122 are supplied to the multiplex PE 130, so that the signals are subjected to a predetermined process.

At this time, the output signals of the second pair of the PEs 112 and 115 are input to the converging PEs 121 and 122, respectively, and signals are output from the third pair of the PEs 113 and 116. Furthermore, the timing PE 161 is activated to generate a timing signal.

Figure 5:
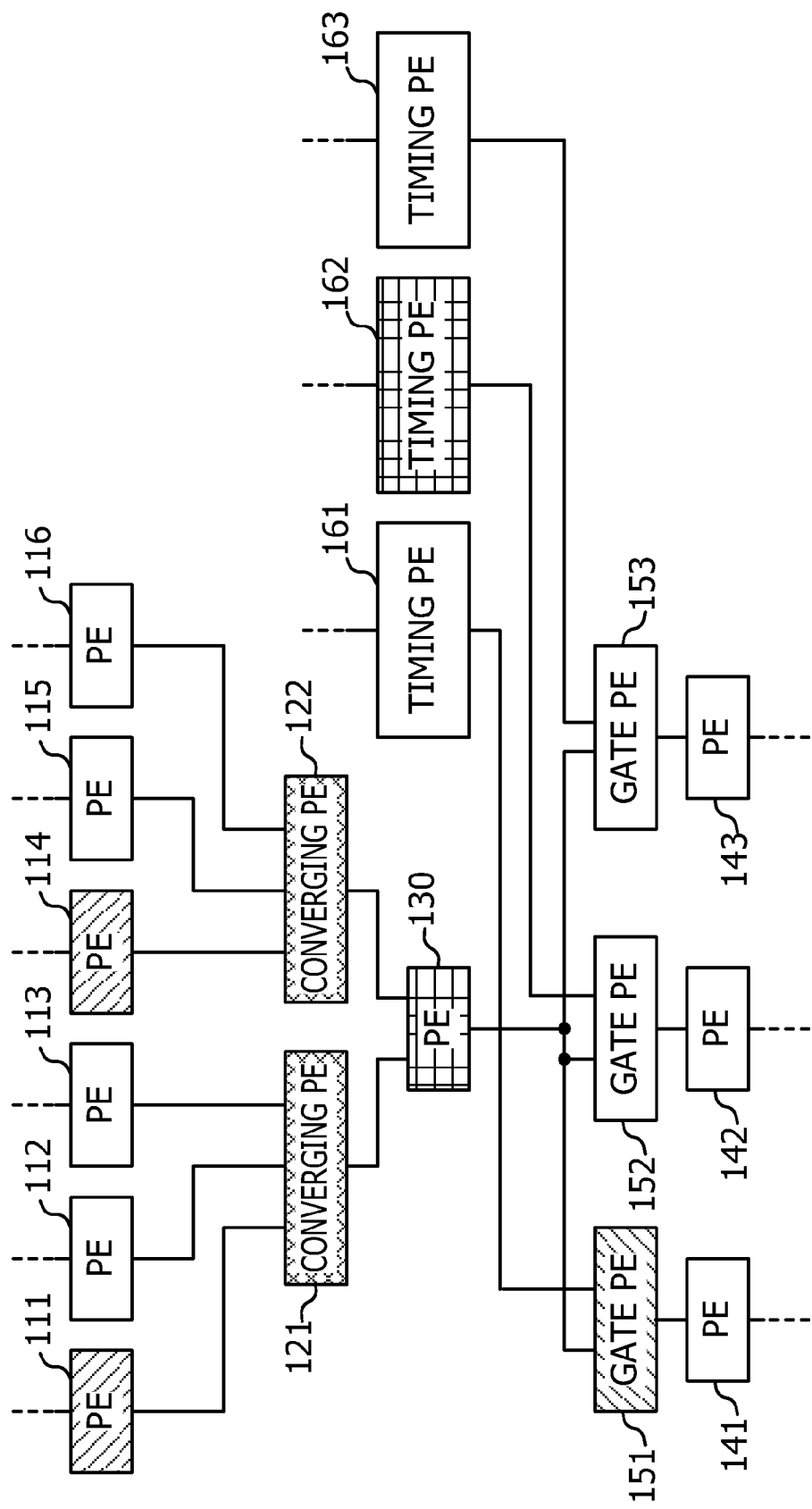
FIG. 5 is a fourth diagram explaining the exemplary operation of the semiconductor integrated circuit of FIG. 1.

After that, as illustrated in FIG. 5, at a fourth cycle of the clock, the first pair of output signals (processed signals) subjected to the predetermined process by the PE 130 are input to the gate PE 151 in accordance with the timing signal from the timing PE 161.

At this time, the output signals of the second pair of the PEs 112 and 115 in the converging PEs 121 and 122 are supplied to the multiplex PE 130, so that the signals are subjected to the predetermined process.

In addition, the output signals of the third pair of the PEs 113 and 116 are input to the converging PEs 121 and 122, respectively, and signals are again output from the first pair of the PEs 111 and 114. Furthermore, the timing PE 162 is activated to generate a timing signal.

Figure 6:
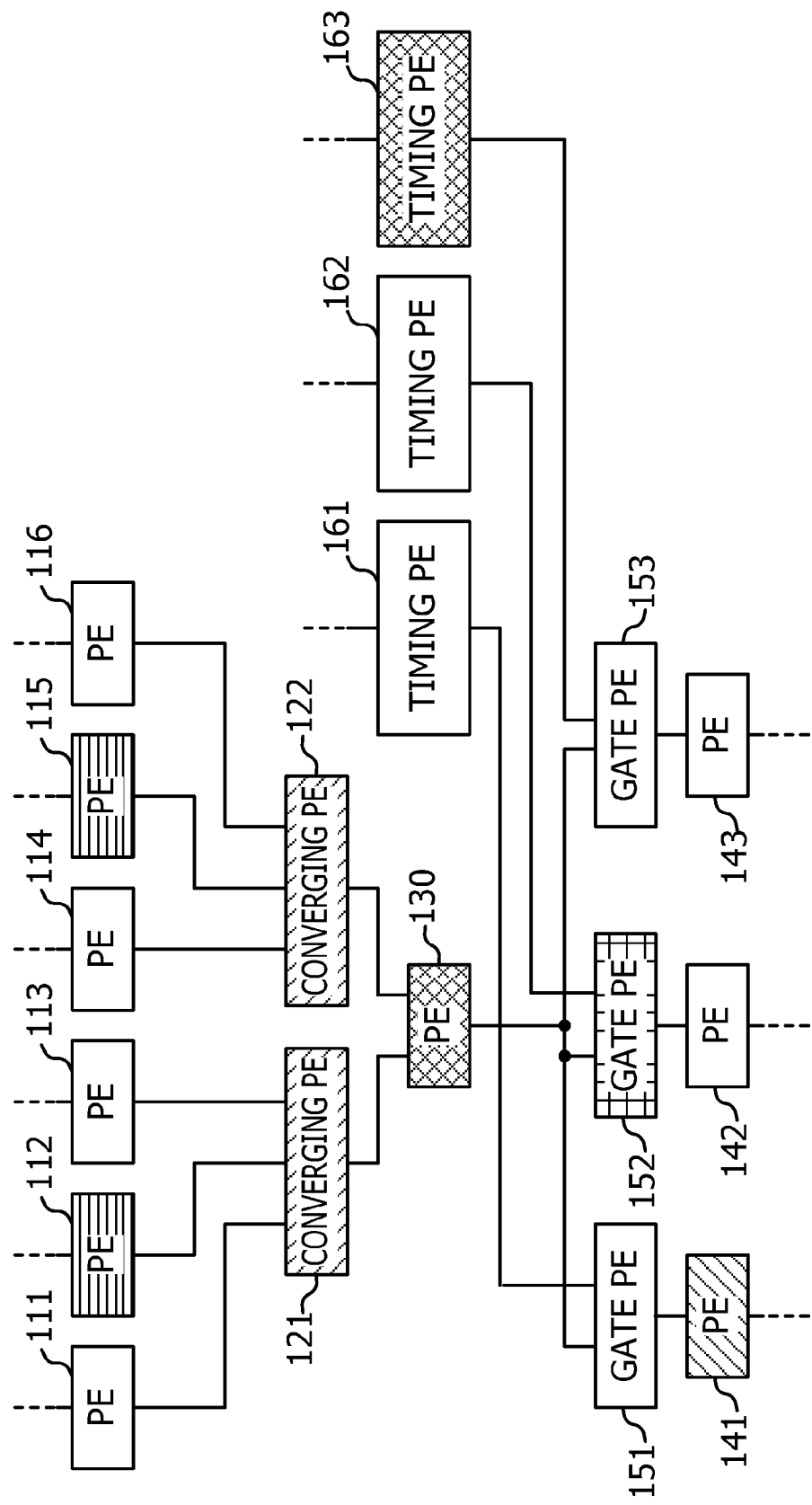
FIG. 6 is a fifth diagram explaining the exemplary operation of the semiconductor integrated circuit of FIG. 1.

As illustrated in FIG. 6, at a fifth cycle of the clock, the first pair of processed signals in the gate PE 151 are supplied to the PE 141, so that the signals are further processed by the PE 141.

At this time, the second pair of processed signals subjected to the predetermined process by the PE 130 are input to the gate PE 152 in accordance with the timing signal from the timing PE 162.

The output signals of the third pair of the PEs 113 and 116 in the converging PEs 121 and 122 are supplied to the multiplex PE 130, so that the signals are subjected to the predetermined process.

Furthermore, the output signals of the first pair of the PEs 111 and 114 are input to the converging PEs 121 and 122, respectively, and signals are again output from the second pair of the PEs 112 and 115. In addition, the timing PE 163 is activated to generate a timing signal.

By repeating the above-described process, the output signals of the three pairs of PEs, i.e., the first pair of the PEs 111 and 114, the second pair of the PEs 112 and 115, and the third pair of the PEs 113 and 116 are sequentially processed by the multiplex PE 130 and, after that, the signals are supplied to the downstream PEs 141, 142, and 143.

In the dynamic reconfigurable circuit illustrated in FIG. 1, one significant data item flows through the circuit while being valid only for one clock, and a circuit component for timing control allows two data items to be supplied to the PE 130 which sequentially performs operation. Such a circuit is called, for example, a pipelined circuit.

As described above, the dynamic reconfigurable circuit illustrated in FIG. 1 may be constructed as a circuit in which the PE 130 is multiplexed and used for three pairs of input signals.

In the dynamic reconfigurable circuit in FIG. 1, however, even when the contents of a process performed by a program with many multiple accesses are few, mapping is disabled because the number of used PEs is large. Alternatively, many PEs have to be arranged in order to enable mapping.

Specifically, the above-described pipelined dynamic reconfigurable circuit needs the two converging PEs 121 and 122, the three gate PEs 151 to 153, and the three timing PEs 161 to 163. In other words, eight PEs in total are required to multiplex and use the PE (processor) 130.

Figure 7:
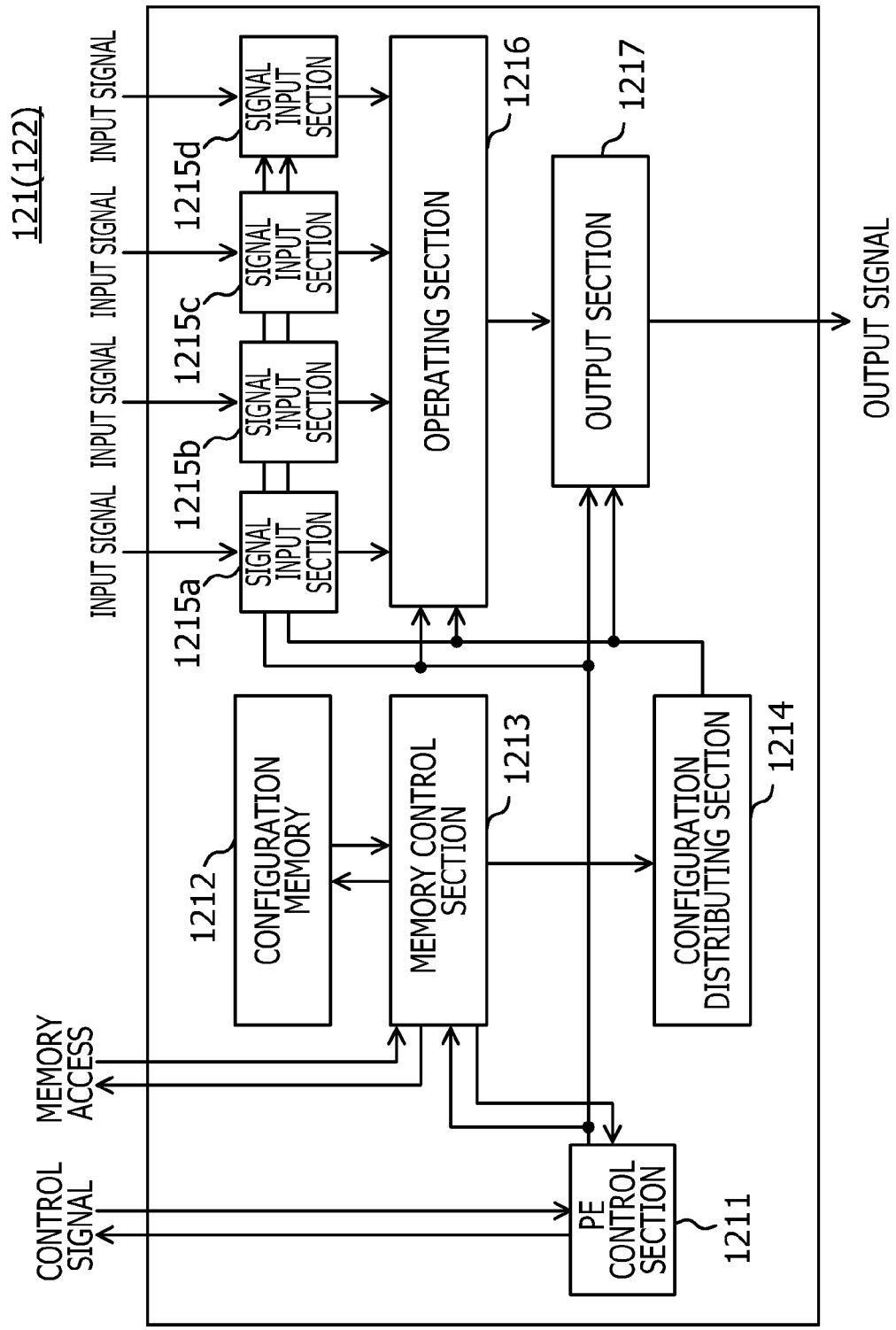
FIG. 7 is a block diagram illustrating a converging PE in the semiconductor integrated circuit of FIG. 1.
Figure 8:
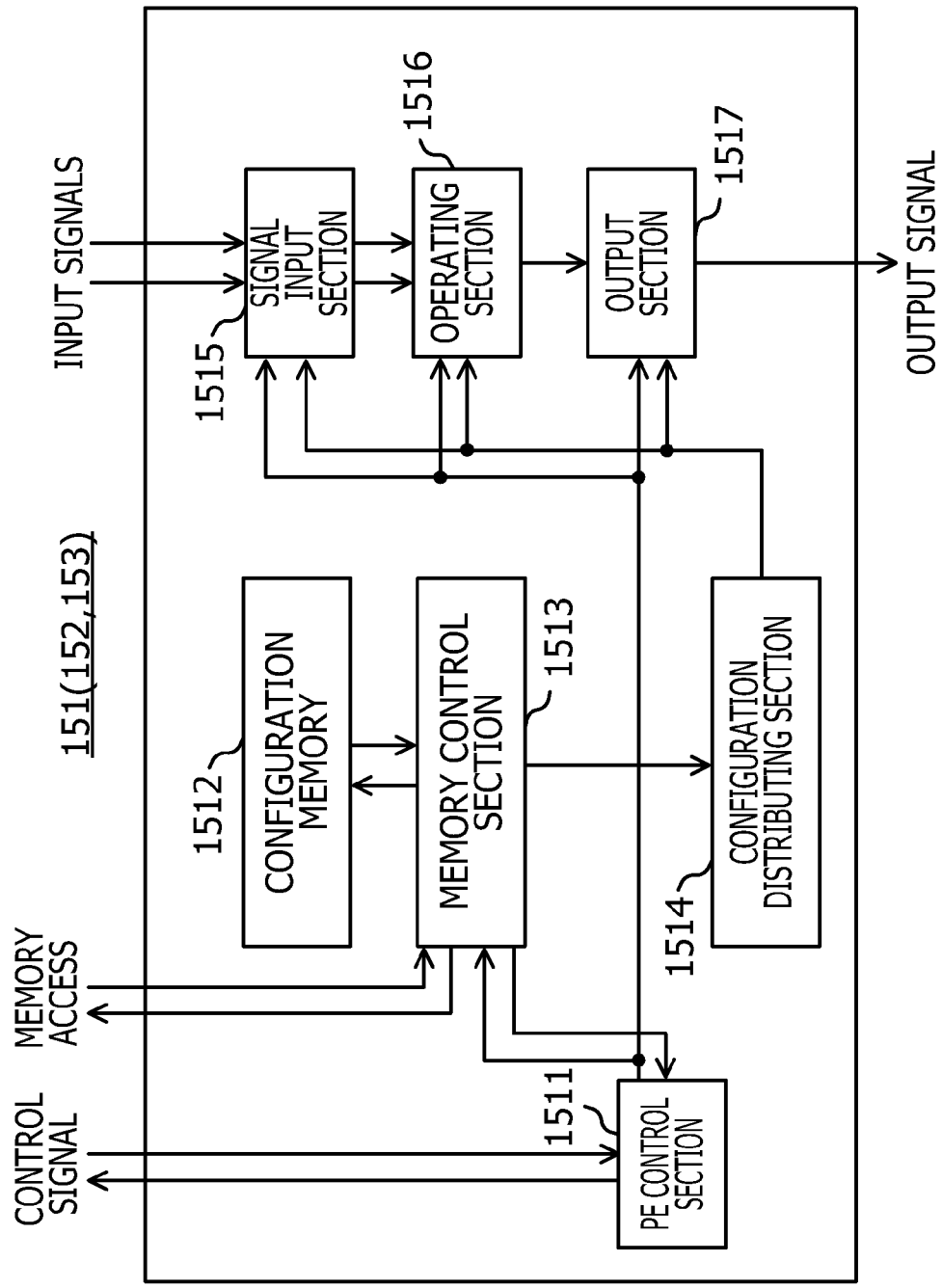
FIG. 8 is a block diagram illustrating a gate PE in the semiconductor integrated circuit of FIG. 1.
Figure 9:
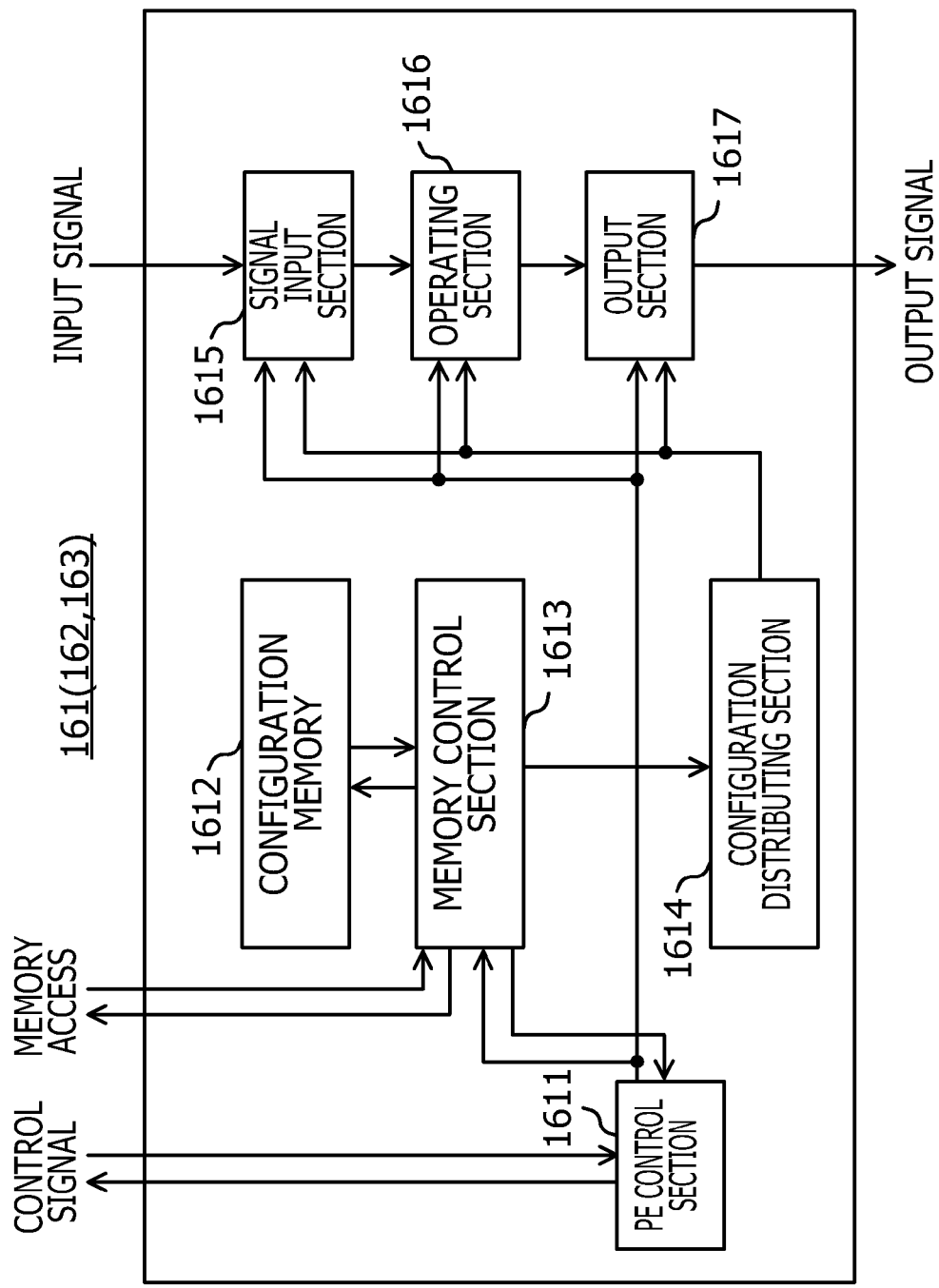
FIG. 9 is a block diagram illustrating a timing PE in the semiconductor integrated circuit of FIG. 1.

FIGS. 7 to 9 are block diagrams illustrating the PEs in the semiconductor integrated circuit of FIG. 1. FIG. 7 illustrates the converging PE. FIG. 8 illustrates the gate PE. FIG. 9 illustrates the timing (delay) PE.

Referring to FIG. 7, the converging PE 121 (122) includes a PE control section 1211, a configuration memory 1212, a memory control section 1213, a configuration distributing section 1214, four signal input sections 1215a to 1215d, an operating section 1216, and an output section 1217.

Referring to FIG. 8, the gate PE 151 (152, 153) includes a PE control section 1511, a configuration memory 1512, a memory control section 1513, a configuration distributing section 1514, a signal input section 1515, an operating section 1516, and an output section 1517.

Referring to FIG. 9, the timing PE 161 (162, 163) includes a PE control section 1611, a configuration memory 1612, a memory control section 1613, a configuration distributing section 1614, a signal input section 1615, an operating section 1616, and an output section 1617.

The PE control sections, the configuration memories, the memory control sections, the configuration distributing sections, the signal input sections, the operating sections, and the output sections in the above-mentioned converging PE 121, gate PE 151, and timing PE 161 will now be described.

Although the numbers of signals input to the operating sections 1216, 1516, and 1616 in the above-described PEs differ from each other, the operating sections have substantial similar processing functions.

The PE control section 1211 (1511, 1611) receives a control signal, serving as, for example, a reset instruction, an operation start/stop instruction, a suspend instruction, an instruction to specify a portion to be executed next in a configuration, or a memory read/write instruction, from a control unit that controls the entire dynamic reconfigurable circuit, and transmits the signal to a functional block in the PE.

The configuration memory 1212 (1512, 1612) serves as a memory storing a plurality of PE configurations. Data may be read and written to/from the configuration memory 1212 (1512, 1612) in accordance with instructions from the memory control section 1213 (1513, 1613).

The memory control section 1213 (1513, 1613) operates in response to an instruction from the PE control section 1211 (1511, 1611). Specifically, when receiving an instruction to specify a portion to be executed next in a configuration from the PE control section 1211, the memory control section 1213 reads data relevant to the portion from the configuration memory 1212 and transfers the data to the configuration distributing section 1214.

When receiving a memory read/write instruction for memory access from the PE control section 1211, the memory control section 1213 receives or transmits data from/to the configuration memory 1212 through a port for memory access to read or write data from/to the configuration memory 1212.

The configuration distributing section 1214 (1514, 1614) decodes configuration data received from the memory control section 1213 and transmits the resultant signal to functional blocks.

The signal input sections 1215a to 1215d (1515, 1615), whose operation is controlled by the PE control section 1211 (1511, 1611), receive a configuration from the configuration distributing section 1214 (1514, 1614) and determine whether to receive input signals to be supplied to the PE. When receiving the input signals, the signal input sections 1215a to 1215d transmits data to the operating section 1216 (1516, 1616).

The operating sections 1216, 1516, 1616 perform operations, designated by the configuration distributing sections 1214, 1514, and 1614, on data based on received input signals. The details of operation differ from PE to PE.

Specifically, for example, in the converging PE 121, when only one of input signals is valid data, the operating section 1216 outputs the valid data as a result. If input signals do not include valid data, the operating section 1216 outputs invalid data. When a plurality of valid data items are simultaneously input to the converging PE 121, the operation of the operating section 1216 is not defined.

As for the timing PE 161, the operating section 1616 delays data and outputs the resultant data that is delayed by a cycle designated by the configuration distributing section 1614.

As for the gate PE 151, when a gating signal indicates valid, the operating section 1516 outputs a gated signal. If the gating signal indicates invalid, the operating section 1516 outputs invalid data.

What gate signal condition indicates valid or invalid is designated to the operating section 1516 by the configuration distributing section 1514. The resultant data output from the operating section 1516 is transferred to the output section 1517.

When being instructed to update a register by the configuration distributing section 1214 (1514, 1614), the output section 1217 (1517, 1617) receives the resultant data from the operating section 1216 (1516, 1616) to store the data in the register included in the section.

In a case where the operating section 1216 (1516, 1616) does not operate, alternatively, operation is performed on invalid data, the output section 1217 (1517, 1617) stores the invalid data in the register included therein.

In addition, when being instructed not to update the register by the configuration distributing section 1214 (1514, 1614), the output section 1217 (1517, 1617) does not update the register. When being instructed to reset the register, the output section 1217 (1517, 1617) sets data stored in the register to invalid data.

An operation of a non-pipelined dynamic reconfigurable circuit will now be described. In the following description, data that is valid for a plurality of cycles of a clock will be called "non-pipelined data" and a circuit for multiplexing data including non-pipelined data will be called "non-pipelined data multiplexing circuit".

In other words, in a case where the same value is referred to more than once, e.g., where the same value is held while a loop is repeated, a non-pipelined circuit that registers the value in a register and continuously outputs valid data is used in some cases.

Figure 10:
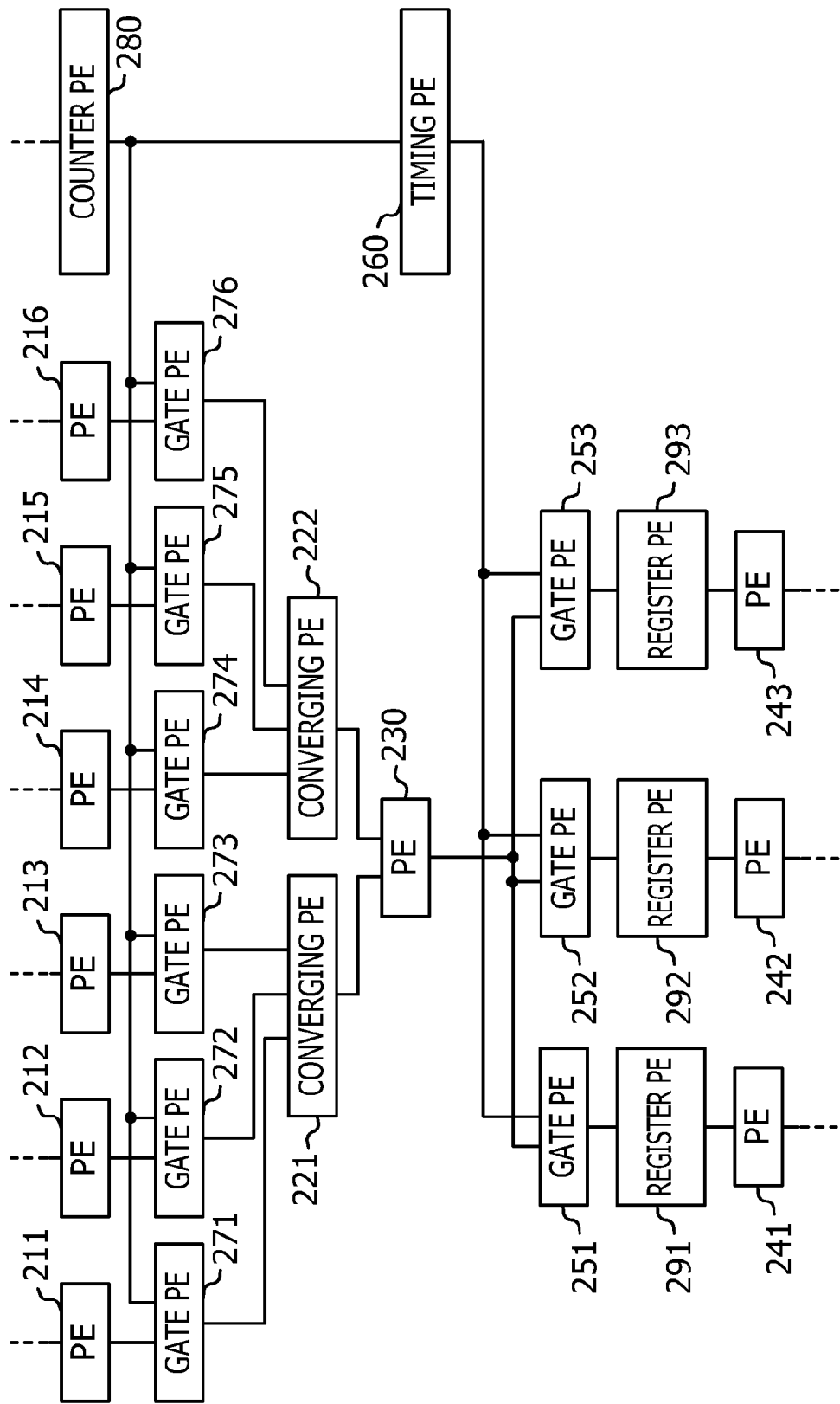
FIG. 10 is a block diagram schematically illustrating another semiconductor integrated circuit.

FIG. 10 is a block diagram schematically illustrating another semiconductor integrated circuit (dynamic reconfigurable circuit) that is a non-pipelined data multiplexing circuit. In the circuit of FIG. 10, a predetermined PE (230) is multiplexed and used for three pairs of input signals and the resultant data is allowed to flow downstream in the circuit through three gate PEs and three register PEs.

Referring to FIG. 10, a pair of PEs 211 and 214, another pair of PEs 212 and 215, and another pair of PEs 213 and 216 are used as three pairs of input PEs (upstream PEs). PEs 221 and 222 are used as converging PEs. The PE 230 is a multiplex PE that is multiplexed and used.

In addition, PEs 241 to 243 serving as output PEs (downstream PEs), output gate PEs 251 to 253, a timing (delay) PE 260, input gate PEs 271 to 276, a counter PE 280, and output register PEs 291 to 293 are arranged.

In this case, a first pair of input signals correspond to output signals of the PEs 211 and 214, a second pair of input signals correspond to output signals of the PEs 212 and 215, and a third pair of input signals correspond to output signals of the PEs 213 and 216.

The gate PEs 271 to 276 are controlled in accordance with an output signal of the counter PE 280. The gate PEs 251 to 253 are controlled in accordance with an output signal of the timing PE 260.

In FIG. 10, although the multiplex PE 230 is illustrated as a single PE, the PE 230 actually includes, for example, a circuit including a plurality of PEs in a manner similar to FIG. 1 described above.

FIGS. 11 to 17 are diagrams explaining an exemplary operation of the semiconductor integrated circuit of FIG. 10.

Figure 11:
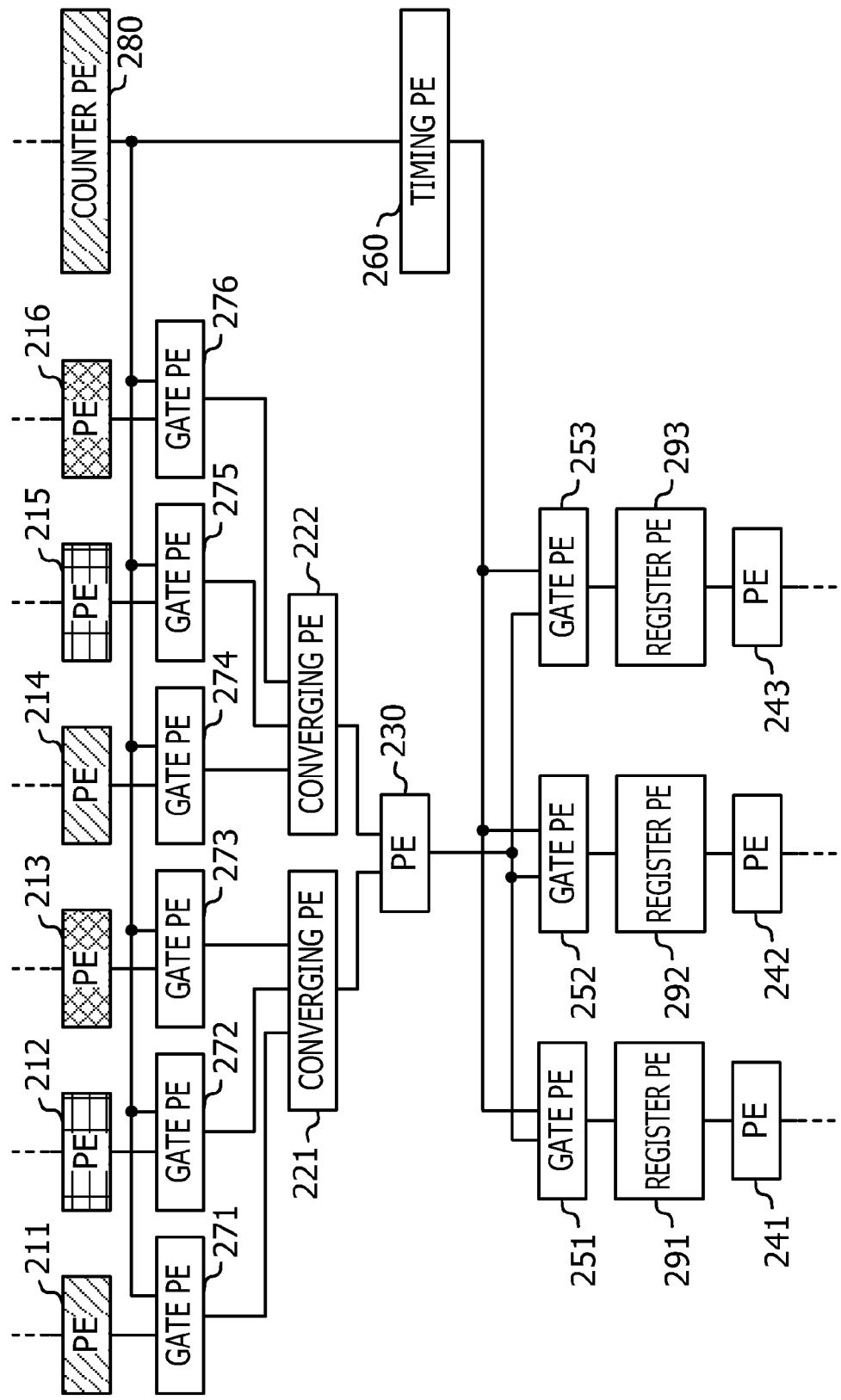
FIG. 11 is a first diagram explaining an exemplary operation of the semiconductor integrated circuit of FIG. 10.

As illustrated in FIG. 11, at a first cycle of a clock, signals have been output from the first pair of the PEs 211 and 214, the second pair of the PEs 212 and 215, and the third pair of the PEs 213 and 216. At this time, the counter PE 280 is activated.

Figure 12:
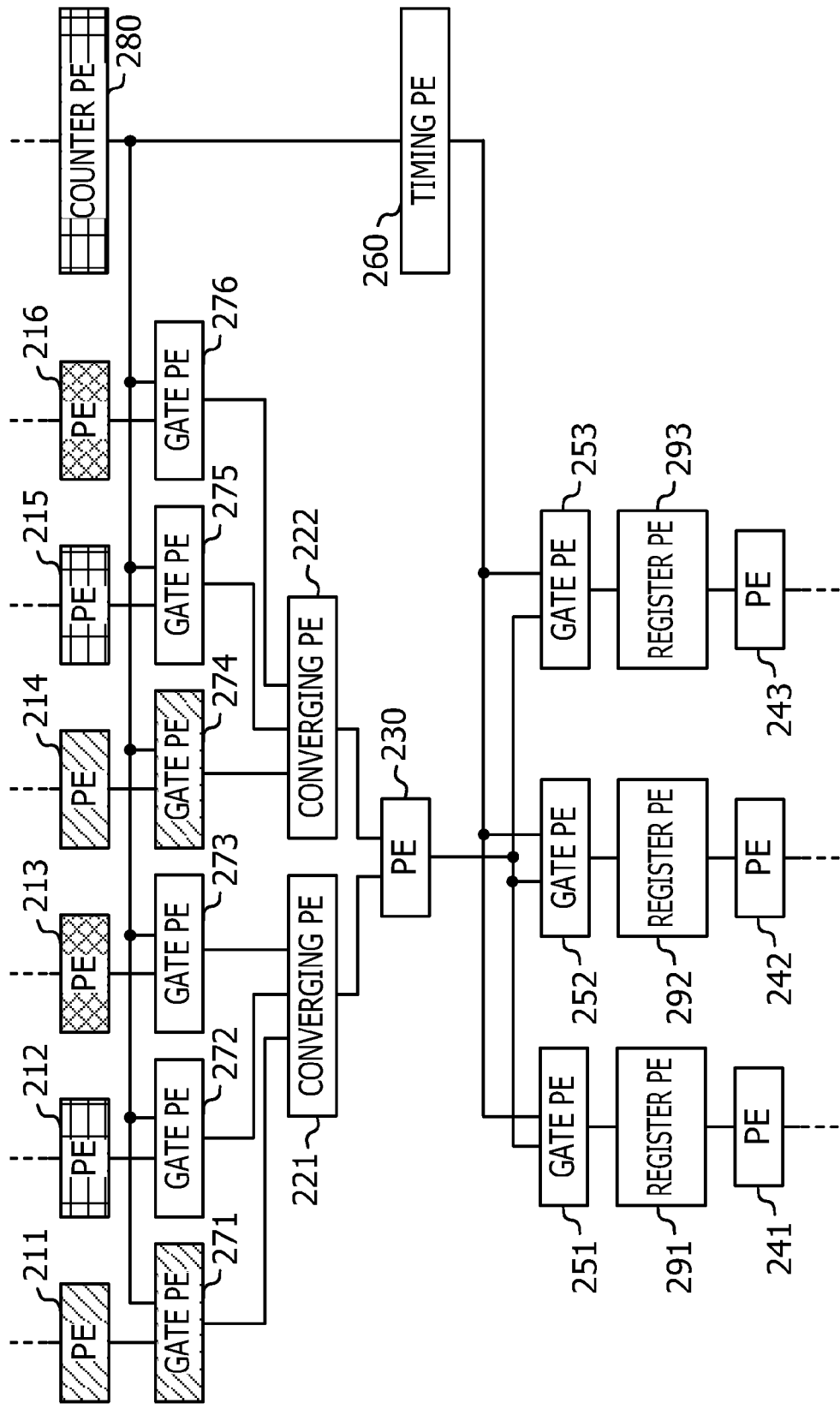
FIG. 12 is a second diagram explaining the exemplary operation of the semiconductor integrated circuit of FIG. 10.

As illustrated in FIG. 12, at a second cycle of the clock, the output signals of the first pair of the PEs 211 and 214 are input to the gate PEs 271 and 274, respectively, in accordance with an output signal of the counter PE 280.

Figure 13:
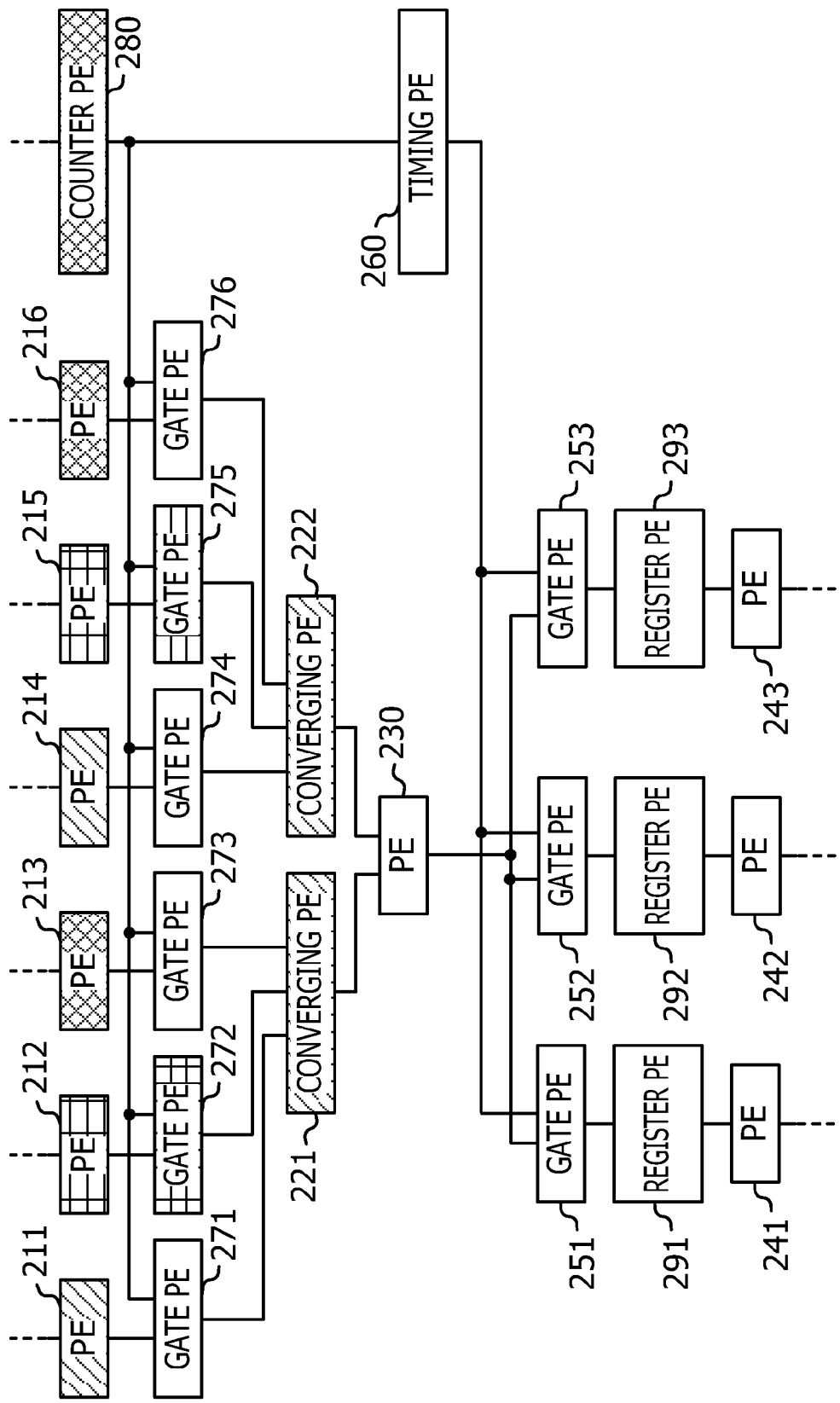
FIG. 13 is a third diagram explaining the exemplary operation of the semiconductor integrated circuit of FIG. 10.

As illustrated in FIG. 13, at a third cycle of the clock, the output signals of the first pair of the PEs 211 and 214 in the gate PEs 271 and 274 are input to the converging PEs 221 and 222, respectively.

At this time, the output signals of the second pair of the PEs 212 and 215 are input to the gate PEs 272 and 275, respectively, in accordance with an output signal of the counter PE 280.

Figure 14:
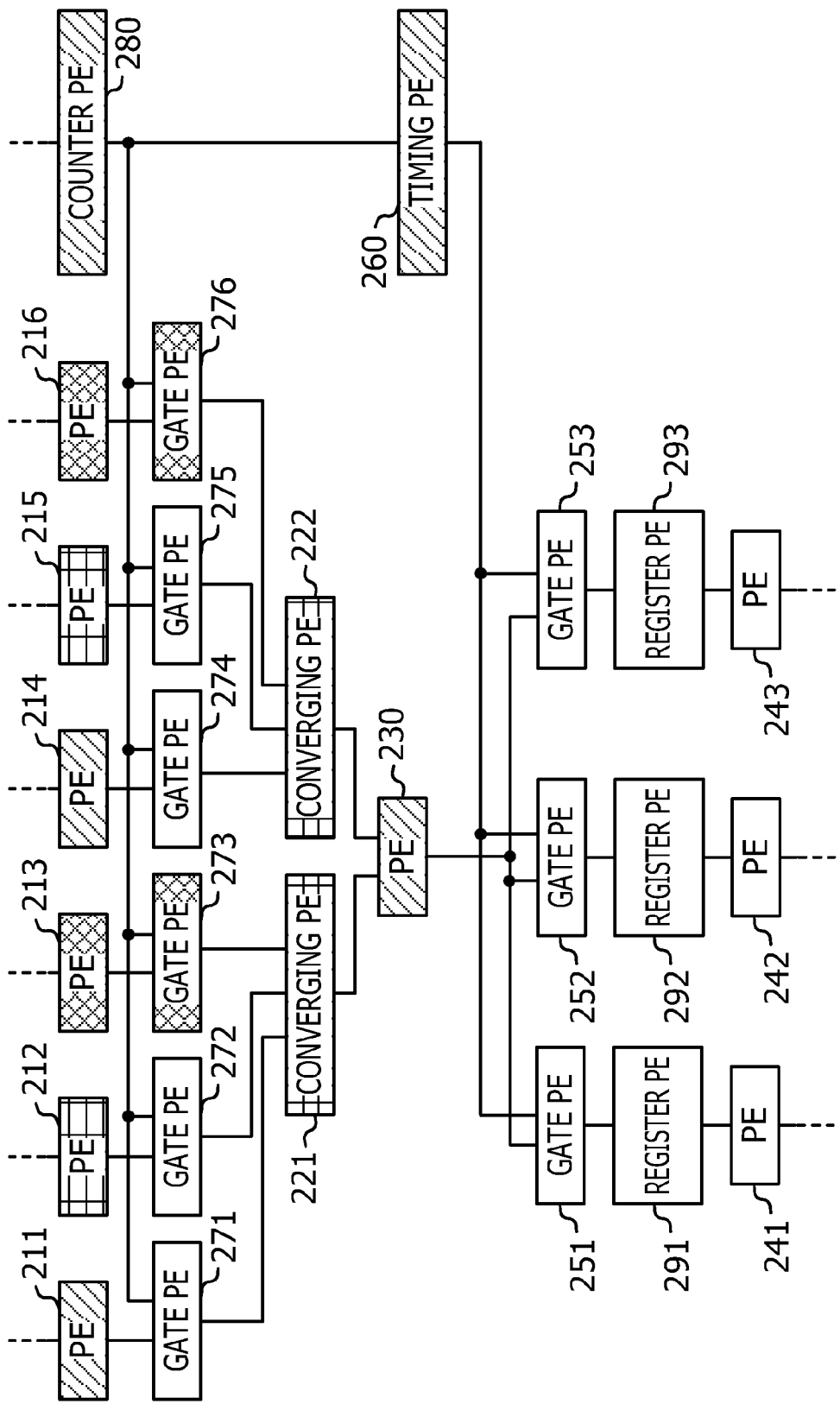
FIG. 14 is a fourth diagram explaining the exemplary operation of the semiconductor integrated circuit of FIG. 10.

As illustrated in FIG. 14, at a fourth cycle of the clock, the output signals of the first pair of the PEs 211 and 214 in the converging PEs 221 and 222 are supplied to the multiplex PE 230, so that the signals are subjected to a predetermined process.

At this time, the output signals of the second pair of the PEs 212 and 215 in the gate PEs 272 and 275 are input to the converging PEs 221 and 222, respectively. In addition, the output signals of the third pair of the PEs 213 and 216 are input to the gate PEs 273 and 276, respectively, in accordance with an output signal of the counter PE 280. Furthermore, the timing PE 260 is activated to generate a timing signal.

Figure 15:
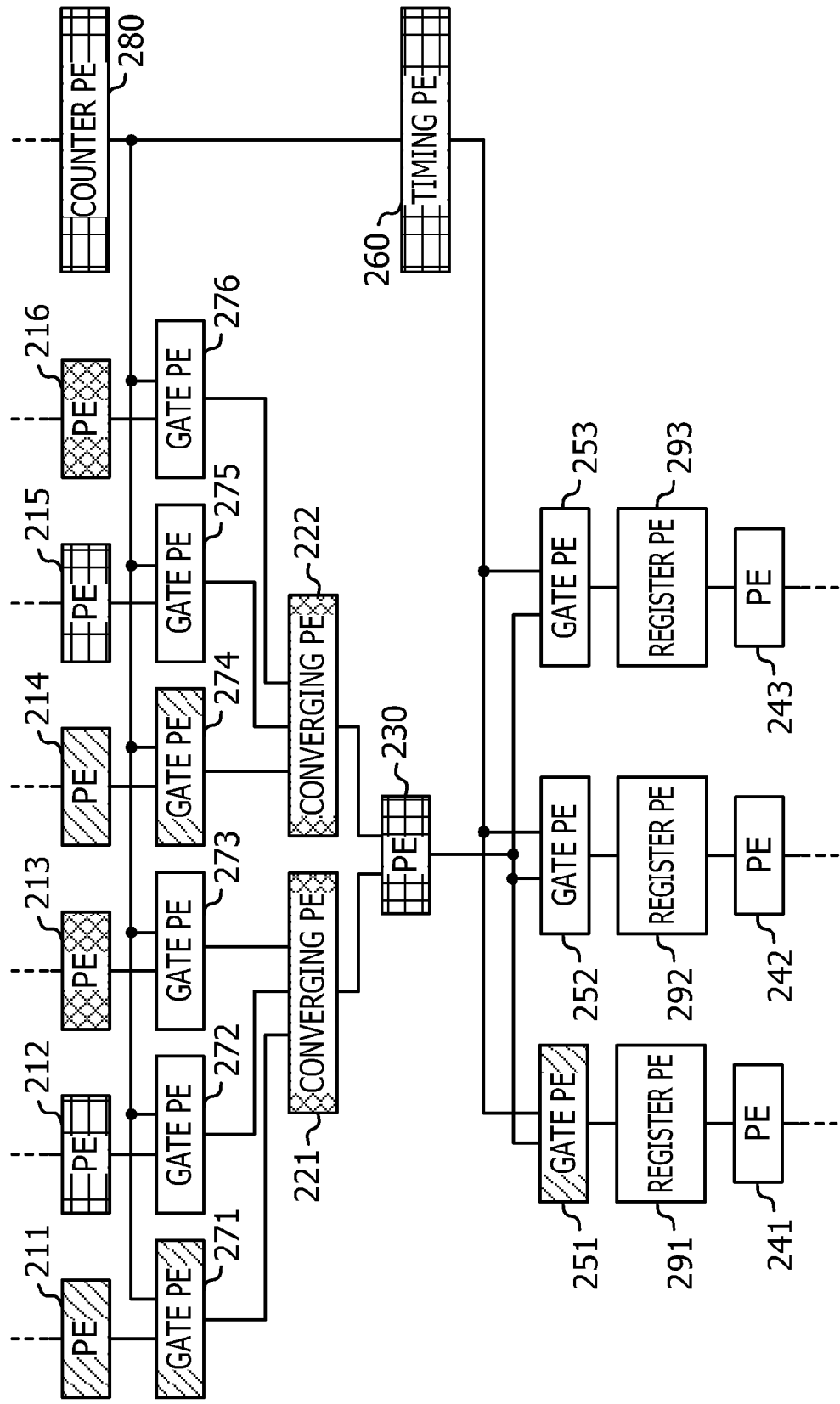
FIG. 15 is a fifth diagram explaining the exemplary operation of the semiconductor integrated circuit of FIG. 10.

After that, as illustrated in FIG. 15, at a fifth cycle of the clock, the first pair of output signals (processed signals) subjected to the predetermined process by the PE 230 are input to the gate PE 251 in accordance with the timing signal from the timing PE 260.

At this time, the output signals of the second pair of the PEs 212 and 215 in the converging PEs 221 and 222 are supplied to the multiplex PE 230, so that the signals are subjected to the predetermined process. In addition, the output signals of the third pair of the PEs 213 and 216 in the gate PEs 273 and 276 are input to the converging PEs 221 and 222, respectively.

Furthermore, output signals of the first pair of the PEs 211 and 214 are again input to the gate PEs 271 and 274, respectively, in accordance with an output signal of the counter PE 280.

Figure 16:
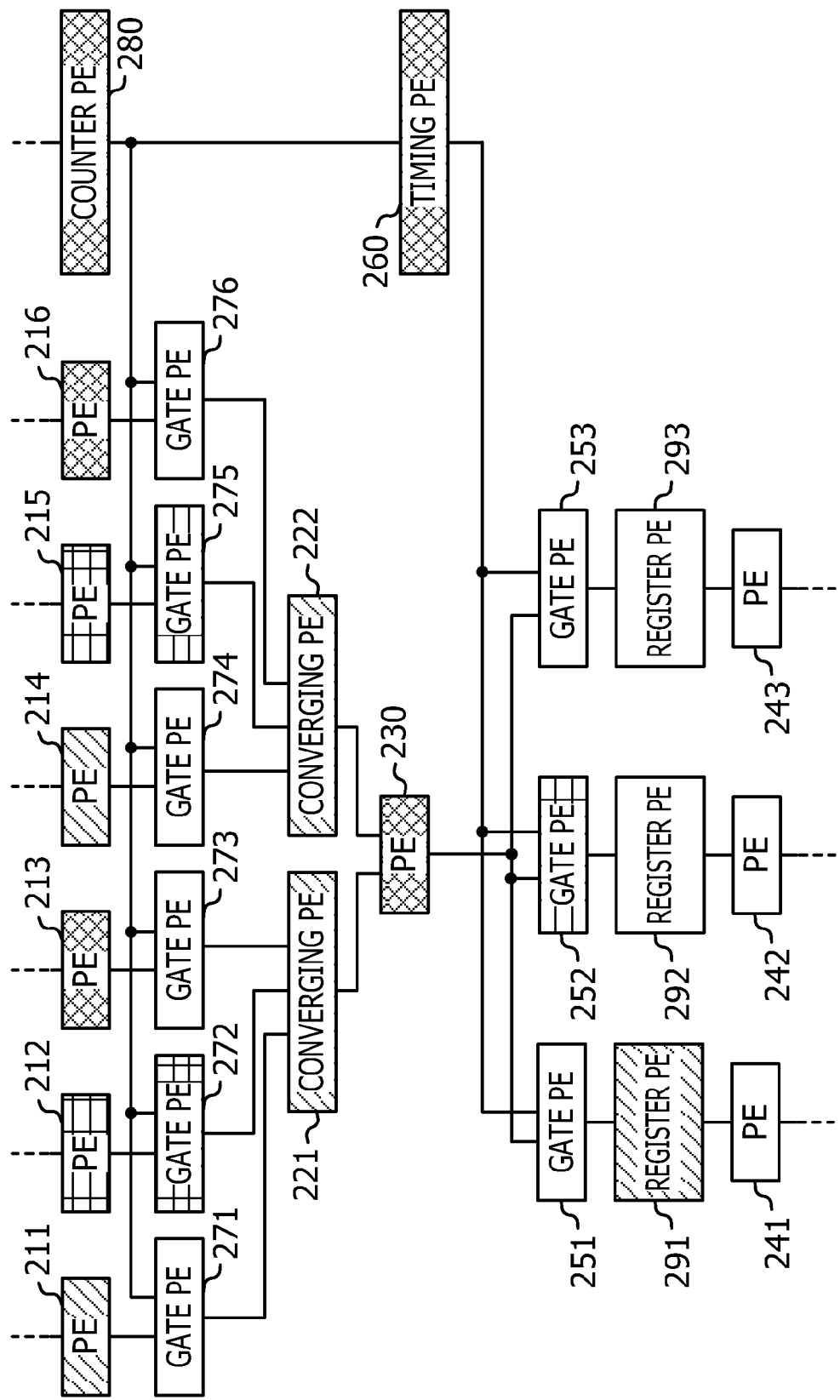
FIG. 16 is a sixth diagram explaining the exemplary operation of the semiconductor integrated circuit of FIG. 10.

After that, as illustrated in FIG. 16, at a sixth cycle of the clock, the first pair of processed signals in the gate PE 251 are supplied to and held by the register PE 291.

At this time, the second pair of processed signals subjected to the predetermined process by the PE 230 are input to the gate PE 252 in accordance with a timing signal from the timing PE 260. In addition, the output signals of the third pair of the PEs 213 and 216 in the converging PEs 221 and 222 are supplied to the multiplex PE 230, so that the signals are subjected to the predetermined process.

The output signals of the first pair of the PEs 211 and 214 in the gate PEs 271 and 274 are input to the converging PEs 221 and 222, respectively. Output signals of the second pair of the PEs 212 and 215 are again input to the gate PEs 272 and 275, respectively, in accordance with an output signal of the counter PE 280.

Figure 17:
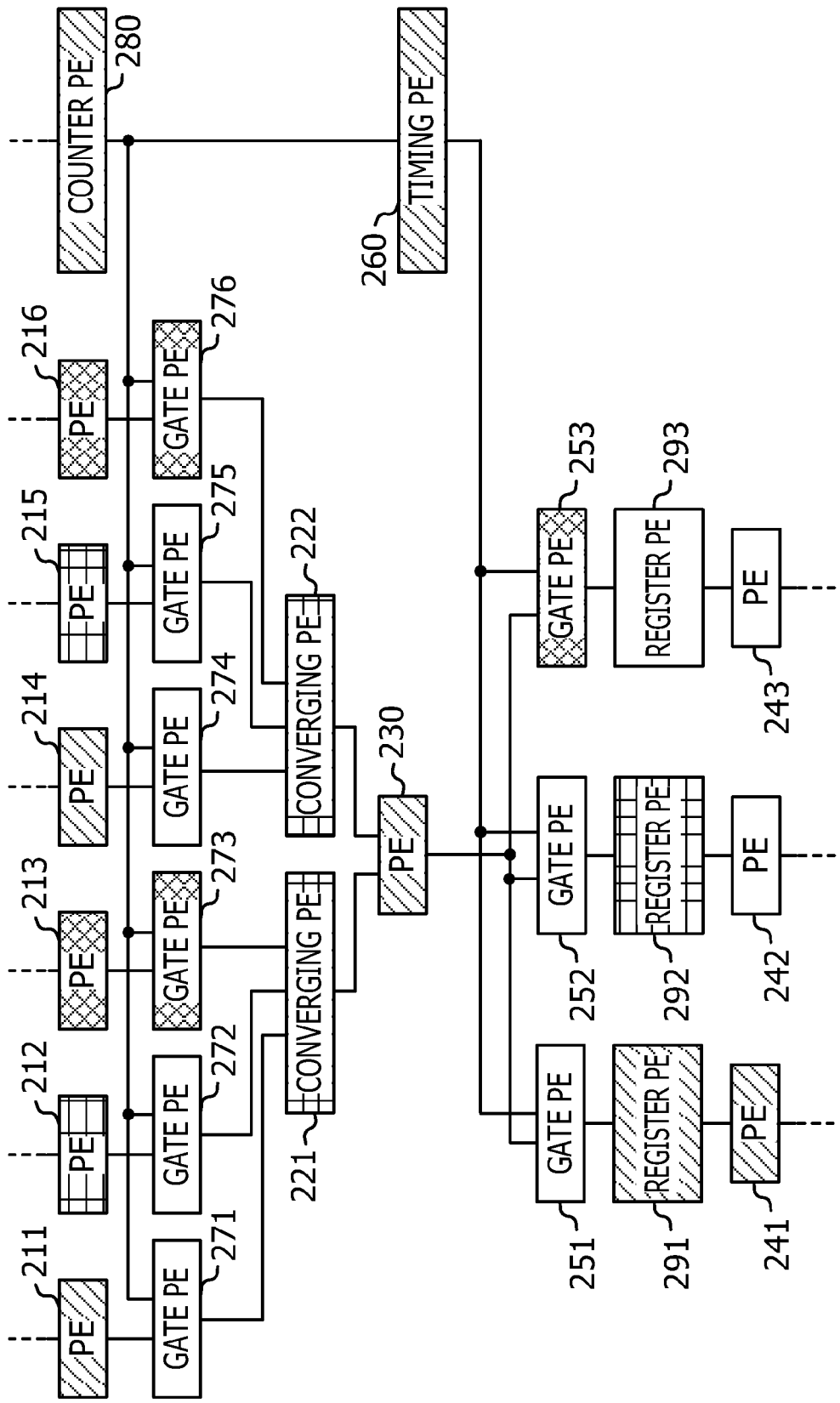
FIG. 17 is a seventh diagram explaining the exemplary operation of the semiconductor integrated circuit of FIG. 10.

As illustrated in FIG. 17, at a seventh cycle of the clock, the first pair of processed signals held in the register PE 291 are supplied to the PE 241 so that the signals are further processed.

At this time, the second pair of processed signals in the gate PE 252 are supplied to and held by the register PE 292. In addition, the third pair of processed signals subjected to the predetermined process by the PE 230 are input to the gate PE 253 in accordance with a timing signal from the timing PE 260.

Furthermore, the output signals of the first pair of the PEs 211 and 214 in the converging PEs 221 and 222 are supplied to the multiplex PE 230, so that the signals are subjected to the predetermined process.

The output signals of the second pair of the PEs 212 and 215 in the gate PEs 272 and 275 are input to the converging PEs 221 and 222, respectively. Output signals of the third pair of the PEs 213 and 216 are again input to the gate PEs 273 and 276, respectively, in accordance with an output signal of the counter PE 280.

By repeating the above-described process, the output signals of the three pairs of PEs, i.e., the first pair of the PEs 211 and 214, the second pair of the PEs 212 and 215, and the third pair of the PEs 213 and 216 are sequentially processed by the multiplex PE 230 and, after that, the signals are supplied to the downstream PEs 241, 242, and 243.

The above-described non-pipelined dynamic reconfigurable circuit needs the two converging PEs 221 and 222, the nine gate PEs 251 to 253 and 271 to 276, the timing PE 260, the counter PE 280, and the three register PEs 291 to 293. In other words, 16 PEs in total are required to multiplex and use the PE 230.

A multiplexing auxiliary PE and a semiconductor integrated circuit according to embodiments of the present invention will be described in detail below with reference to the accompanying drawings.

Figure 18:
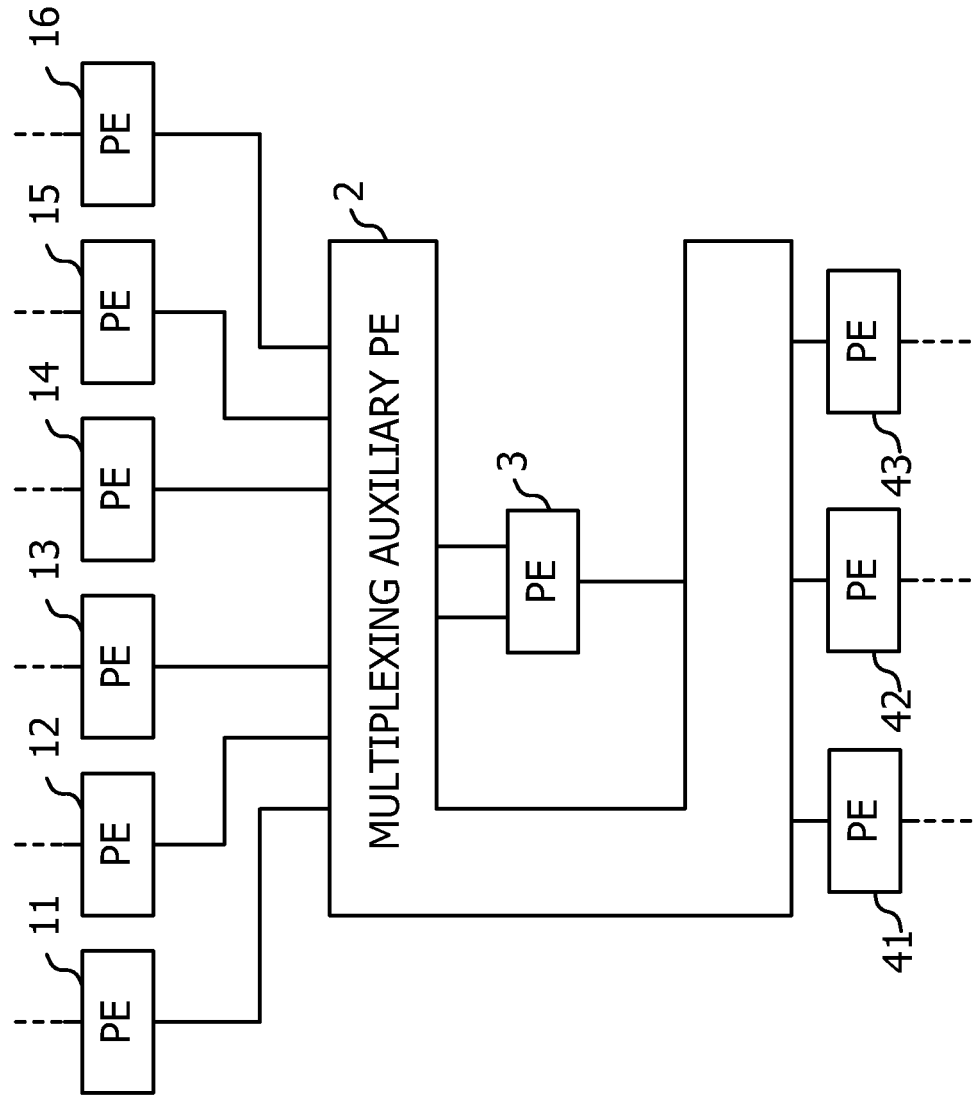
FIG. 18 is a block diagram schematically illustrating a semiconductor integrated circuit according to a first embodiment.

FIG. 18 is a block diagram schematically illustrating a semiconductor integrated circuit (dynamic reconfigurable circuit) according to a first embodiment in which a predetermined PE (3) is multiplexed and used for three pairs of input signals and the resultant data is allowed to flow downstream in the circuit.

Referring to FIG. 18, a pair of PEs 11 and 14, another pair of PEs 12 and 15, and another pair of PEs 13 and 16 are used as three pairs of input PEs (upstream PEs). A PE 2 is a multiplexing auxiliary PE. The PE 3 is a multiplex PE that is multiplexed and used. PEs 41 to 43 are output PEs (downstream PEs).

In this case, a first pair of input signals correspond to output signals of the PEs 11 and 14, a second pair of input signals correspond to output signals of the PEs 12 and 15, and a third pair of input signals correspond to output signals of the PEs 13 and 16.

In FIG. 18, although the multiplex PE 3 is illustrated as a single PE, the PE 3 actually includes, for example, a circuit including a plurality of PEs.

Figure 19:
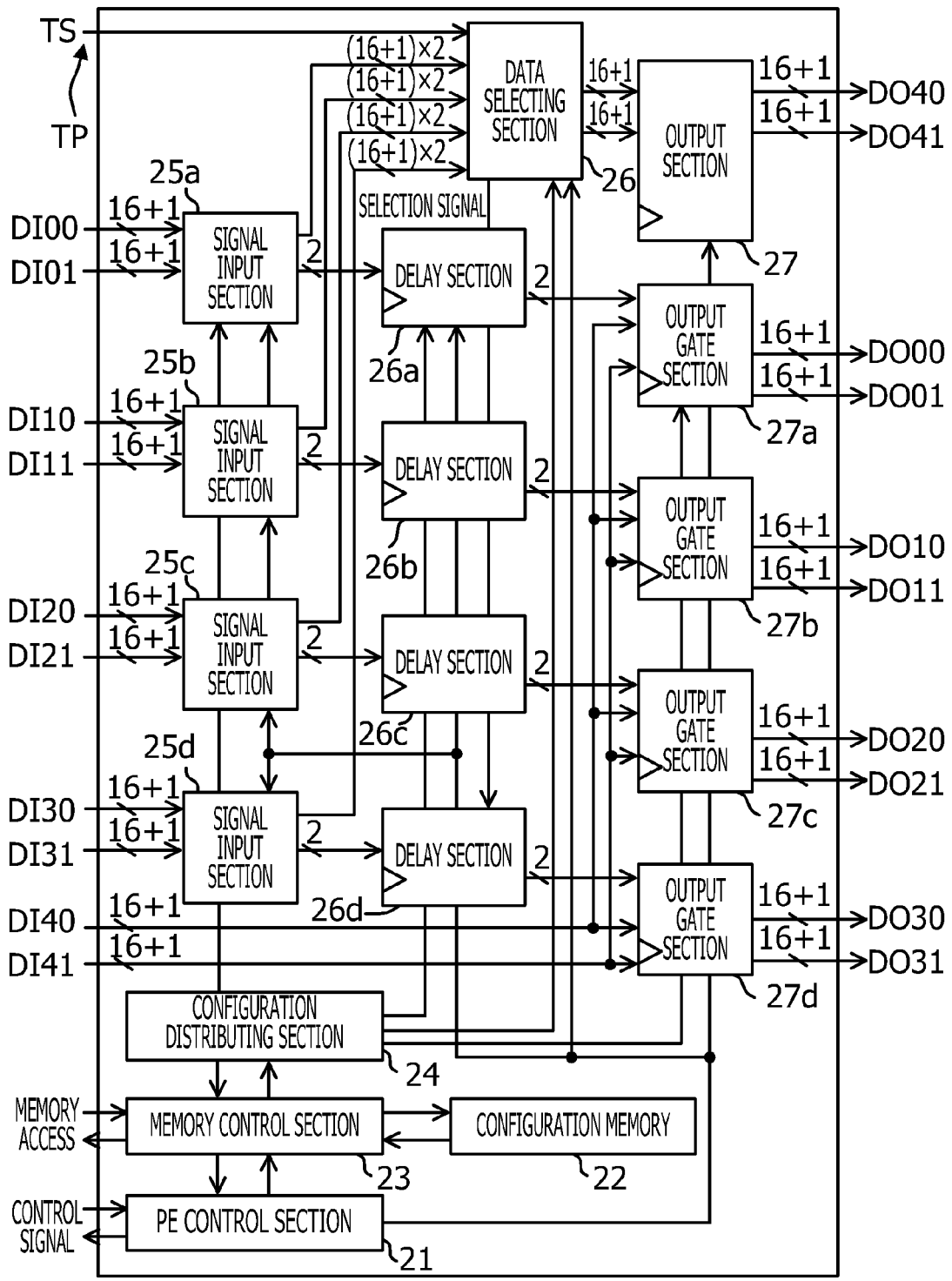
FIG. 19 is a block diagram illustrating a multiplexing auxiliary PE in the semiconductor integrated circuit of FIG. 18.

FIG. 19 is a block diagram illustrating the multiplexing auxiliary PE 2 in the semiconductor integrated circuit of FIG. 18.

Referring to FIG. 19, the multiplexing auxiliary PE 2 includes a PE control section 21, a configuration memory 22, a memory control section 23, a configuration distributing section 24, four signal input sections 25a to 25d, a data selecting section 26, and an output section 27.

The multiplexing auxiliary PE 2 further includes four delay sections 26a to 26d and four output gate sections 27a to 27d.

The PE control section 21, the configuration memory 22, the memory control section 23, the configuration distributing section 24, the signal input sections 25a to 25d, and the output section 27 correspond to the components described with reference to FIGS. 7 to 9.

Specifically, the PE control section 21 receives a control signal, serving as, for example, a reset instruction, an operation start/stop instruction, a suspend instruction, an instruction to specify a portion to be executed next in a configuration, or a memory read/write instruction, from a control unit that controls the entire dynamic reconfigurable circuit, and transmits the signal to a functional block in the PE.

The configuration memory 22 serves as a memory storing a plurality of PE configurations. Data may be read and written to/from the configuration memory 22 in accordance with instructions from the memory control section 23.

The memory control section 23 operates in response to an instruction from the PE control section 21. Specifically, when receiving an instruction to specify a portion to be executed next in a configuration from the PE control section 21, the memory control section 23 reads data relevant to the portion from the configuration memory 22 and transfers the data to the configuration distributing section 24.

When receiving a memory read/write instruction for memory access from the PE control section 21, the memory control section 23 receives or transmits data from/to the configuration memory 22 through a port for memory access to read or write data from/to the configuration memory 22.

The configuration distributing section 24 decodes configuration data received from the memory control section 23 and transmits the resultant signal to functional blocks.

The signal input sections 25a to 25d, whose operation is controlled by the PE control section 21, receive a configuration from the configuration distributing section 24 and determine whether to receive input signals DI00 to DI31 to be supplied to the PE.

In FIG. 19, for example, "16+1" assigned to each input signal line represents 16 bits of input data and one bit of a valid signal and "16+1" assigned to each output signal line represents 16 bits of output data and one bit of a valid signal.

Each of 2-bit data items before and after the delay sections 26a to 26d represents input or output of only valid signals of two data items.

The signal input sections 25a to 25d compare valid signals of the input signals DI00 to DI31 with signals given by the configuration distributing section 24. If a predetermined condition is satisfied, the signal input sections 25a to 25d supply the input data items as they are to the data selecting section 26. At this time, each of the signal input sections 25a to 25d supplies the combination of valid signals of two bits to the corresponding one of the delay sections 26a to 26d.

The data selecting section 26 is a component that selects any of signals to be supplied to the multiplexing circuit. As for a method of selection, various methods, e.g., a method of assigning fixed priorities to signals and a round-robin are available.

In the following description, a pipelined circuit mode described with reference to FIGS. 1 to 6 and an n-division selection mode (autonomous mode) for input of non-pipelined data described with reference to FIGS. 10 to 17 will be described. Which mode is executed is determined in accordance with a signal from the configuration distributing section 24.

The delay sections 26a to 26d receive signals from the PE control section 21, the configuration distributing section 24, and the data selecting section 26, delay the valid signals of the input signals, and supply the resultant signals to the output gate sections 27a to 27d, respectively.

The delay sections 26a to 26d delay the input valid signals by a cycle designated by the configuration distributing section 24 and transmit the resultant signals to the output gate sections 27a to 27d, respectively.

Specifically, the delay sections 26a to 26d receive a selection signal from the data selecting section 26 at the same cycle as that of input of the valid signals. In each of the delay sections 26a to 26d, when a channel relevant to the delay section is not selected, the delay section invalidates both of the valid signals and then delays the invalid signals.

To start a configuration program, all of registers for valid signals are reset and the program is then started.

The output section 27 receives a signal from the PE control section 21, controls the signals (each including data of 16 bits and a valid signal of one bit) supplied from the data selecting section 26, and outputs the signals as output signals DO40 and DO41, serving as input signals of the PE 3.

Specifically, in the output section 27, data items transmitted from the data selecting section 26 are input to the registers every cycle and the data items are output as output signals DO40 and DO41.

The output gate sections 27a to 27d receive input signals DI40 and DI41, serving as output signals of the PE 3, and output signals of the respective delay sections 26a to 26d, and output output signals DO00 to DO31 in accordance with signals from the PE control section 21 and the configuration distributing section 24.

The multiplexing auxiliary PE 2 in FIG. 19 may singly support quadruple multiplexing. The number of inputs and that of outputs of the multiplex PE 3 are each up to two. The multiplexing auxiliary PE 2 is coupled to the multiplex PE 3 through signals (ports) DI40, DI41, DO40, and DO41.

Input data items, which are to be processed by the PE 3, supplied from the three pairs of upstream PEs, namely, the first pair of the PEs 11 and 14, the second pair of the PEs 12 and 15, and the third pair of the PEs 13 and 16 are supplied as pairs of input signals, namely, the signals DI00 and DI01, the signals DI10 and DI11, and the signals DI20 and DI21 to the signal input sections 25a to 25c, respectively.

Output signals, processed by the PE 3, are supplied as output signals DO00, DO10, and DO20 to the three downstream PEs 41, 42, and 43, respectively.

A timing port TP is used to receive a timing signal TS for operation start from another PE when, for example, non-pipelined data described with reference to FIGS. 10 to 17 is processed, i.e., the data selecting section 26 operates in the autonomous mode. The timing signal TS corresponds to an input signal supplied from the counter PE 280 in FIG. 10.

In the mode for processing non-pipelined data, the multiplexing auxiliary PE 2 behaves in the same manner as that in the pipelined circuit mode until whether valid signals are received is determined.

Only when valid signals are received, the valid signals and output data items in the output gate sections 27a to 27d are updated. Otherwise, the signals and output data items are not updated. The output data items are output as output signals DO00 to DO31.

The above-described two modes will now be described. The pipelined circuit mode will be described with reference to FIGS. 20 to 24 and the n-division selection mode for input of non-pipelined data will be described with reference to FIGS. 25 to 29.

FIGS. 20 to 24 are diagrams explaining an exemplary operation of the multiplexing auxiliary PE illustrated in FIG. 19 and illustrate the operation when the circuit is used as a pipelined dynamic reconfigurable circuit described with reference to FIGS. 1 to 6.

In the pipelined circuit mode, when receiving a valid signal from the signal input sections 25a to 25d, the data selecting section 26 outputs the signal as it is to the output section 27 an transmits a signal to select a channel relevant to the valid signal to the delay sections 26a to 26d.

Figure 20:
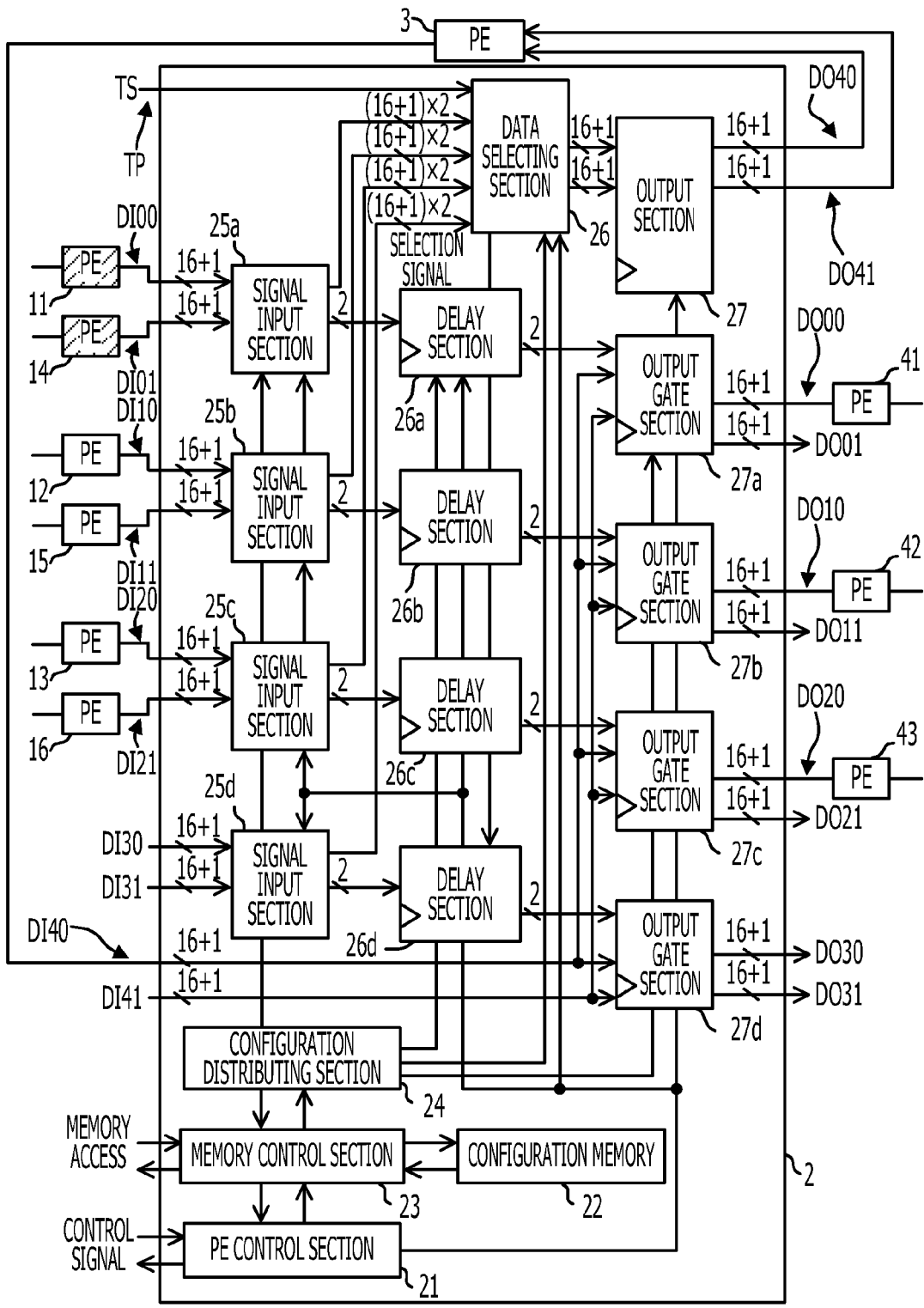
FIG. 20 is a first diagram explaining an exemplary operation of the multiplexing auxiliary PE of FIG. 19.

Specifically, as illustrated in FIG. 20, at a first cycle of a clock, signals are output from the first pair of the PEs 11 and 14.

Figure 21:
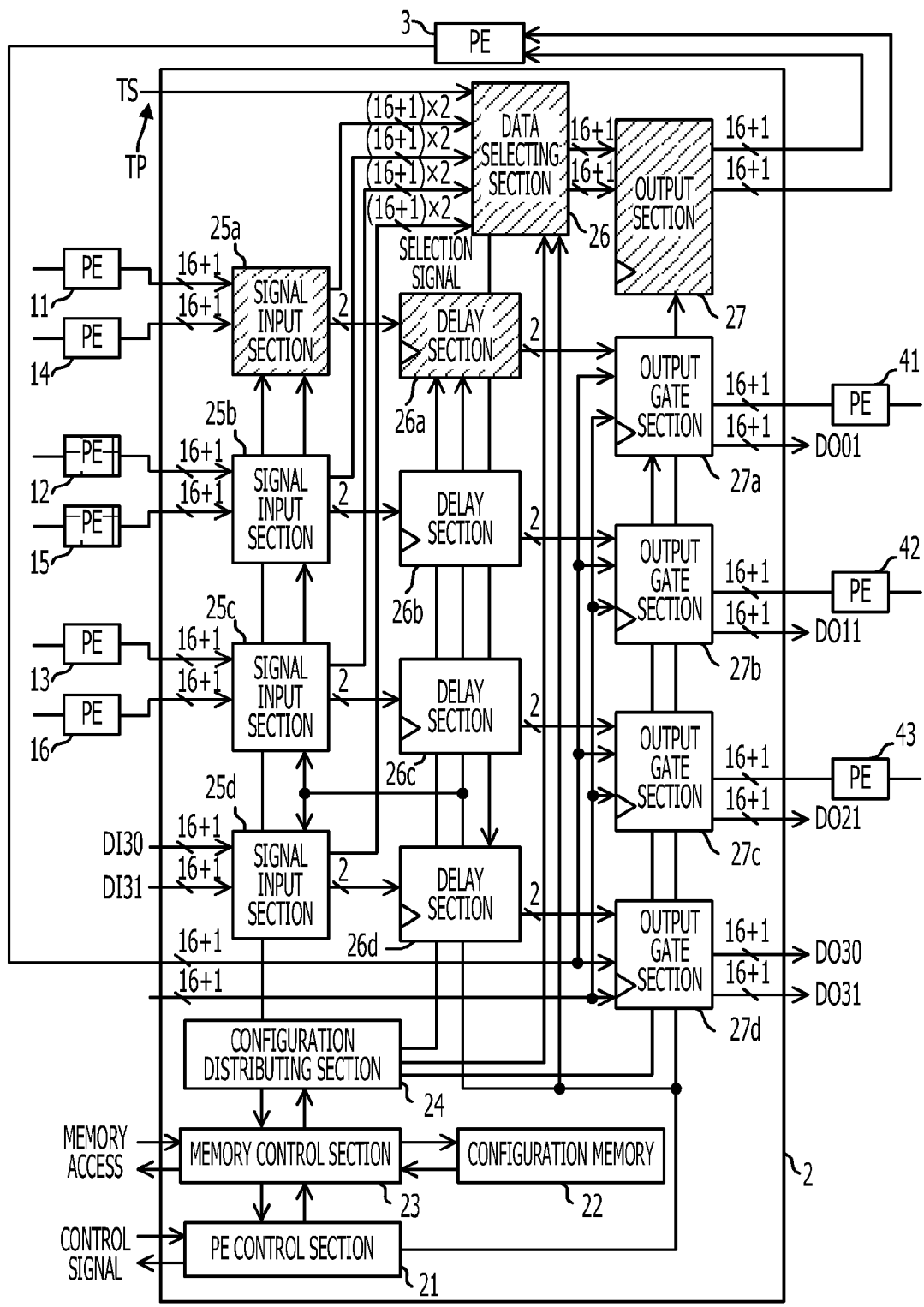
FIG. 21 is a second diagram explaining the exemplary operation of the multiplexing auxiliary PE of FIG. 19.

As illustrated in FIG. 21, at a second cycle of the clock, the output signals of the first pair of the PEs 11 and 14 are input to the output section 27 through the corresponding signal input section 25a and the data selecting section 26 and are also input to the delay section 26a through the signal input section 25a. At this time, signals are output from the second pair of the PEs 12 and 15.

Specifically, at the second cycle of the clock, data items and valid signals of the first pair of the PEs 11 and 14 are input to the output section 27 through the signal input section 25a and the data selecting section 26.

The valid signals of the first pair of the PEs 11 and 14 are input to the delay section 26a through the signal input section 25a.

Figure 22:
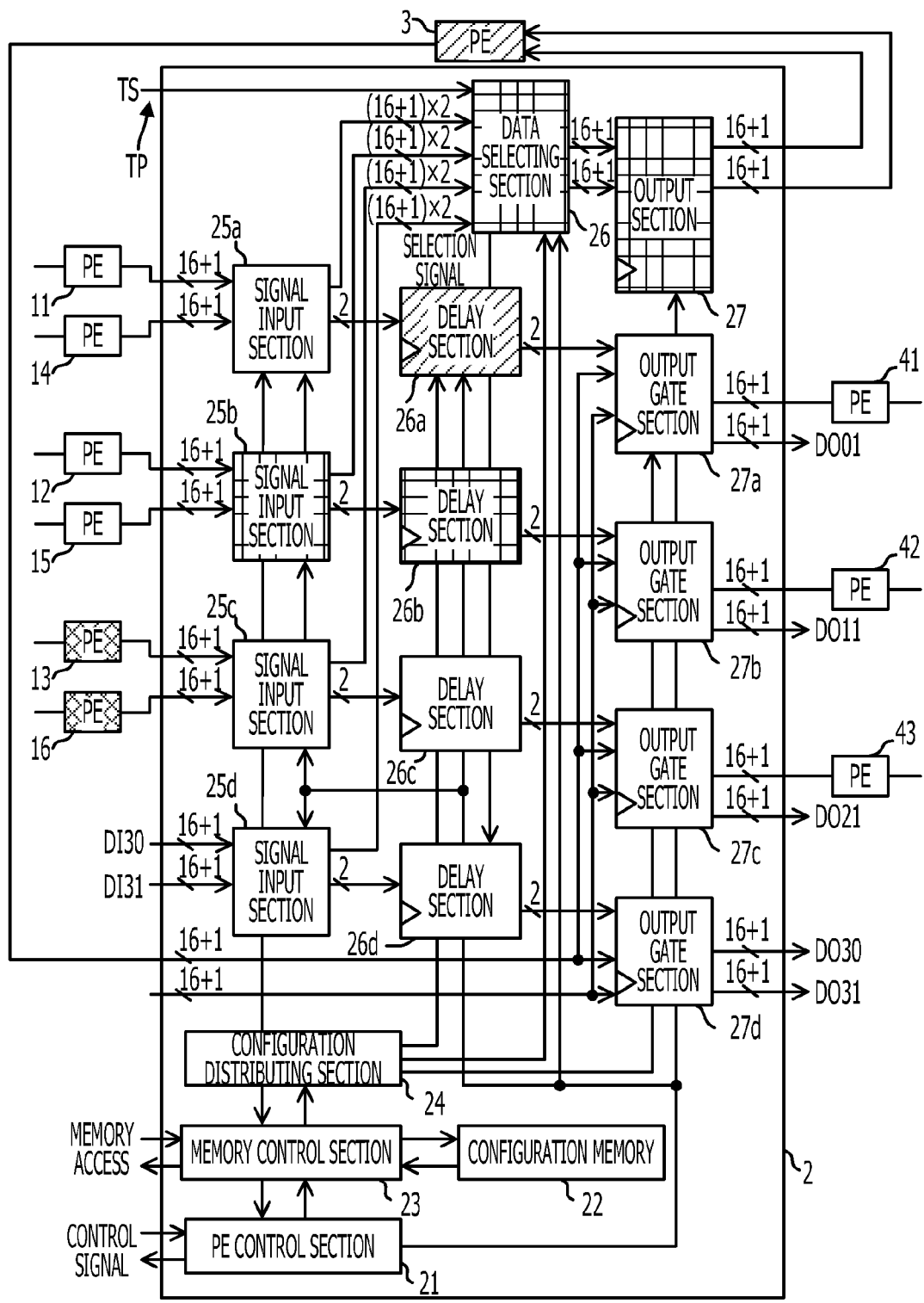
FIG. 22 is a third diagram explaining the exemplary operation of the multiplexing auxiliary PE of FIG. 19.

As illustrated in FIG. 22, at a third cycle of the clock, the output signals of the first pair of the PEs 11 and 14 in the output section 27 are supplied to the multiplex PE 3, so that the signals are subjected to a predetermined process.

At this time, the output signals of the second pair of the PEs 12 and 15 are input through the corresponding signal input section 25b and the data selecting section 26 to the output section 27 and are also input through the signal input section 25b to the delay section 26b. At this time, signals are output from the third pair of the PEs 13 and 16.

The valid signals input from the first pair of the PEs 11 and 14 to the delay section 26a are held as they are.

Figure 23:
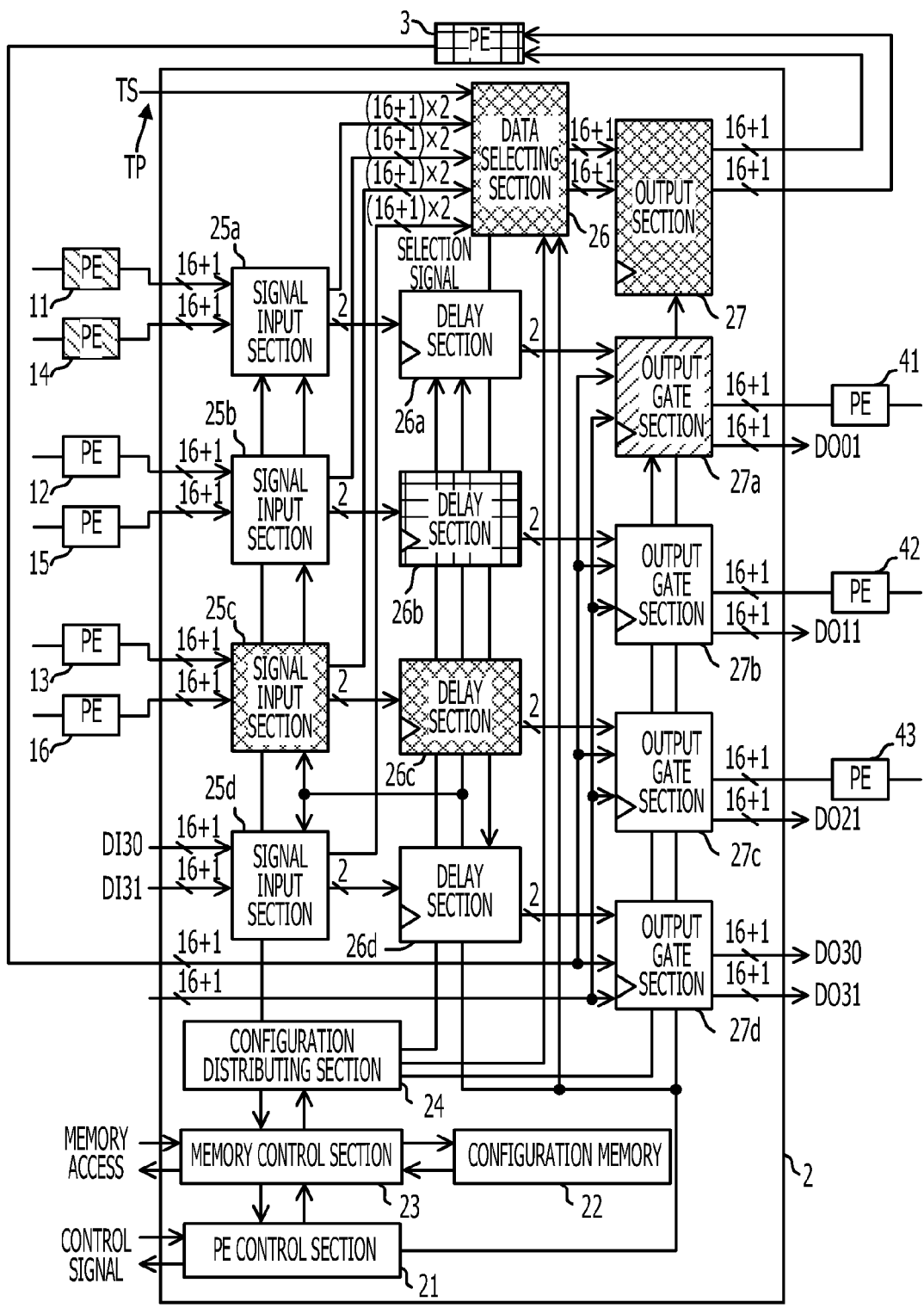
FIG. 23 is a fourth diagram explaining the exemplary operation of the multiplexing auxiliary PE of FIG. 19.

After that, as illustrated in FIG. 23, at a fourth cycle of the clock, the first pair of output signals (processed signals) subjected to the predetermined process by the PE 3 are input to the output gate section 27a in accordance with the valid signals input from the first pair of the PEs 11 and 14 to the delay section 26a.

At this time, the signals input from the second pair of the PEs 12 and 15 to the output section 27 are supplied to the multiplex PE 3, so that the signals are subjected to the predetermined process.

The output signals of the third pair of the PEs 13 and 16 are input through the corresponding signal input section 25c and the data selecting section 26 to the output section 27 and are also input through the signal input section 25c to the delay section 26c.

At this time, processing is again performed in the first pair of the PEs 11 and 14. In addition, the valid signals input from the second pair of the PEs 12 and 15 to the delay section 26b are held as they are.

Figure 24:
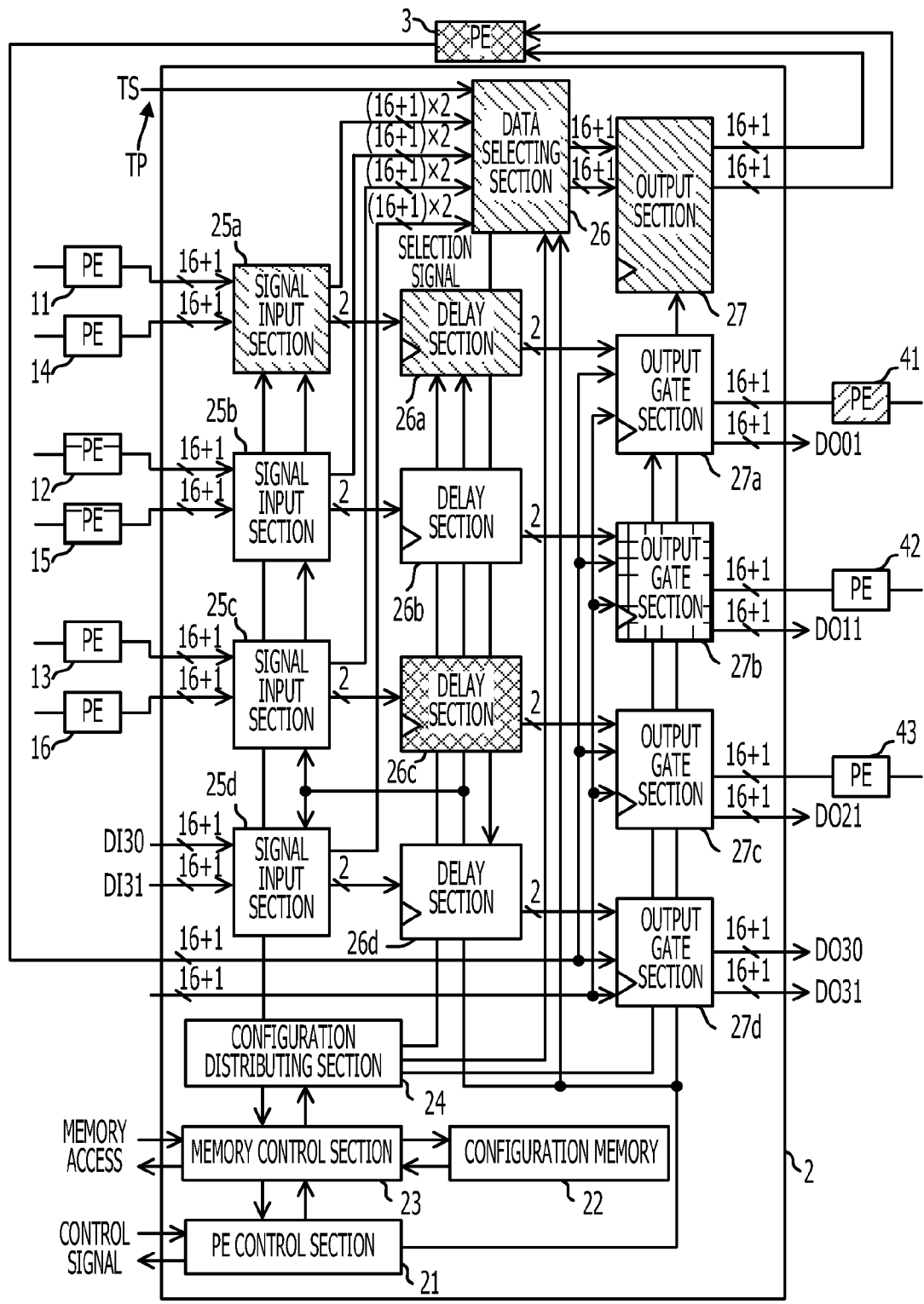
FIG. 24 is a fifth diagram explaining the exemplary operation of the multiplexing auxiliary PE of FIG. 19.

As illustrated in FIG. 24, at a fifth cycle of the clock, the first pair of processed signals in the output gate section 27a are supplied to the downstream PE 41.

At this time, the second pair of processed signals subjected to the predetermined process by the PE 3 are input to the output gate section 27b in accordance with the valid signals input from the second pair of the PEs 12 and 15 to the delay section 26b.

The signals input from the third pair of the PEs 13 and 16 to the output section 27 are supplied to the multiplex PE 3, so that the signals are subjected to the predetermined process.

Signals output from the first pair of the PEs 11 and 14 are again input through the corresponding signal input section 25a and the data selecting section 26 to the output section 27 and are also input through the signal input section 25a to the delay section 26a.

Processing is again performed in the second pair of the PEs 12 and 15. The valid signals input from the third pair of the PEs 13 and 16 to the delay section 26c are held as they are.

By repeating the above-described process, the signals supplied from the three pairs of PEs, namely, the first pair of the PEs 11 and 14, the second pair of the PEs 12 and 15, and the third pair of the PEs 13 and 16 are sequentially subjected to the predetermined process by the PE 3 and the resultant signals are supplied to the downstream PEs 41, 42, and 43.

FIGS. 25 to 29 are diagrams explaining another exemplary operation of the multiplexing auxiliary PE illustrated in FIG. 19 and illustrates the operation when the circuit is used as a non-pipelined dynamic reconfigurable circuit described with reference to FIGS. 10 to 17.

The n-division selection mode for input of non-pipelined data includes sub-modes for operation start.

One of them is a sub-mode in which the operation is started simultaneously with the start of a configuration program. The other one is a sub-mode in which the operation is started when a timing signal TS is received through the timing port TP.

After the operation is started in any of the sub-modes, a channel to be selected is sequentially shifted in the order from 0 to n. In this case, n is any of 0 to 3 and is set by the configuration distributing section 24. After n is selected, the selected channel is returned to 0. In the case illustrated in FIGS. 25 to 29, n=3.

The time (the number of cycles) during which each channel is selected is set by the configuration distributing section 24. Data indicating which signal is selected is transmitted as a selection signal from the configuration distributing section 24 to the delay sections 26a to 26d.

When valid data is received through the selected channel, the data is transmitted to the output section 27. If valid data is not input, invalid data is transmitted to the output section 27.

Figure 25:
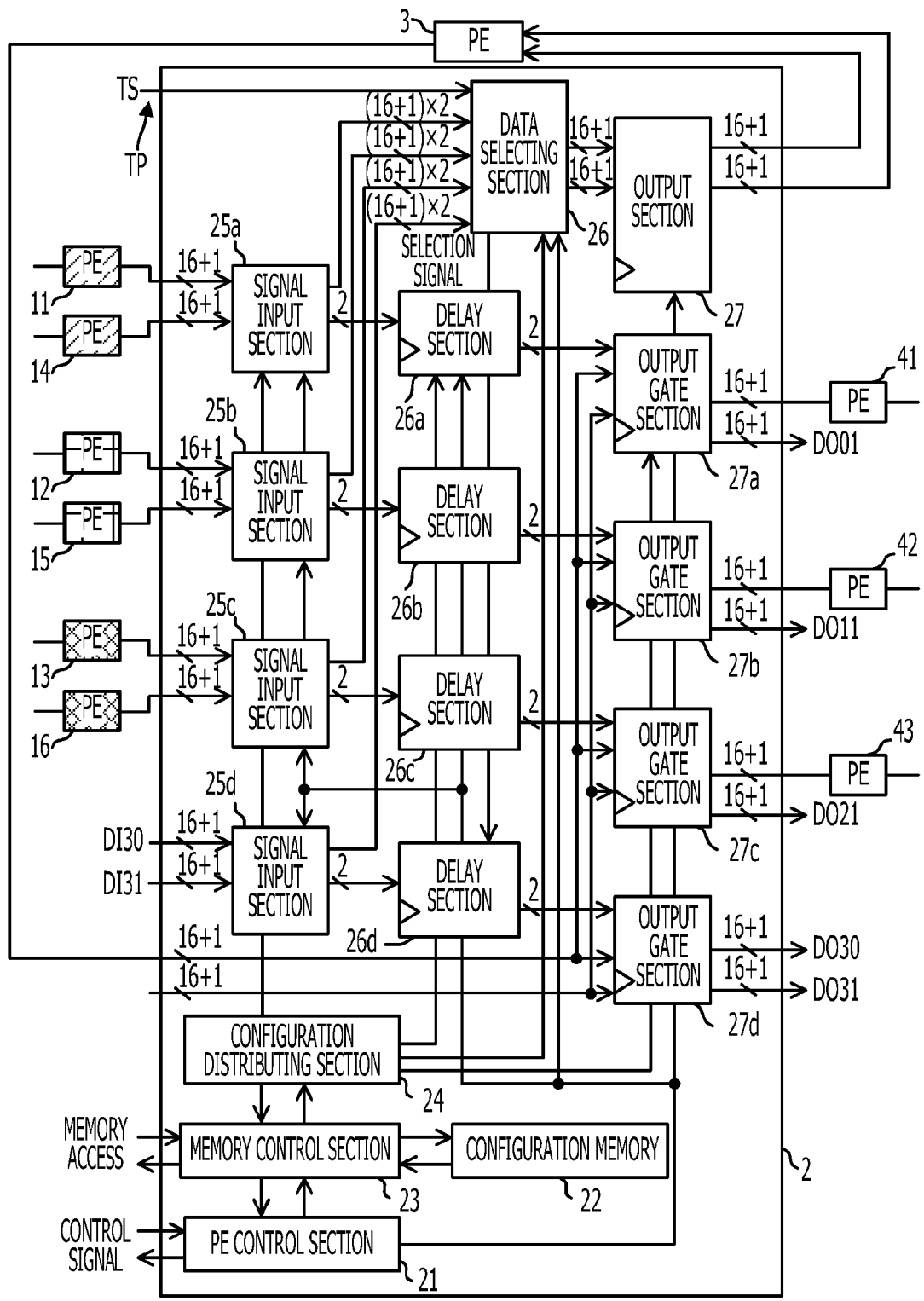
FIG. 25 is a first diagram explaining another exemplary operation of the multiplexing auxiliary PE of FIG. 19.

Specifically, as illustrated in FIG. 25, at a first cycle of a clock, signals are output from the first pair of the PEs 11 and 14, the second pair of the PEs 12 and 15, and the third pair of the PEs 13 and 16.

Figure 26:
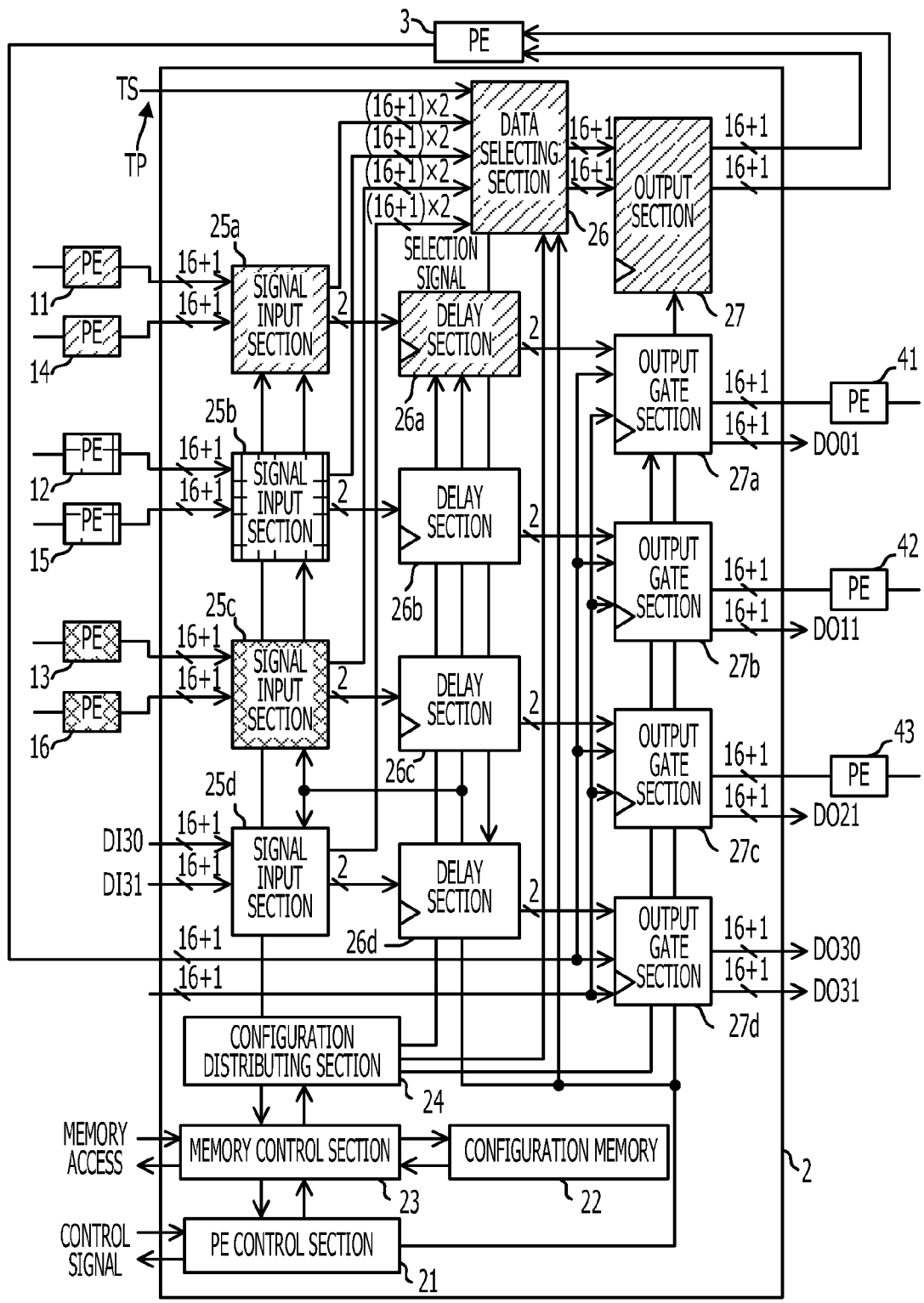
FIG. 26 is a second diagram explaining the other exemplary operation of the multiplexing auxiliary PE of FIG. 19.

As illustrated in FIG. 26, at a second cycle of the clock, the signals, including data and valid signals, of the first pair of the PEs 11 and 14 are input through the signal input section 25a and the data selecting section 26 to the output section 27 in accordance with a signal from the configuration distributing section 24.

At this time, the valid signals of the first pair of the PEs 11 and 14 are input through the signal input section 25a to the delay section 26a.

In addition, the signals, including data and valid signals, of the second pair of the PEs 12 and 15 and those of the third pair of the PEs 13 and 16 are input to the signal input sections 25b and 25c, respectively.

Figure 27:
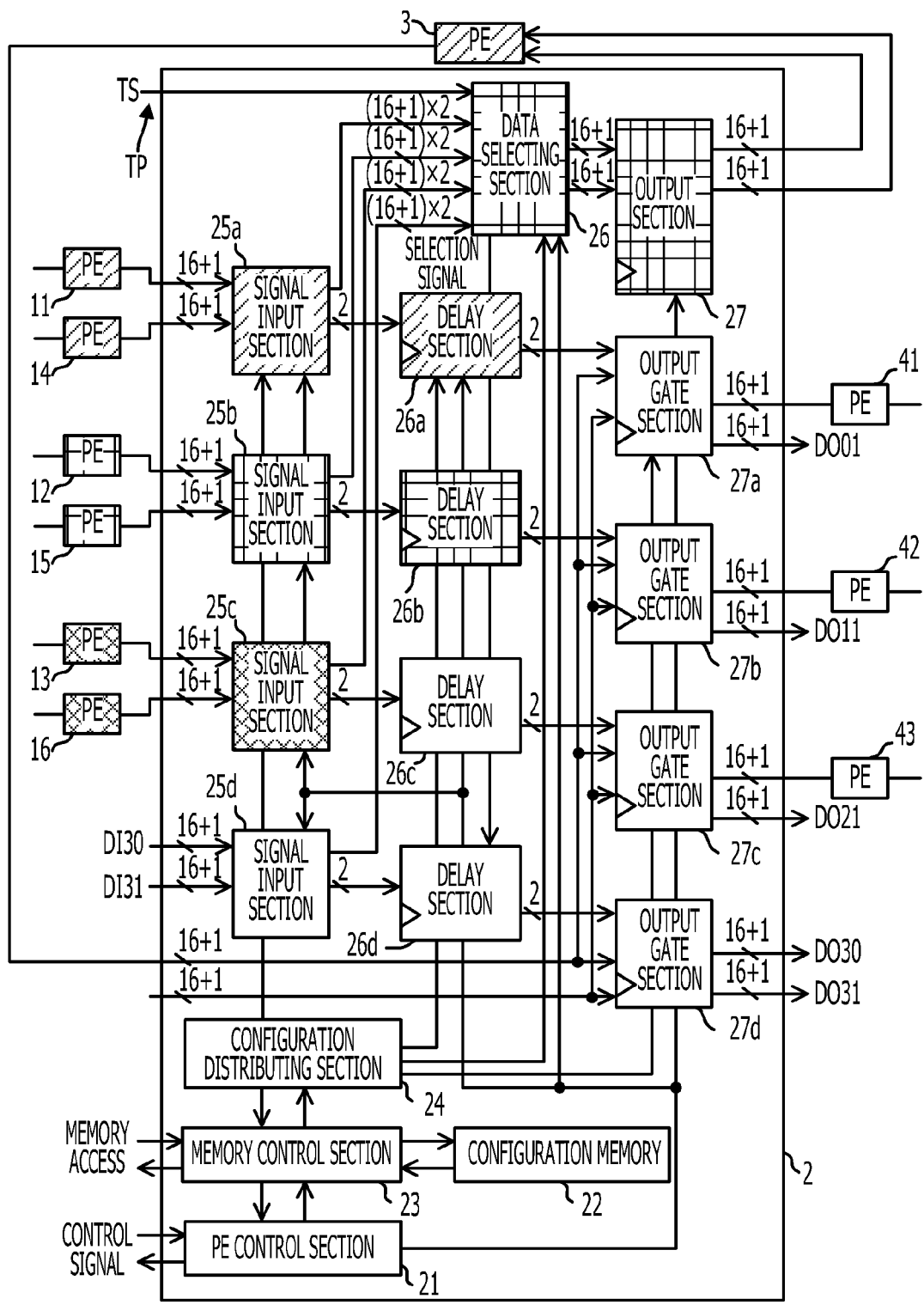
FIG. 27 is a third diagram explaining the other exemplary operation of the multiplexing auxiliary PE of FIG. 19.

As illustrated in FIG. 27, at a third cycle of the clock, the output signals (the data and the valid signals) of the first pair of the PEs 11 and 14 are supplied to the multiplex PE 3, so that the signals are subjected to a predetermined process.

At this time, the data and the valid signals of the second pair of the PEs 12 and 15 are input through the signal input section 25b and the data selecting section 26 to the output section 27 in accordance with a signal from the configuration distributing section 24.

In addition, the valid signals of the second pair of the PEs 12 and 15 are input through the signal input section 25b to the delay section 26b. At this time, the data and valid signals of the third pair of the PEs 13 and 16 have been input in the signal input section 25c and those of the first pair of the PEs 11 and 14 are input to the signal input section 25a.

Figure 28:
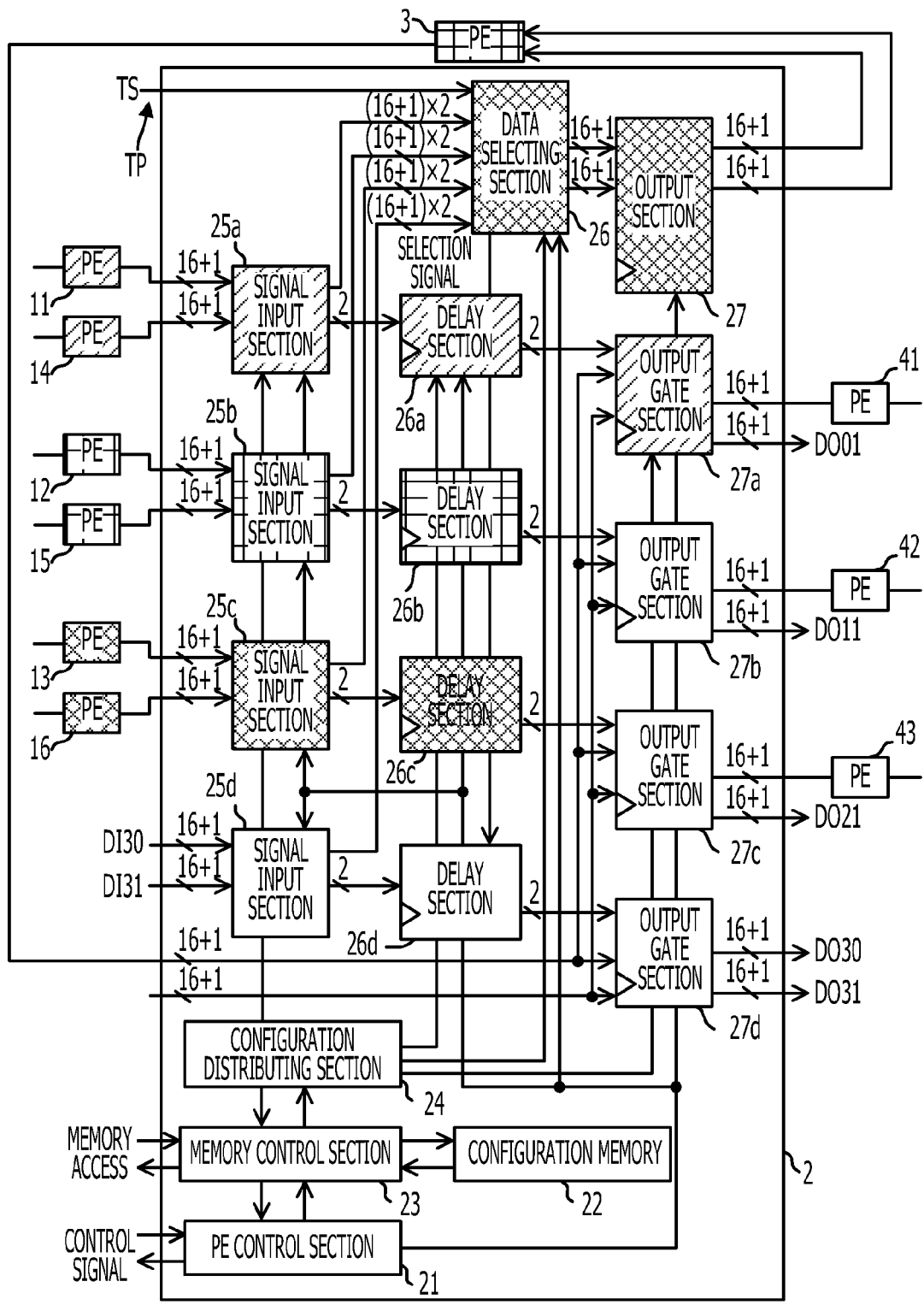
FIG. 28 is a fourth diagram explaining the other exemplary operation of the multiplexing auxiliary PE of FIG. 19.

After that, as illustrated in FIG. 28, at a fourth cycle of the clock, the first pair of output signals (processed signals) subjected to the predetermined process by the PE 3 are input to the output gate section 27a in accordance with the valid signals input from the first pair of the PEs 11 and 14 to the delay section 26a.

At this time, the output signals of the second pair of the PEs 12 and 15 in the output section 27 are supplied to the multiplex PE 3, so that the signals are subjected to the predetermined process.

In addition, the data and the valid signals of the third pair of the PEs 13 and 16 are input through the signal input section 25c and the data selecting section 26 to the output section 27 in accordance with a signal from the configuration distributing section 24.

Furthermore, the valid signals of the third pair of the PEs 13 and 16 are input through the signal input section 25c to the delay section 26c. At this time, the data and the valid signals of the first pair of the PEs 11 and 13 have been input in the signal input section 25a and those of the second pair of the PEs 12 and 14 are input to the signal input section 25b.

Figure 29:
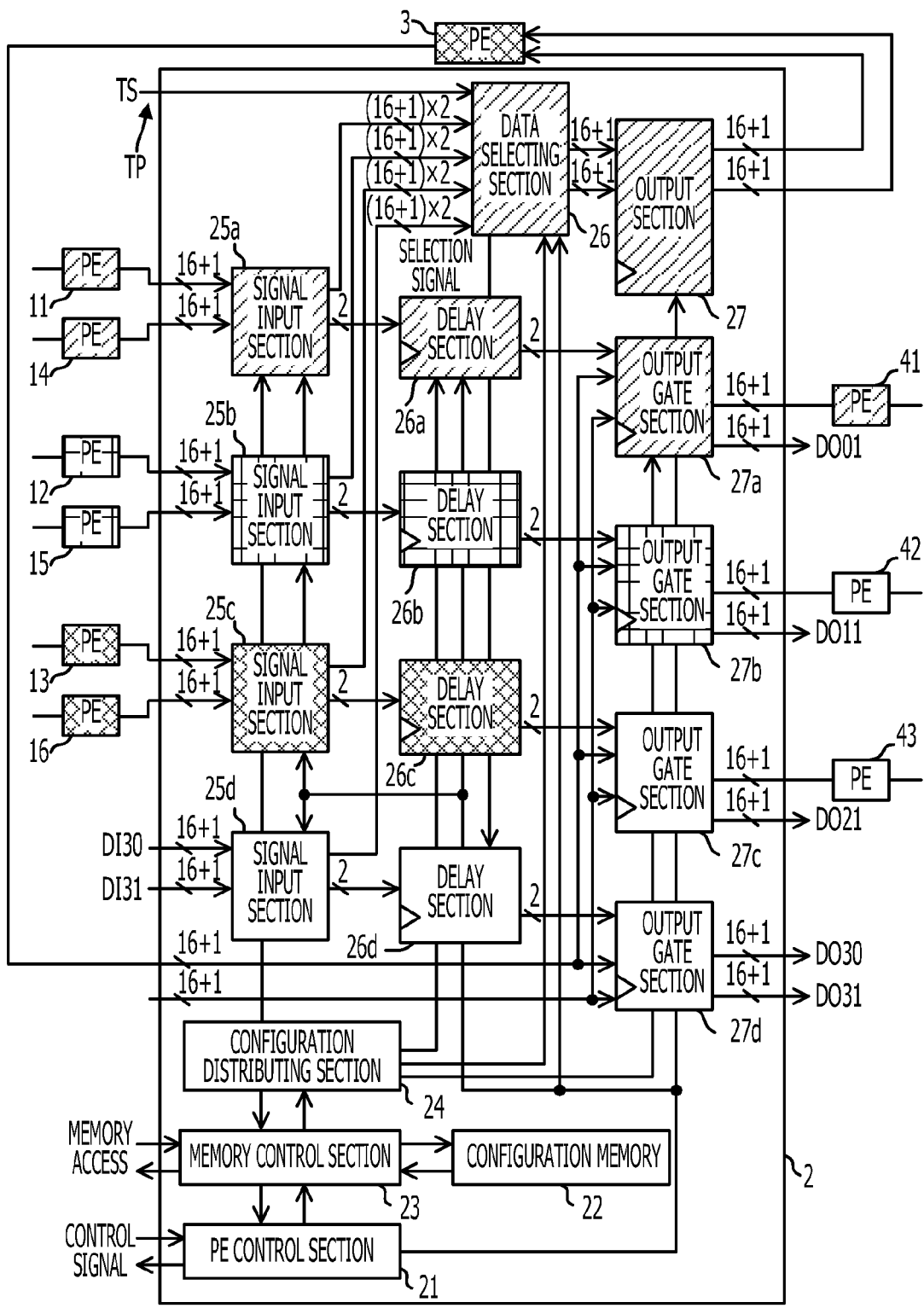
FIG. 29 is a fifth diagram explaining the other exemplary operation of the multiplexing auxiliary PE of FIG. 19.

As illustrated in FIG. 29, at a fifth cycle of the clock, the first pair of processed signals in the output gate section 27a are supplied to the downstream PE 41.

At this time, the second pair of processed signals subjected to the predetermined process by the PE 3 are input to the output gate section 27b in accordance with the valid signals input from the second pair of the PEs 12 and 15 to the delay section 26b.

In addition, the output signals of the third pair of the PEs 13 and 16 in the output section 27 are supplied to the multiplex PE 3, so that the signals are subjected to the predetermined process.

Furthermore, the data and the valid signals of the first pair of the PEs 11 and 14 are again input through the signal input section 25a and the data selecting section 26 to the output section 27 in accordance with a signal from the configuration distributing section 24.

In addition, the valid signals of the first pair of the PEs 11 and 14 are input through the signal input section 25a to the delay section 26a. At this time, the data and the valid signals of the second pair of the PEs 12 and 14 have been input in the signal input section 25b and those of the third pair of the PEs 13 and 16 are input to the signal input section 25c.

By repeating the above-described process, the signals of the three pairs of PEs, namely, the first pair of the PEs 11 and 14, the second pair of the PEs 12 and 15, and the third pair of the PEs 13 and 16 are sequentially subjected to the predetermined process by the multiplex PE 3 and are then supplied to the downstream PEs 41, 42, and 43.

In the non-pipelined dynamic reconfigurable circuit described with reference to FIGS. 25 to 29, the functions of the gate PEs 271 to 276 and those of the converging PEs 221 and 222 on the input side of the circuit described with reference to FIGS. 10 to 17 may be executed for one cycle. Furthermore, the functions of the gate PEs 251 to 253 and those of the register PEs 291 to 293 on the output side of the circuit may also be executed for one cycle. Accordingly, processing may be performed for fewer numbers of cycles.

In the above-described embodiment described with reference to FIGS. 20 to 24 and FIGS. 25 to 29, the difference between the input timing and the output timing of the multiplexing circuit (multiplexing auxiliary PE) is determined depending on the multiplex PE (or circuit connected to the dynamic reconfigurable circuit).

In addition, multiplexed inputs and outputs are processed by a single PE (multiplexing auxiliary PE) and output timing is generated on the basis of input signals inside the PE. Consequently, for example, the timing PEs 161 to 163 for timing generation necessary for the dynamic reconfigurable circuit in FIG. 1 may be omitted.

For comparison between portions including delay devices (delay elements included in the timing PEs), the circuit of FIG. 1 requires a delay device having a delay time corresponding to the length of data for the PE, whereas the dynamic reconfigurable circuit in the present embodiment uses the delay devices having a delay time corresponding to one bit per input.

In addition, the difference between the input timing and the output timing is common among the channels. In the multiplexing auxiliary PE in the present embodiment, therefore, a single timing configuration is used to reduce the configuration memories and configuration distributing sections for timing.

Furthermore, the converging PEs 121 and 122, the gates PEs 151 to 153, and the register PE on the output side in FIG. 1 are integrated to reduce circuit components corresponding to the control sections and the configuration distributing sections.

In addition, the converging PEs and the gate PEs on the output side in FIG. 1 are integrated and timing is internally generated, thus reducing comparators in the gate elements.

The above-described dynamic reconfigurable circuit of FIG. 10 includes the general counter PE and the general gate PEs, in each of which the gate is opened or closed in accordance with a counter value. In order to freely set a value in such general PEs, for example, each PE requires a configuration memory using 16 bits per context.

In other words, the dynamic reconfigurable circuit of FIG. 10 requires memories using 64 bits or more per context.

Whereas, in the multiplexing auxiliary PE in the dynamic reconfigurable circuit according to the present embodiment, for example, up to 16 multiplexed inputs may be supported using three bits per input system, i.e., 12 bits in total.

Consequently, the dynamic reconfigurable circuit according to the present embodiment may reduce configuration memories. Furthermore, since the multiplexing auxiliary PE includes circuit components with a smaller number of bits than the counter and the comparators of the gate PEs, a logic circuit may also be reduced in size.

Figure 30:
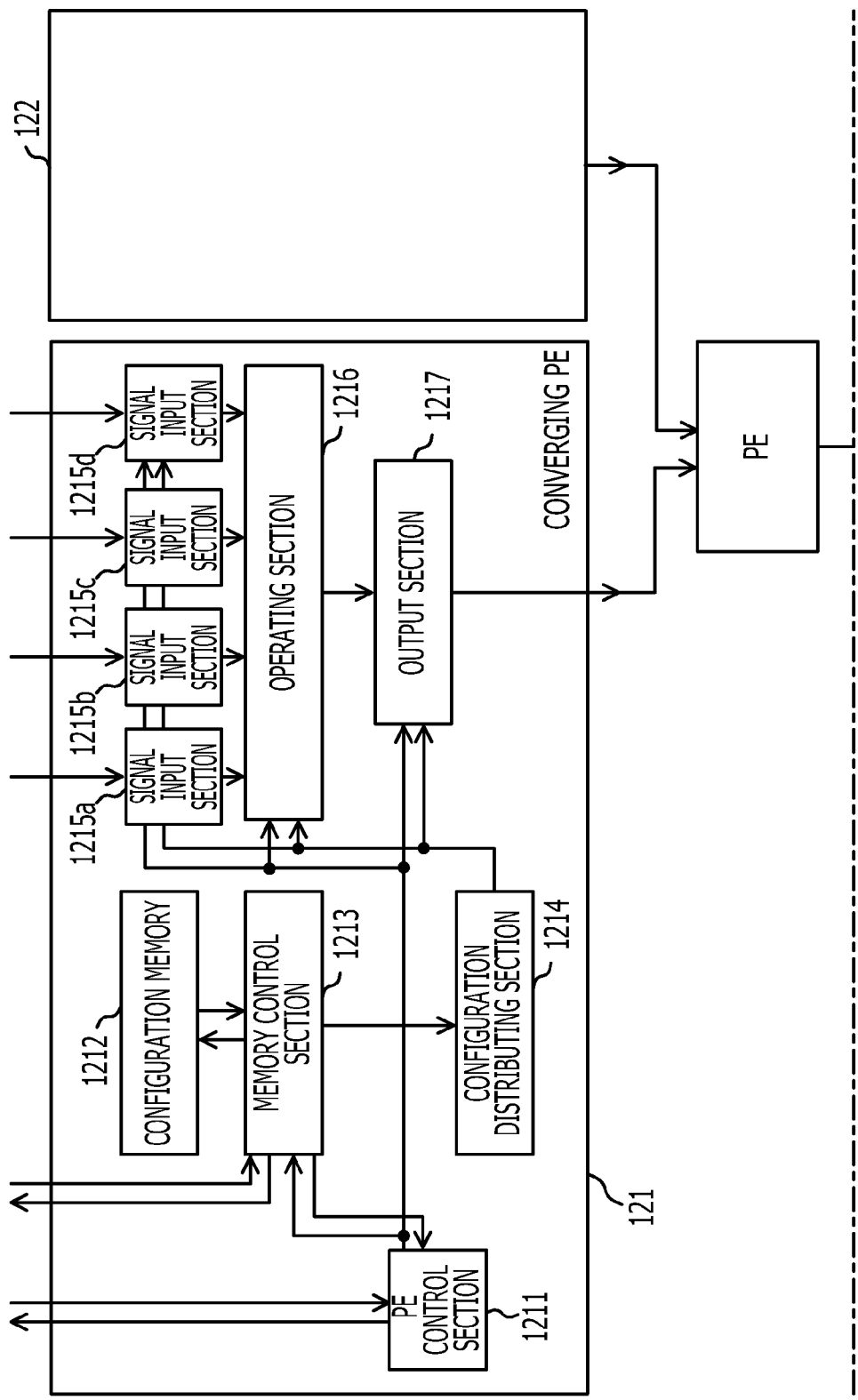
FIG. 30 is a first segment of a block diagram illustrating a portion including the converging PEs, a multiplex PE, timing PEs, and gate PEs in the semiconductor integrated circuit of FIG. 1 in association with FIG. 19.
Figure 31:
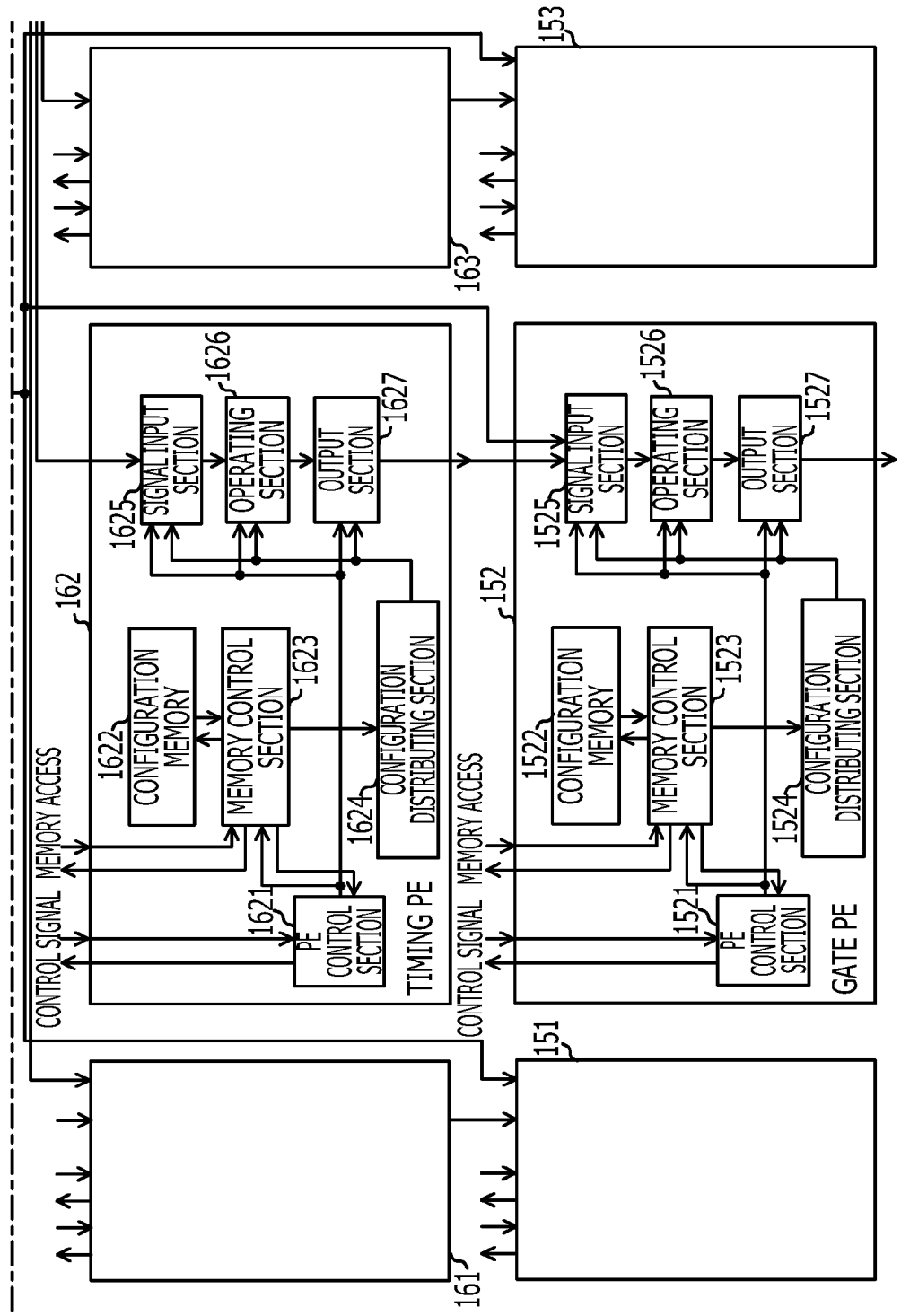
FIG. 31 is a second segment of the block diagram illustrating the portion including the converging PEs, the multiplex PE, the timing PEs, and the gate PEs in the semiconductor integrated circuit of FIG. 1 in association with FIG. 19.

FIGS. 30 and 31 are first and second segments of a block diagram illustrating a portion including the converging PEs 121 and 122, the multiplex PE 130, the timing PEs 161 to 163, and the gate PEs 151 to 153 in the semiconductor integrated circuit (dynamic reconfigurable circuit) of FIG. 1 in association with FIG. 19 and illustrate functional blocks corresponding to those of the multiplexing auxiliary PE of FIG. 19.

The converging PE 122 has the same structure as that of the converging PE 121. The timing PEs 161 and 163 have the same structure as that of the timing PE 162. The gate PEs 151 and 153 have the same structure as that of the gate PE 152.

Referring to FIG. 30, the converging PE 121 (122) includes the PE control section 1211, the configuration memory 1212, the memory control section 1213, the configuration distributing section 1214, the signal input sections 1215a to 1215d, the operating section 1216, and the output section 1217.

Referring to FIG. 31, the timing PE 162 (161, 163) includes a PE control section 1621, a configuration memory 1622, a memory control section 1623, a configuration distributing section 1624, a signal input section 1625, an operating section 1626, and an output section 1627.

Furthermore, as illustrated in FIG. 31, the gate PE 152 (151, 153) includes a PE control section 1521, a configuration memory 1522, a memory control section 1523, a configuration distributing section 1524, a signal input section 1525, an operating section 1526, and an output section 1527.

The multiplexing auxiliary PE 2 illustrated in FIG. 19 may achieve a remarkable reduction in circuit scale as compared with a circuit portion including the converging PEs 121 and 122, the timing PEs 161 to 163, and the gate PEs 151 to 153 and corresponding to the multiplexing auxiliary PE 2, illustrated in FIGS. 30 and 31.

As for the circuit scale, assuming that the circuit scale of the combination of the PE control section and the configuration distributing section is "1", the circuit scale of the counter PE is estimated to be "16", that of the timing PE is estimated to be "6", that of the converging PE is estimated to be "11", that of the register PE is estimated to be "9", and that of the gate PE is estimated to be approximately "4". Each value does not include the circuit scale of the configuration memory and that of the memory control section.

As for a configuration per context, a configuration for the counter PE is estimated to be "18", that for the timing PE is estimated to be "17", that for the converging PE is estimated to be "5", that for the register PE is estimated to be "18", and that for the gate PE is estimated to be "2".

Specifically, assuming that the circuit has 4×2 inputs and 4×1 outputs, the circuit scale may be reduced from approximately "147" that is the circuit scale of the dynamic reconfigurable circuit in FIG. 1 to "124" that is the circuit scale in the present embodiment.

Furthermore, the number of configuration bits may be reduced from 192 bits related to the dynamic reconfigurable circuit in FIG. 1 to 36 bits in the present embodiment. In addition, the memory control sections are estimated to have substantially the same size in any PE. In the present embodiment, the circuit scale may be reduced as the number of PEs is reduced.

In the above-described estimation, it is assumed that a PE designed specifically for each function is formed. It is conceivable that a multi-function PE having a scale of "20" or more is actually used in order to increase the usage rate of the PE.

In this case, one PE may have a configuration of approximately 22 bits or more per context. In this instance, since the original circuit scale is approximately "460" or more and a configuration is approximately 500 bits or more, the circuit scale may be remarkably reduced using the dynamic reconfigurable circuit according to the present embodiment.

In a second embodiment which will be described in detail below, the circuit scale may be reduced and PEs may be more efficiently used by reducing the number of PEs used.

Figure 32:
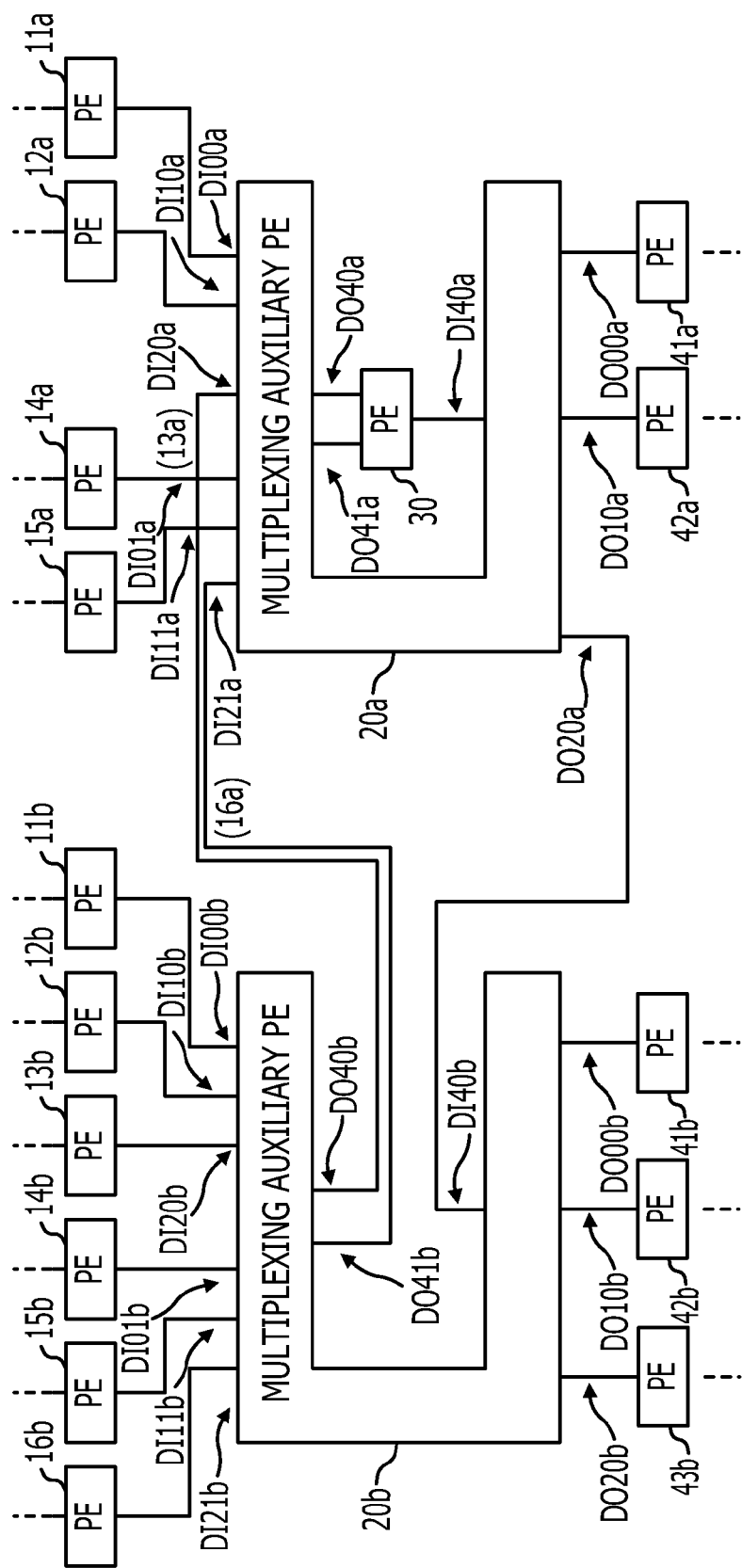
FIG. 32 is a block diagram schematically illustrating a semiconductor integrated circuit according to a second embodiment.

FIG. 32 is a block diagram schematically illustrating a semiconductor integrated circuit according to the second embodiment.

In the semiconductor integrated circuit (dynamic reconfigurable circuit) according to the second embodiment, pipelined data and non-pipelined data mixedly exist and multiplexing auxiliary PEs are multiplexed and used.

Specifically, the dynamic reconfigurable circuit according to the second embodiment includes two multiplexing auxiliary PEs (20a, 20b) similar to the multiplexing auxiliary PE in FIG. 19. The latency of a PE 30 is given by the configuration of the multiplexing auxiliary PE 20a and the sum of the latency of the PE 30 and that of the PE 20a is given by the configuration of the PE 20b.

Referring to FIG. 32, a first pair of PEs 11a and 14a, a second pair of PEs 12a and 15a, a third pair of PEs 11b and 14b, a fourth pair of PEs 12b and 15b, and a fifth pair of PEs 13b and 16b are five pairs of input PEs (upstream PEs) and the PEs 20a and 20b are the multiplexing auxiliary PEs.

The PE 30 is multiplexed and used and PEs 41a, 42a, and 41b to 43b are output PEs (downstream PEs).

The first pair of the PEs 11a and 14a and the fourth pair of the PEs 12b and 15b output signals at a predetermined cycle. The second pair of the PEs 12a and 15a, the third pair of the PEs 11b and 14b, and the fifth pair of the PEs 13b and 16b hold and output signals.

Output signals of the first pair of the PEs 11a and 14a and those of the second pair of the PEs 12a and 15a are supplied to the first multiplexing auxiliary PE 20a. Output signals of the third pair of the PEs 11b and 14b, those of the fourth pair of the PEs 12b and 15b, and those of the fifth pair of the PEs 13b and 16b are supplied to the second multiplexing auxiliary PE 20b.

Output signals (DO40b, DO41b) of the second multiplexing auxiliary PE 20b serve as inputs (DI20a, DI21a), corresponding to inputs serving as output signals of a pair of PEs 13a and 16a, of the first multiplexing auxiliary PE 20a. The multiplex PE 30 that is multiplexed and used receives and transmits signals from/to the first multiplexing auxiliary PE 20a.

The second multiplexing auxiliary PE 20b receives an output signal (DO20a) of the first multiplexing auxiliary PE 20a.

Although the output signals of the five pairs of input PEs, namely, the PEs 11a and 14a, the PEs 12a and 15a, the PEs 11b and 14b, the PEs 12b and 15b, and the PEs 13b and 16b are processed in FIG. 32, various modifications may be made using the multiplexing auxiliary PEs.

In FIG. 32, although the multiplex PE 30 is illustrated as a single PE, the PE 30 actually includes, for example, a circuit including a plurality of PEs in a manner similar to the foregoing first embodiment.

FIGS. 33 to 42 are diagrams explaining an exemplary operation of the semiconductor integrated circuit illustrated in FIG. 32.

Figure 33:
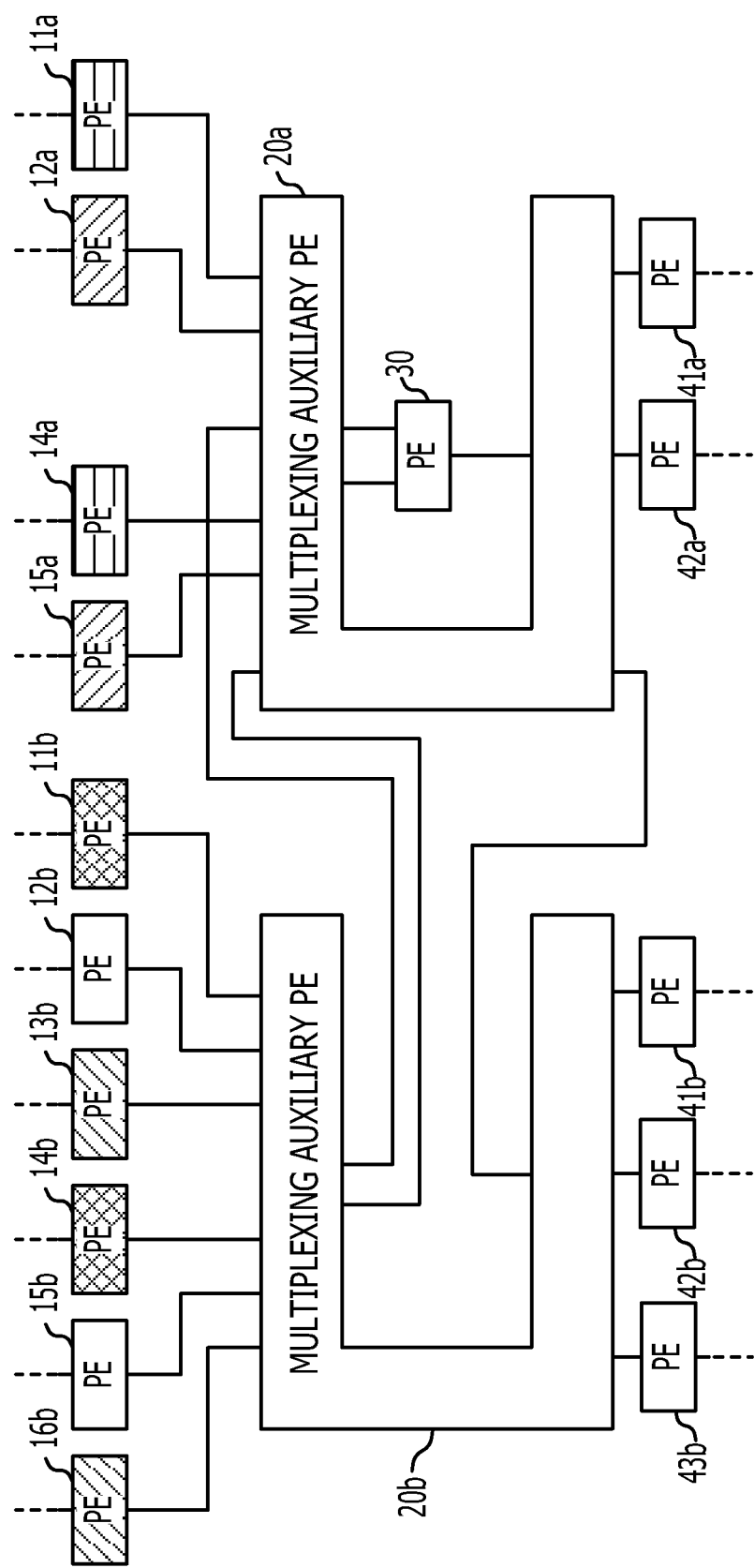
FIG. 33 is a first diagram explaining an exemplary operation of the semiconductor integrated circuit of FIG. 32.

As illustrated in FIG. 33, at a first cycle of a clock, signals are output from the first pair of the PEs 11a and 14a. At this time, signals have been output from the second pair of the PEs 12a and 15a, the third pair of the PEs 11b and 14b, and the fifth pair of the PEs 13b and 16b.

Figure 34:
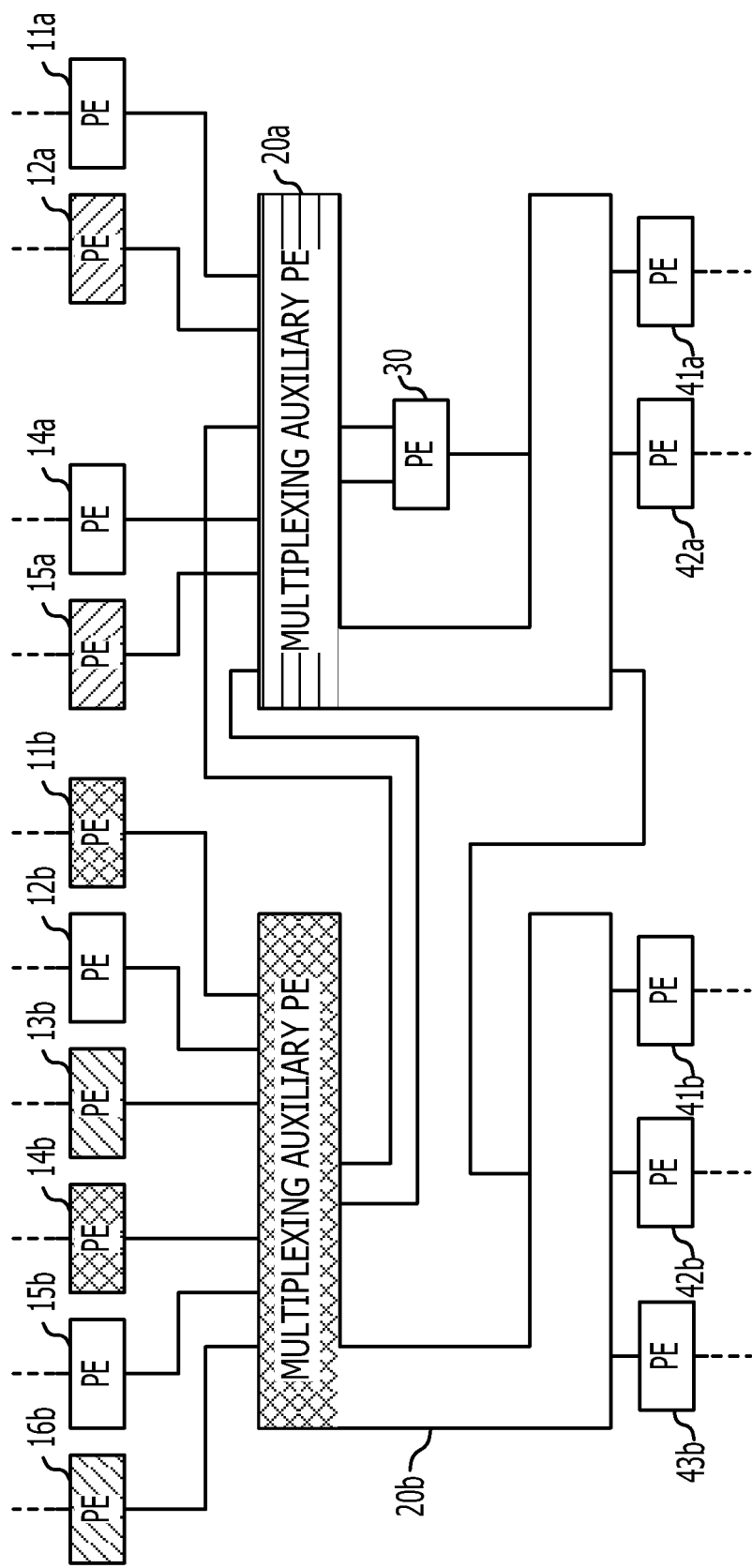
FIG. 34 is a second diagram explaining the exemplary operation of the semiconductor integrated circuit of FIG. 32.

As illustrated in FIG. 34, at a second cycle of the clock, the output signals of the first pair of the PEs 11a and 14a are input to the first multiplexing auxiliary PE 20a.

At this time, the output signals of the third pair of the PEs 11b and 14b are input to the second multiplexing auxiliary PE 20b.

In this instance, the input of the output signals of the first pair of the PEs 11a and 14a and the third pair of the PEs 11b and 14b to the first and second multiplexing auxiliary PEs 20a and 20b correspond to the above-described input of the output signals to the output section 27 in FIG. 19.

Figure 35:
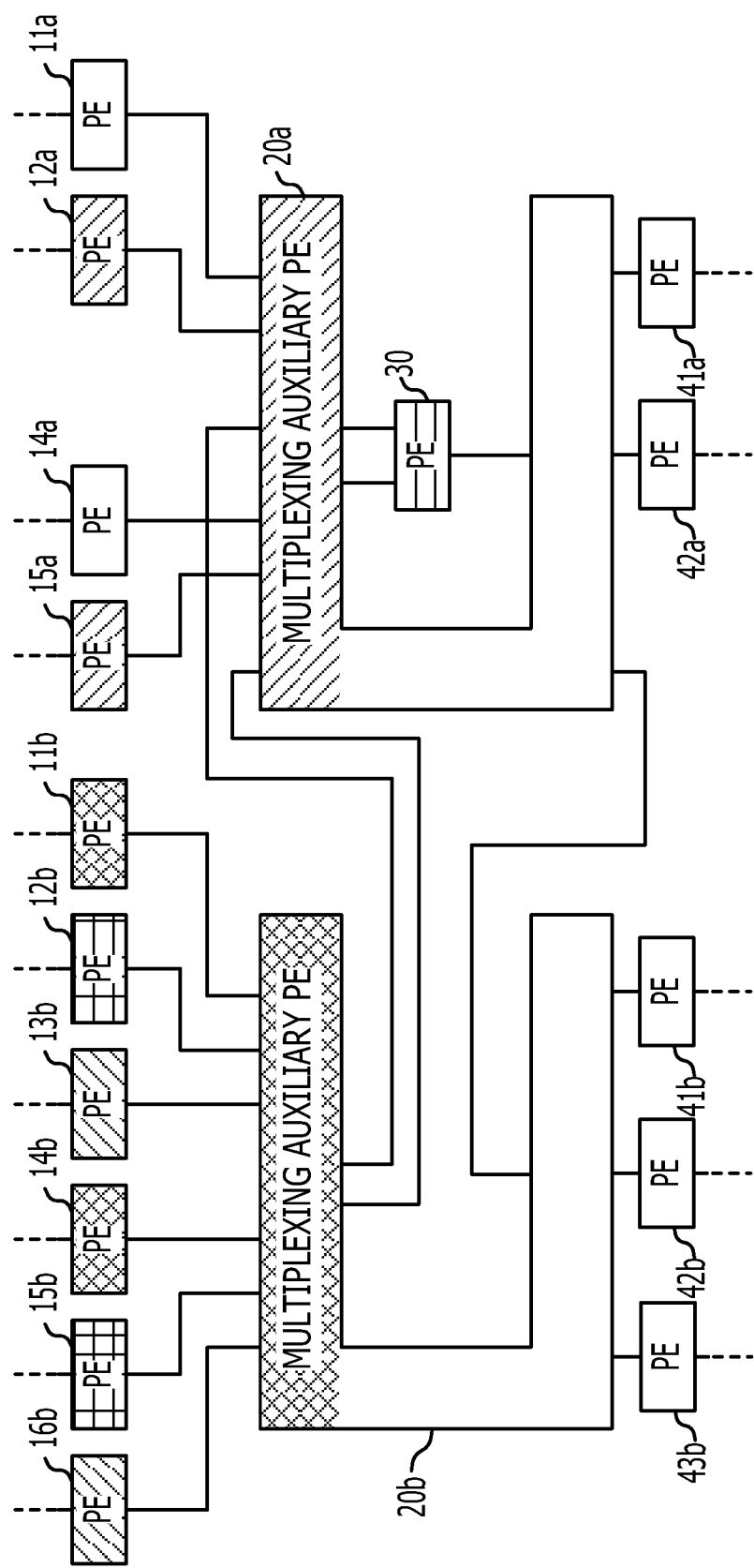
FIG. 35 is a third diagram explaining the exemplary operation of the semiconductor integrated circuit of FIG. 32.

Furthermore, as illustrated in FIG. 35, at a third cycle of the clock, the output signals of the first pair of the PEs 11a and 14a are supplied to the multiplex PE 30, so that the signals are subjected to a predetermined process.

At this time, the output signals of the second pair of the PEs 12a and 15a are input to the first multiplexing auxiliary PE 20a. In addition, signals are output from the fourth pair of the PEs 12b and 15b. The output signals of the third pair of the PEs 11b and 14b in the second multiplexing auxiliary PE 20b are held as they are by the second multiplexing auxiliary PE 20b.

Figure 36:
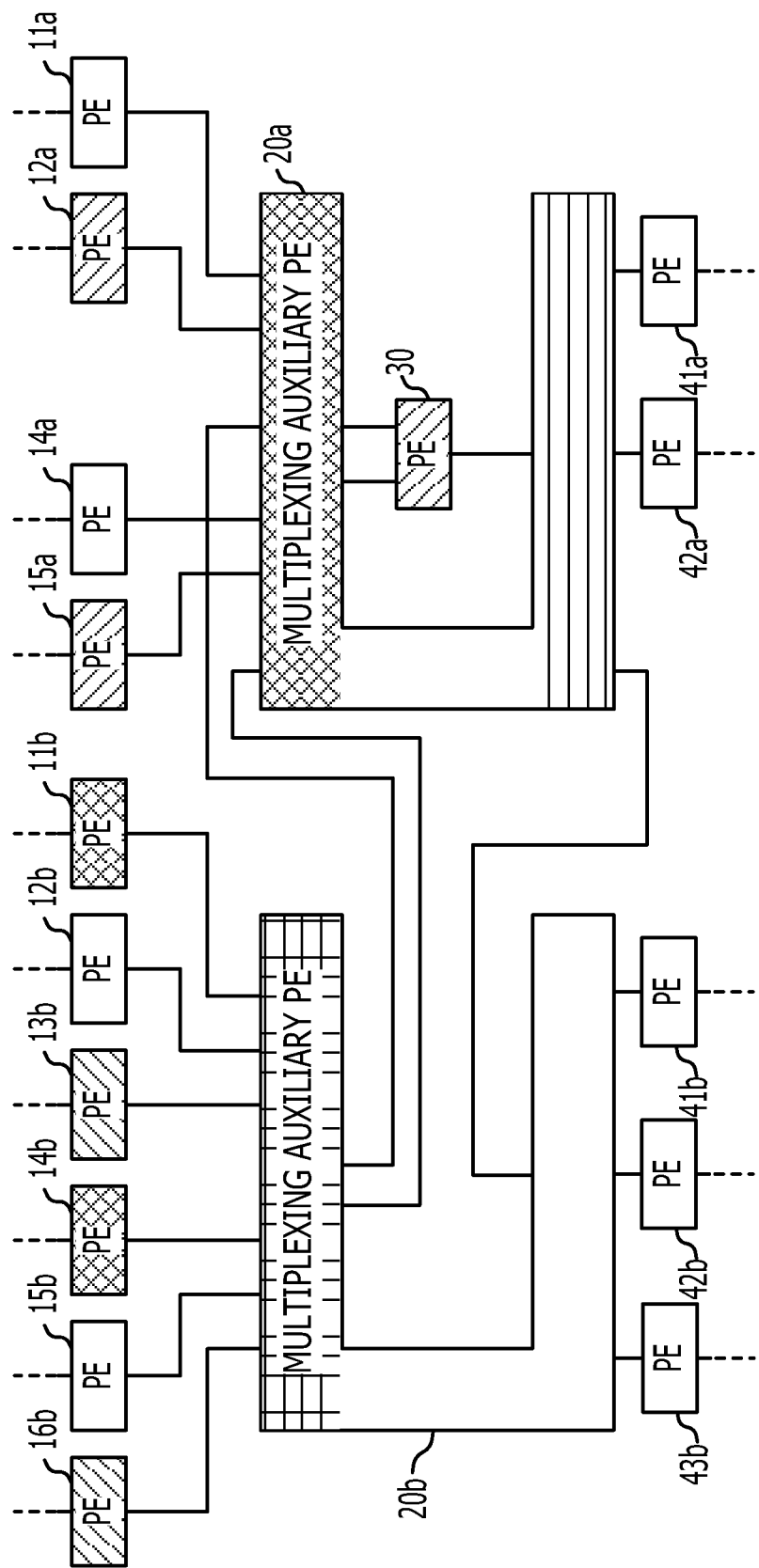
FIG. 36 is a fourth diagram explaining the exemplary operation of the semiconductor integrated circuit of FIG. 32.

After that, as illustrated in FIG. 36, at a fourth cycle of the clock, the first pair of output signals (processed signals) subjected to the predetermined process by the PE 30 are input to the first multiplexing auxiliary PE 20a.

In this instance, the input of the first pair of processed signals to the first multiplexing auxiliary PE 20a corresponds to the input of signals to the output gate section 27a in the above-described multiplexing auxiliary PE (2) in FIG. 19.

At this time, the output signals of the second pair of the PEs 12a and 15a are supplied to the multiplex PE 30, so that the signals are subjected to the predetermined process. The output signals of the third pair of the PEs 11b and 14b held by the second multiplexing auxiliary PE 20b are input to the first multiplexing auxiliary PE 20a.

The output signals of the fourth pair of the PEs 12b and 15b are input to the second multiplexing auxiliary PE 20b.

Figure 37:
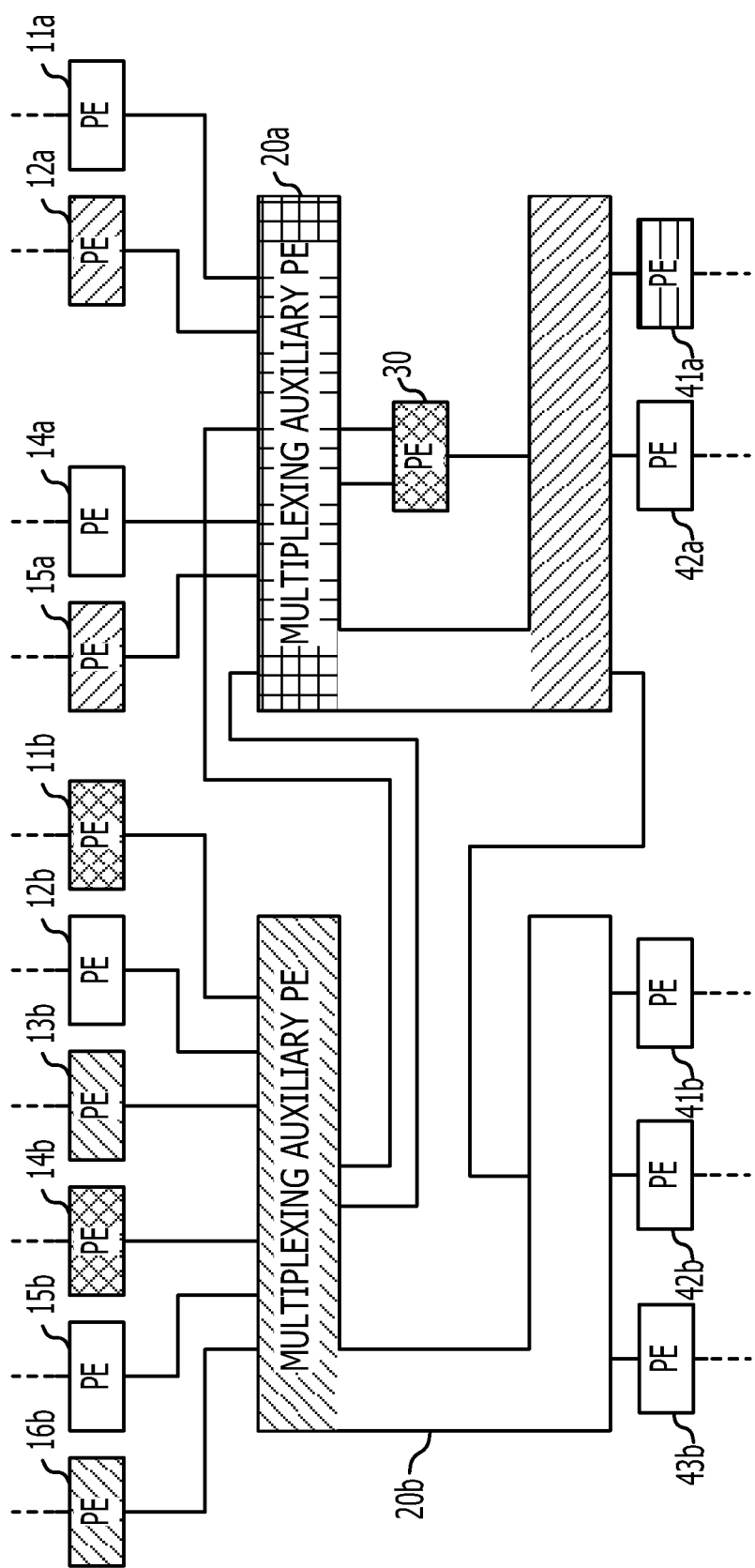
FIG. 37 is a fifth diagram explaining the exemplary operation of the semiconductor integrated circuit of FIG. 32.

As illustrated in FIG. 37, at a fifth cycle of the clock, the first pair of processed signals in the first multiplexing auxiliary PE 20a are supplied to the downstream PE 41a.

At this time, the second pair of processed signals subjected to the predetermined process by the PE 30 are input to the first multiplexing auxiliary PE 20a. The output signals of the third pair of the PEs 11b and 14b are supplied to the multiplex PE 30, so that the signals are subjected to the predetermined process.

In this instance, the input of the second pair of processed signals to the first multiplexing auxiliary PE 20a corresponds to the input of signals to the output gate section 27b in the above-described multiplexing auxiliary PE (2) in FIG. 19.

The output signals of the fourth pair of the PEs 12b and 15b in the second multiplexing auxiliary PE 20b are input to the first multiplexing auxiliary PE 20a and the output signals of the fifth pair of the PEs 13b and 16b are input to the second multiplexing auxiliary PE 20b.

Figure 38:
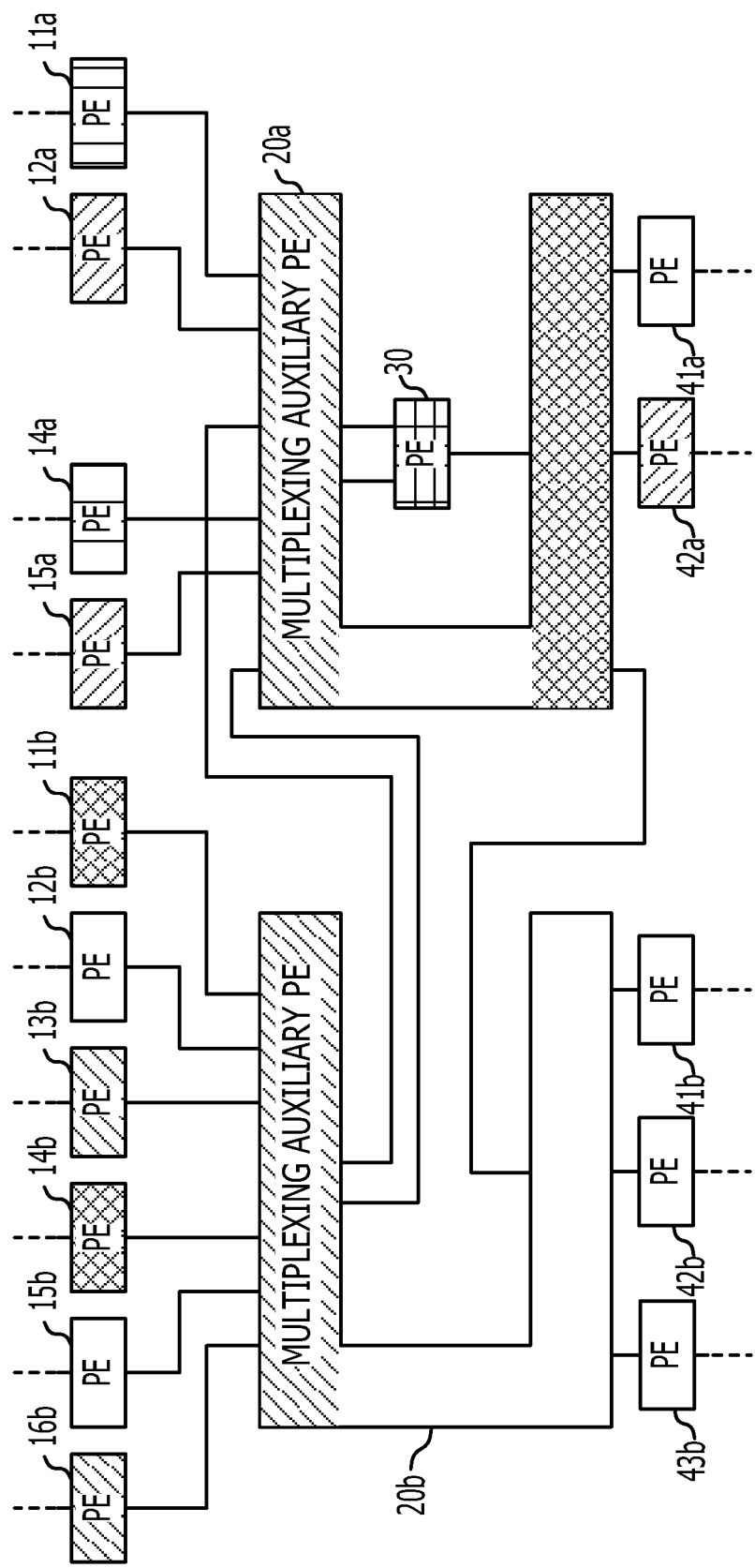
FIG. 38 is a sixth diagram explaining the exemplary operation of the semiconductor integrated circuit of FIG. 32.

As illustrated in FIG. 38, at a sixth cycle of the clock, the second pair of processed signals in the first multiplexing auxiliary PE 20a are supplied to the downstream PE 42a.

At this time, the third pair of processed signals subjected to the predetermined process by the PE 30 are input to the first multiplexing auxiliary PE 20a and the output signals of the fourth pair of the PEs 12b and 15b are supplied to the multiplex PE 30, so that the signals are subjected to the predetermined process.

In this instance, the input of the third pair of processed signals to the first multiplexing auxiliary PE 20a corresponds to the input of signals to the output gate section 27c in the above-described multiplexing auxiliary PE (2) in FIG. 19.

The output signals of the fifth pair of the PEs 13b and 16b in the second multiplexing auxiliary PE 20b are input to the first multiplexing auxiliary PE 20a. The second multiplexing auxiliary PE 20b holds the output signals of the fifth pair of the PEs 13b and 16b as they are. In addition, signals are output from the first pair of the PEs 11a and 14a.

Figure 39:
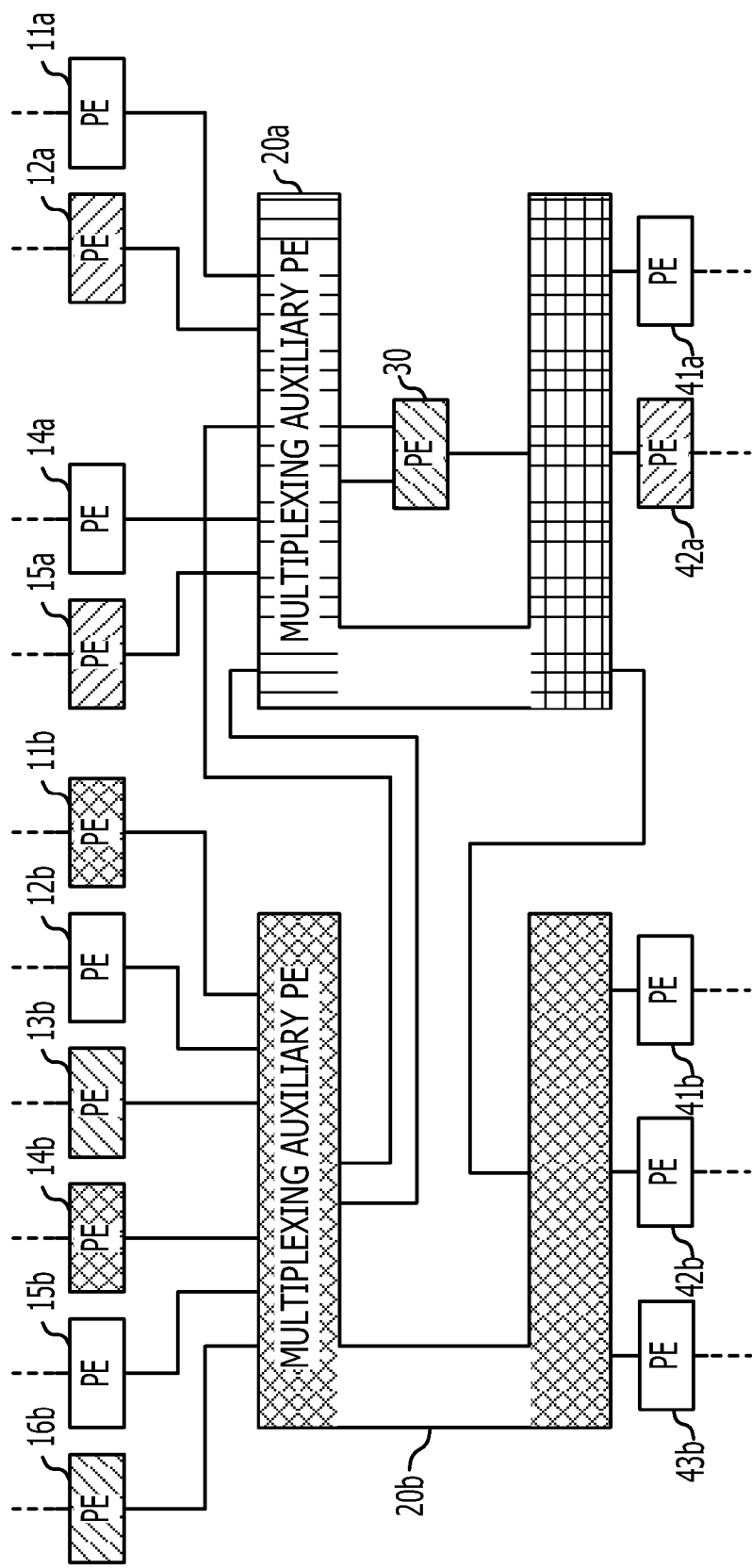
FIG. 39 is a seventh diagram explaining the exemplary operation of the semiconductor integrated circuit of FIG. 32.

As illustrated in FIG. 39, at a seventh cycle of the clock, the third pair of processed signals input in the first multiplexing auxiliary PE 20a are input to the second multiplexing auxiliary PE 20b.

In this instance, the input of the third pair of processed signals in the first multiplexing auxiliary PE 20a to the second multiplexing auxiliary PE 20b corresponds to the input of signals to the output gate section 27a in the above-described multiplexing auxiliary PE (2) in FIG. 19.

At this time, the fourth pair of processed signals subjected to the predetermined process by the PE 30 are input to the first multiplexing auxiliary PE 20a. In addition, the output signals of the fifth pair of the PEs 13b and 16b in the first multiplexing auxiliary PE 20a are supplied to the multiplex PE 30, so that the signals are subjected to the predetermined process.

Furthermore, the output signals of the first pair of the PEs 11a and 14a are again input to the first multiplexing auxiliary PE 20a and output signals of the third pair of the PEs 11b and 14b are again input to the second multiplexing auxiliary PE 20b.

Figure 40:
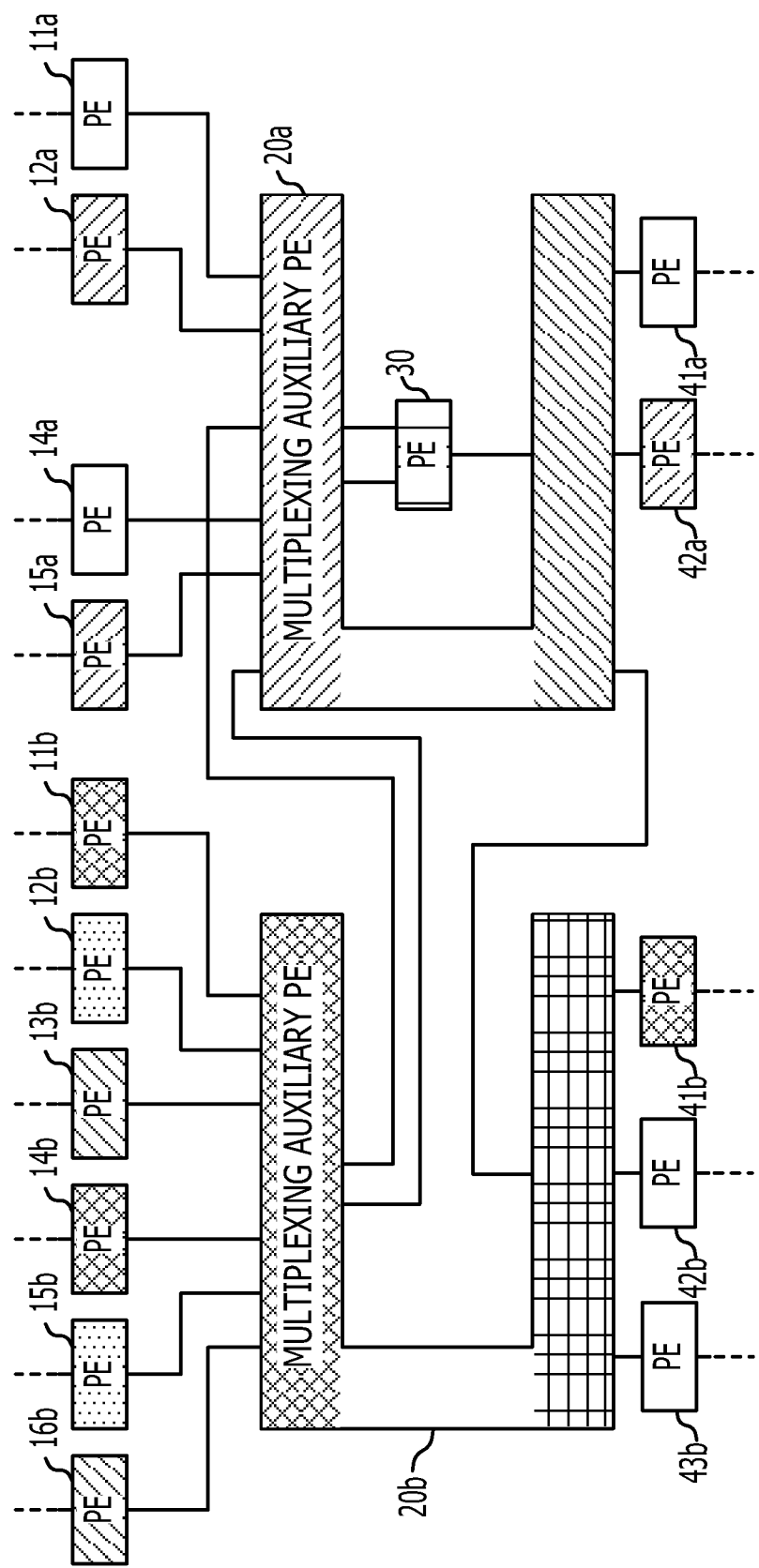
FIG. 40 is an eighth diagram explaining the exemplary operation of the semiconductor integrated circuit of FIG. 32.

As illustrated in FIG. 40, at an eighth cycle of the clock, the third pair of processed signals in the second multiplexing auxiliary PE 20b are supplied to the downstream PE 41b.

At this time, the fourth pair of processed signals in the first multiplexing auxiliary PE 20a are input to the second multiplexing auxiliary PE 20b and the fifth pair of processed signals subjected to the predetermined process by the PE 30 are input to the first multiplexing auxiliary PE 20a.

Furthermore, the output signals of the first pair of the PEs 11a and 14a in the first multiplexing auxiliary PE 20a are supplied to the multiplex PE 30, so that the signals are subjected to the predetermined process.

Output signals of the second pair of the PEs 12a and 15a are again input to the first multiplexing auxiliary PE 20a. The output signals of the third pair of the PEs 11b and 14b in the second multiplexing auxiliary PE 20b are held as they are. Signals are output from the fourth pair of the PEs 12b and 15b.

Figure 41:
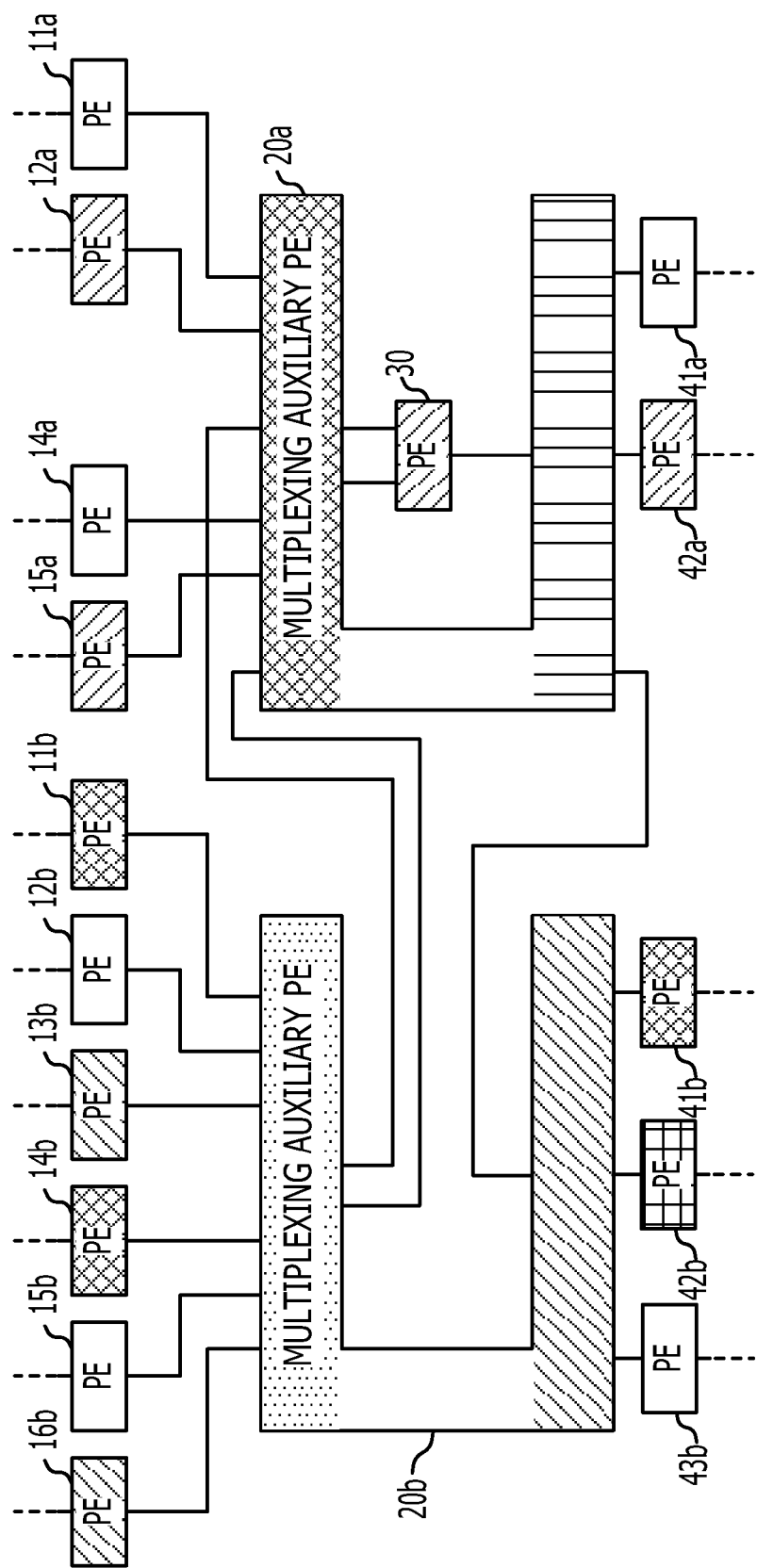
FIG. 41 is a ninth diagram explaining the exemplary operation of the semiconductor integrated circuit of FIG. 32.

After that, as illustrated in FIG. 41, at a ninth cycle of the clock, the fourth pair of processed signals in the second multiplexing auxiliary PE 20b are supplied to the downstream PE 42b.

At this time, the fifth pair of processed signals in the first multiplexing auxiliary PE 20a are input to the second multiplexing auxiliary PE 20b and the first pair of processed signals subjected to the predetermined process by the PE 30 are input to the first multiplexing auxiliary PE 20a.

Furthermore, the output signals of the second pair of the PEs 12a and 15a in the first multiplexing auxiliary PE 20a are supplied to the multiplex PE 30, so that the signals are subjected to the predetermined process.

In addition, the output signals of the third pair of the PEs 11b and 14b held in the second multiplexing auxiliary PE 20b are again input to the first multiplexing auxiliary PE 20a. The output signals of the fourth pair of the PEs 12b and 15b are input to the second multiplexing auxiliary PE 20b.

Figure 42:
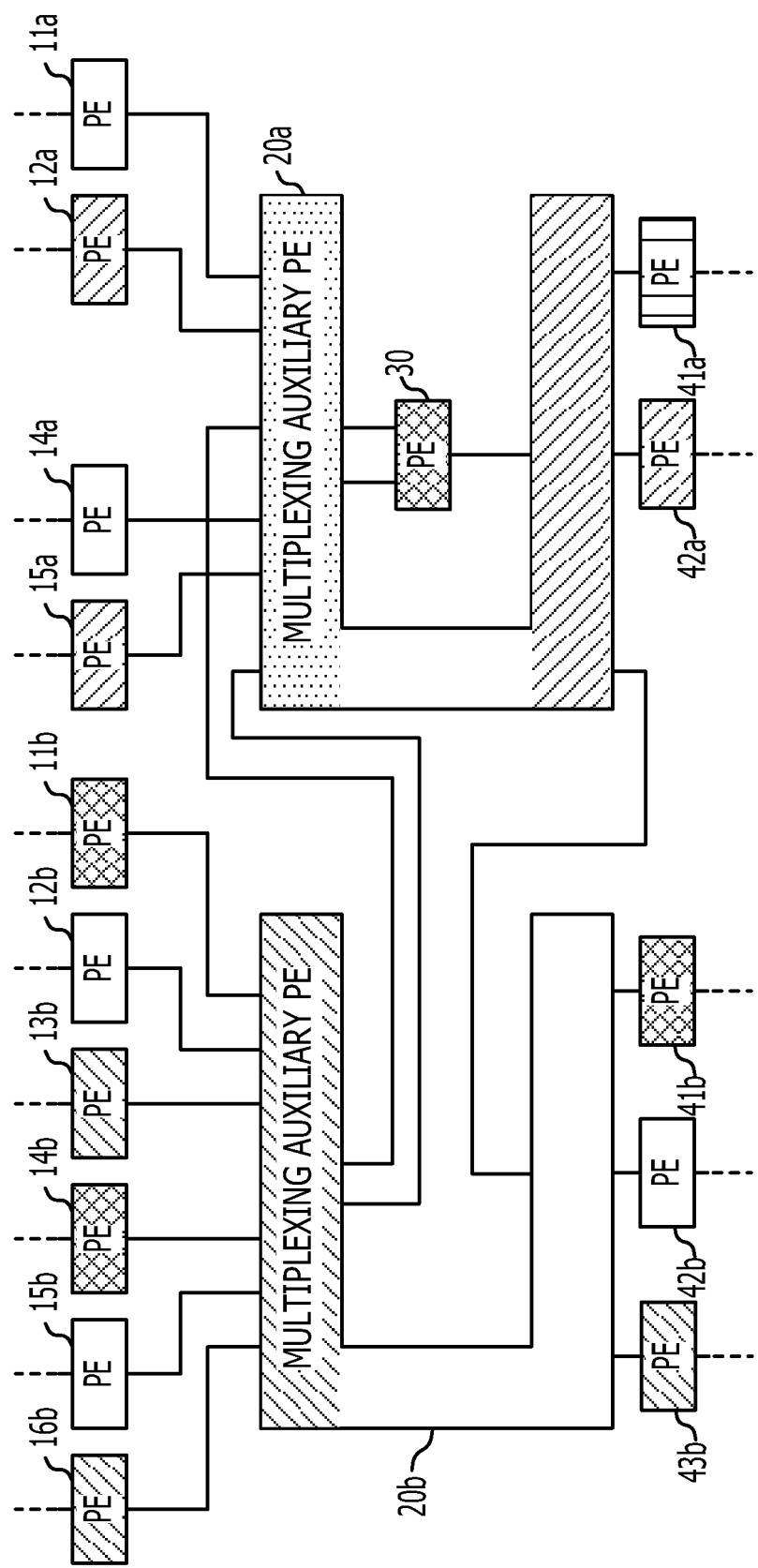
FIG. 42 is a tenth diagram explaining the exemplary operation of the semiconductor integrated circuit of FIG. 32.

As illustrated in FIG. 42, at a tenth cycle of the clock, the fifth pair of processed signals in the second multiplexing auxiliary PE 20b are supplied to the downstream PE 43b.

At this time, the first pair of processed signals in the first multiplexing auxiliary PE 20a are supplied to the downstream PE 41a and the second pair of processed signals subjected to the predetermined process by the PE 30 are input to the first multiplexing auxiliary PE 20a.

Furthermore, the output signals of the third pair of the PEs 11b and 14b in the first multiplexing auxiliary PE 20a are supplied to the multiplex PE 30, so that the signals are subjected to the predetermined process.

The output signals of the fourth pair of the PEs 12b and 15b are again input to the first multiplexing auxiliary PE 20a. Output signals of the fifth pair of the PEs 13b and 16b are input to the second multiplexing auxiliary PE 20b.

By repeating the above-described process, the signals of the five pairs of PEs are sequentially subjected to the predetermined process by the multiplex PE 30 using the two multiplexing auxiliary PEs 20a and 20b which are multiplexed, and are then supplied to the downstream PEs 41a, 42a, 41b, 42b, and 43b.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of using a multiplexing auxiliary processing element (PE), comprising:
   receiving input signals from a plurality of upstream processing elements (PEs) arranged on an input side, wherein each of the input signals includes a plurality of data bits and one or more valid signal bits;
   comparing the one or more valid signal bits with a configuration signal;
   if a predetermined condition is satisfied, supplying the input signals to a multiplex PE, wherein the multiplex PE processes the input signals to generate processed signals;
   delaying the one or more valid signal bits by a designated cycle;
   receiving, from the multiplex PE, the processed signals; and
   supplying, in accordance with the delayed one or more valid signal bits, the processed signals to a plurality of downstream PEs arranged on an output side.

2. The method of claim 1, further comprising using the multiplexing auxiliary PE in a pipelined circuit that processes input signals which are sequentially valid every cycle of a clock pursuant to setting the multiplexing auxiliary PE.

3. The method of claim 1, further comprising using the multiplexing auxiliary PE in a non-pipelined circuit that processes input signals which are valid at a plurality of cycles of a clock pursuant to setting the multiplexing auxiliary PE.

4. The method of claim 1, further comprising setting the multiplexing auxiliary PE using a configuration setting unit.

5. The method of claim 1, further comprising:
   receiving a selection signal; and
   invalidating the one or more valid signal bits if the selection signal indicates that a channel associated with the one or more valid signal bits is not selected.

6. A semiconductor integrated circuit, comprising:
   a plurality of upstream processing elements (PEs);
   a plurality of downstream PEs;
   a multiplex processing element (PE); and
   a multiplexing auxiliary PE configured to:
     receive input signals from the upstream PEs arranged on an input side, wherein each of the input signals includes a plurality of data bits and one or more valid signal bits;
     compare the one or more valid signal bits with a configuration signal;
     if a predetermined condition is satisfied, supply the input signals to the multiplex PE, wherein the multiplex PE processes the input signals to generate processed signals;
     delay the one or more valid signal bits by a designated cycle;
     receive, from the multiplex PE, the processed signals; and
     supply, in accordance with the one or more valid signal bits, the processed signals to the downstream PEs arranged on an output side.

7. The semiconductor integrated circuit claim 6, wherein the circuit includes a plurality of the multiplexing auxiliary PEs and multiplexes and uses the multiplexing auxiliary PEs.

8. The semiconductor integrated circuit of claim 6, wherein the multiplexing auxiliary PE includes a configuration setting unit configured to perform setting of the multiplexing auxiliary PE.

9. The semiconductor integrated circuit of claim 8, wherein the configuration setting unit includes:
   a configuration memory configured to store a plurality of configurations for the multiplexing auxiliary PE;
   a PE control section configured to receive an externally supplied control signal and transmit the control signal to a plurality of functional blocks in the multiplexing auxiliary PE;
   a memory control section configured to read, from the configuration memory, configuration data relevant to an instruction from the PE control section; and
   a configuration distributing section configured to decode the configuration data supplied from the memory control section and transmit the configuration signal to each of the functional blocks.

10. The semiconductor integrated circuit of claim 9, wherein the functional blocks include:
   a plurality of signal input sections configured to receive the input signals and compare the one or more valid signal bits with the configuration signal;

an output section configured to supply the input signals to the multiplex PE;

a data selecting section configured to receive the input signals and select the input signals to be supplied to the output section; and a plurality of output gate sections configured to receive the processed signals from the multiplex PE and sequentially supply the processed signals to the downstream PEs.

11. The semiconductor integrated circuit of claim 10, wherein, when the input signals are valid signals, the signal input sections, the output section, the data selecting section and the output gate sections are configured to process the data bits.

12. The semiconductor integrated circuit of claim 10, wherein the functional blocks further include a plurality of delay sections configured to receive the one or more valid signal bits, delay the one or more valid signal bits, and supply the delayed one or more valid signal bits to the corresponding output gate sections.

13. The semiconductor integrated circuit of claim 10, wherein the functional blocks further include a plurality of delay sections configured to receive a selection signal and invalidate the one or more valid signal bits if the selection signal indicates that a channel associated with the one or more valid signal bits is not selected.

\* \* \* \* \*